(12) United States Patent
Turkelson et al.

(10) Patent No.: US 11,756,291 B2
(45) Date of Patent: Sep. 12, 2023

(54) SCENE AND USER-INPUT CONTEXT AIDED VISUAL SEARCH

(71) Applicant: Slyce Acquisition Inc., Washington, DC (US)

(72) Inventors: Adam Turkelson, Washington, DC (US); Kyle Martin, Washington, DC (US); Sethu Hareesh Kolluru, Washington, DC (US)

(73) Assignee: Slyce Acquisition Inc., Philadelphia, PA (US)

( * ) Notice: Subject to any disclaimer, the term of this patent is extended or adjusted under 35 U.S.C. 154(b) by 360 days.

(21) Appl. No.: 16/995,531

(22) Filed: Aug. 17, 2020

(65) Prior Publication Data

US 2021/0004589 A1    Jan. 7, 2021

Related U.S. Application Data

(63) Continuation-in-part of application No. 16/719,697, filed on Dec. 18, 2019, now abandoned, and a continuation-in-part of application No. 16/719,710, filed on Dec. 18, 2019, now Pat. No. 10,755,128, and
(Continued)

(51) Int. Cl.
| | |
|---|---|
| *G06K 9/00* | (2022.01) |
| *G06V 10/82* | (2022.01) |
| *G06T 5/00* | (2006.01) |
| *G06V 30/19* | (2022.01) |
| *G06V 10/80* | (2022.01) |
| *G06F 3/01* | (2006.01) |
| *G06F 3/041* | (2006.01) |

(52) U.S. Cl.
CPC ............... *G06V 10/82* (2022.01); *G06T 5/00* (2013.01); *G06V 10/809* (2022.01); *G06V 30/19173* (2022.01); *G06F 3/013* (2013.01); *G06F 3/017* (2013.01); *G06F 3/041* (2013.01)

(58) Field of Classification Search
None
See application file for complete search history.

(56) References Cited

U.S. PATENT DOCUMENTS

| | | |
|---|---|---|
| 9,552,535 B2 | 1/2017 | Movellan |
| 10,262,233 B2 | 4/2019 | Takimoto |
| 10,803,336 B2 | 10/2020 | Badr |

(Continued)

OTHER PUBLICATIONS

Notice of Allowance in related U.S. Appl. No. 16/719,716 dated Dec. 10, 2020 (15 pages).

*Primary Examiner* — Wei Wen Yang
(74) *Attorney, Agent, or Firm* — Innovators Legal

(57) ABSTRACT

Provided is a technique for determining a context of an image and an object depicted by the image based on the context. A trained context classification model may determine a context of an image, and a trained object recognition model may determine an object depicted by the image based on the image and the context. Provided is also a technique for determining an object depicted within an image based on an input location of an input detected by a display screen. An object depicted within an image may be detected based on a distance in feature space between an image feature vector of an image and a feature vector of the object, and a distance in pixel-space between an input location of an input and location of the object within the image.

20 Claims, 23 Drawing Sheets

Related U.S. Application Data a continuation-in-part of application No. 16/719,716, filed on Dec. 18, 2019, now Pat. No. 10,977,520.

(60) Provisional application No. 62/781,422, filed on Dec. 18, 2018, provisional application No. 62/781,446, filed on Dec. 18, 2018, provisional application No. 62/781,414, filed on Dec. 18, 2018, provisional application No. 62/781,432, filed on Dec. 18, 2018.

(56) References Cited

U.S. PATENT DOCUMENTS

| | | | |
|---|---|---|---|
| 2013/0054603 A1* | 2/2013 | Birdwell | G06K 9/6224 |
| | | | 707/738 |
| 2017/0083792 A1* | 3/2017 | Rodríguez-Serrano | |
| | | | G06F 16/5854 |
| 2017/0185898 A1 | 6/2017 | Paul | |
| 2018/0204111 A1* | 7/2018 | Zadeh | G06N 3/0436 |
| 2019/0043201 A1* | 2/2019 | Strong | G06V 10/771 |
| 2020/0104720 A1 | 4/2020 | Bao | |

* cited by examiner

SCENE AND USER-INPUT CONTEXT AIDED VISUAL SEARCH

CROSS-REFERENCE TO RELATED APPLICATIONS

This patent is:
a. a continuation-in-part of U.S. patent application Ser. No. 16/719,710, filed 18 Dec. 2019, titled "SCENE AND USER-INPUT CONTEXT AIDED VISUAL SEARCH," which claims the benefit of U.S. Provisional Patent Application 62/781,446, filed 18 Dec. 2018, titled "MULTI-CHANNEL COMPUTER-VISION OBJECT DETECTION," and also claims the benefit of U.S. Provisional Patent Application 62/781,432, filed 18 Dec. 2018, titled "CONTEXT AIDED VISUAL SEARCH";
b. a continuation-in-part of U.S. patent application Ser. No. 16/719,697, filed 18 Dec. 2019, titled "SPARSE LEARNING FOR COMPUTER VISION," which claims the benefit of U.S. Provisional Patent Application 62/781,422, filed 18 Dec. 2018, titled "SPARSE LEARNING FOR COMPUTER VISION"; and
c. a continuation-in-part of U.S. patent application Ser. No. 16/719,716, filed 18 Dec. 2019, titled "TRAINING DATA COLLECTION FOR COMPUTER VISION," which claims the benefit of U.S. Provisional Patent Application 62/781,414, filed 18 Dec. 2018, titled "TRAINING DATA COLLECTION FOR COMPUTER VISION."

The entire contents of each of the afore-listed, earlier-filed patent applications are hereby incorporated by reference for all purposes.

BACKGROUND

1. Field

The present disclosure relates generally to machine learning and, more specifically, to computer vision.

2. Description of the Related Art

A surprising discovery by artificial intelligence researchers is that many types of high-level reasoning require relatively few computational resources, while relatively low-level sensorimotor activities require relatively extensive computational resources. In many cases, the skills of a child are exceedingly difficult to implement with a computer, while the added abilities of an adult are relatively straightforward. A canonical example is that of computer vision, where it is relatively simple for a human to parse visual scenes and extract information, while computers struggle with this task.

Notwithstanding these challenges, computer vision algorithms have improved tremendously in recent years, particularly in the realm of object detection and localization within various types of images, such as two-dimensional images, depth images, stereoscopic images, and various forms of video. Variants include unsupervised and supervised computer vision algorithms, with the latter often drawing upon training sets in which objects in images are labeled. In many cases, trained computer-vision models ingest an image, detect an object from among an ontology of objects in the image, and indicate a bounding area in pixel coordinates of the object along with a confidence score.

SUMMARY

The following is a non-exhaustive listing of some aspects of the present techniques. These and other aspects are described in the following disclosure.

Some aspects include a process including: obtaining, with a computer system, an image depicting an object within a context, wherein: the image is captured by a mobile computing device, the object is a member of an ontology of objects including a plurality of objects, and the context is a member of an ontology of contexts including a plurality of contexts; determining, with the computer system, with a trained context classification model, the context depicted by the image; determining, with the computer system, with a trained object recognition model, a first object identifier of the object based on the image and the context; and causing, with the computer system, the first object identifier of the object to be stored in memory.

Some aspects also include a process including: obtaining, with a computer system, (i) an image captured by a mobile computing device and (ii) coordinates indicating an input location of an input detected on a display screen of the mobile computing device, wherein: the input caused the image to be captured, the input location is a location in pixel-space of the image, and the image depicts a first object located at a first location in the image; obtaining, with the computer system, a computer-vision object recognition model trained using a training data set including images depicting objects, wherein: each image of the training data set is labeled with an object identifier, each object identifier indicates an object in an object ontology depicted by a corresponding image, and the object ontology includes the first object; detecting, with the computer system, with the computer-vision object recognition model, the first object based on: a first distance in a feature space of the computer-vision object recognition model between an image feature vector of the image and a first feature vector of the first object in the computer-vision object recognition model; and a first distance in the pixel-space of the image between the input location of the input and the first location of the first object; and causing, with the computer system, a first object identifier of the first object from the object ontology to be stored in memory.

Some aspects include a process that includes: obtaining, with a computer system, a first training set to train a computer vision model, the first training set comprising images depicting objects and labels corresponding to object identifiers and indicating which object is depicted in respective labeled images; training, with the computer system, the computer vision model to detect the objects in other images based on the first training set, wherein the training the computer vision model comprises: encoding depictions of objects in the first training set as vectors in a vector space of lower dimensionality than at least some images in the first training set, and designating, based on the vectors, locations in the vector space as corresponding to object identifiers; detecting, with the computer system, a first object in a first query image by obtaining a first vector encoding a first depiction of the first object and selecting a first object identifier based on a first distance between the first vector and a first location in the vector space designated as corresponding to the first object identifier by the trained computer vision model; determining, with the computer system, based on the first distance between the first vector and the first location in the vector space, to include the first image or data based thereon in a second training set; and training, with the computer system, the computer vision model with the second training set.

Some aspects include a process that includes: obtaining a training data set including: a first image depicting a first object labeled with a first identifier of the first object, and a second image depicting a second object labeled with a second identifier of the second object; causing, based on the training data set, a computer-vision object recognition model to be trained to recognize the first object and the second object to obtain a trained computer-vision object recognition model, wherein: parameters of the trained computer-vision object recognition model encode first information about a first subset of visual features of the first object, and the first subset of visual features of the first object is determined based on one or more visual features extracted from the first image; obtaining, after training and deployment of the trained computer-vision object recognition model, a third image; determining, with the trained computer-vision object recognition mode, that the third image depicts the first object and, in response: causing the first identifier or a value corresponding to the first identifier to be stored in memory in association with the third image, one or more visual features extracted from the third image, or the third image and the one or more visual features extracted from the third image, determining, based on a similarity of the one or more visual features extracted from the first image and the one or more visual features extracted from the third image, that the third image is to be added to the training data set for retraining the trained computer-vision object recognition model, and enriching the parameters of the trained computer-vision object recognition model to encode second information about a second subset of visual features of the first object based on the one or more visual features extracted from the third image, wherein the second subset of visual features of the first object differs from the first subset of visual features of the first object.

Some aspects include a process including: determining that a training set lacks an image of an object with a given pose, context, or camera; composing, based on the determination, a video capture task; obtaining a candidate video; selecting a subset of frames of the candidate video as representative; determining that a given frame among the subset depicts the object from the given pose, context, or camera; and augmenting the training set with the given frame.

Some aspects include a process including obtaining, with a mobile computing device, an image-capture task from a remote server, where: the image-capture task includes a request for a video of an object to be captured, the image-capture task provides an indication of the object to be captured via the video, and the image-capture task causes the mobile computing device to present instructions via a native application executing on the mobile computing device, the instructions describing how the video of the object is to be captured. The process further includes obtaining, with the mobile computing device, a candidate video of the object, where the candidate video includes the object captured from multiple perspectives and with multiple lighting conditions, where obtaining the candidate video includes: determining, with the mobile computing device, while obtaining the candidate video, feedback indicating whether first criteria along a first dimension and second criteria along a second dimension are satisfied based on the instructions, and causing, with the mobile computing device, while obtaining the candidate video, (i) the feedback and (ii) an indication of one or more actions capable of being performed to adjust a video recording process, to be presented via the native application. The process still further includes providing, with the mobile computing device, to the remote server system, (i) the candidate video, (ii) features of the object extracted from the candidate video, or (iii) the candidate video and the features extracted from the candidate video, where the remote server system is configured to generate training data for training an object recognition model.

Some aspects include a tangible, non-transitory, machine-readable medium storing instructions that when executed by a data processing apparatus cause the data processing apparatus to perform operations including each of the above-mentioned processes.

Some aspects include a system, including: one or more processors; and memory storing instructions that when executed by the processors cause the processors to effectuate operations of each the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
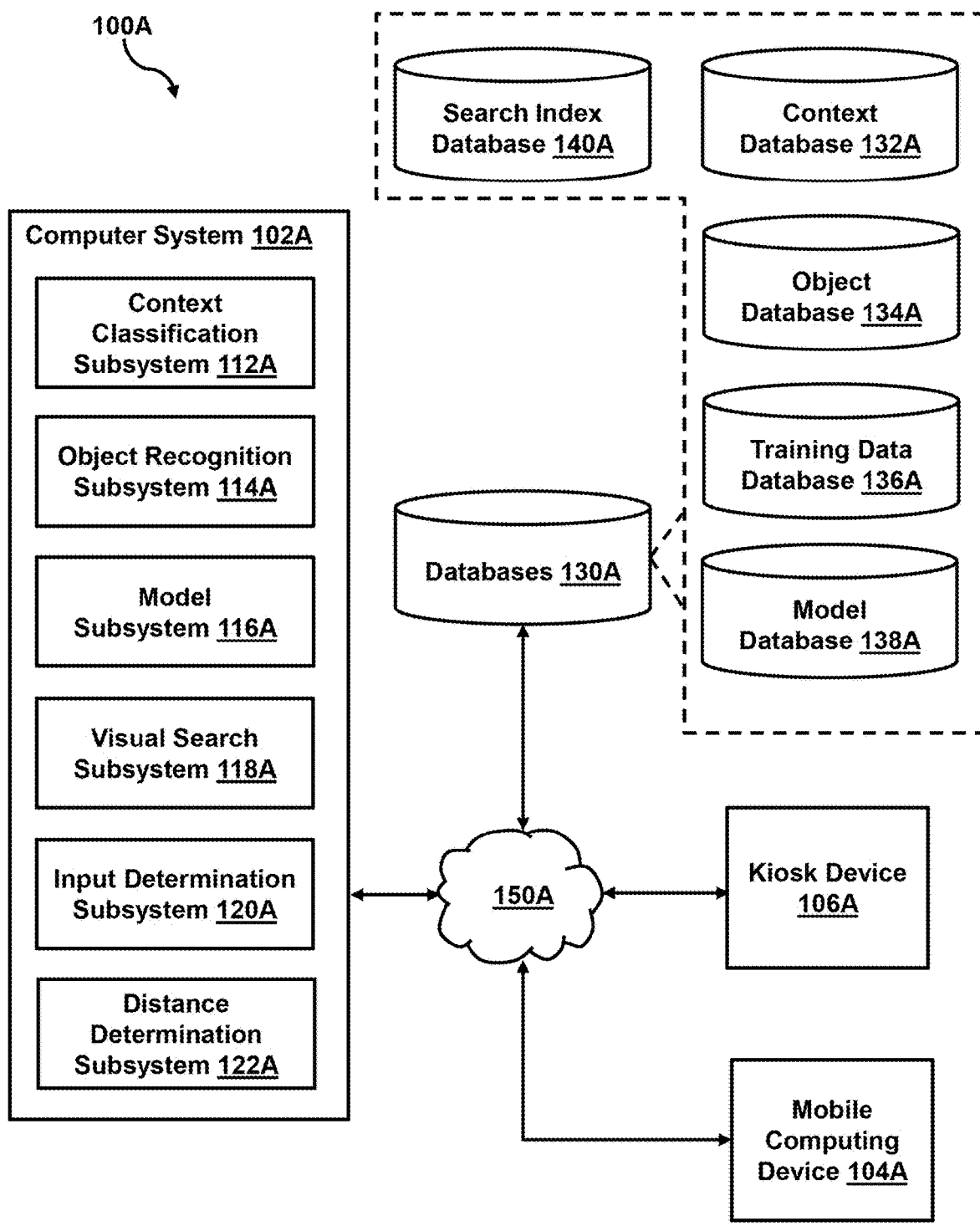
FIG. 1 illustrates an example system for recognizing an object depicted within an image, in accordance with various embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer vision. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Scene and User-Input Context Aided Visual Search

Context-Aided Visual Search

Many existing computer-vision object detection and localization approaches require larger training sets than are available for some use cases. Many examples are trained with sets of images including tens of thousands of images of each object the model is capable of detecting. Various approaches have been developed for use cases with smaller sets of training images, while candidate objects in an ontology are relatively large. For example, some training data sets may include less than 100 example images of each object, less than 10 example images of each object, or even a single image of each object, while the number of object in the ontology may be more than 1,000, more than 10,000, more than 100,000, or more than 1,000,000. But many of these techniques (e.g., including smaller sets of training images) are less accurate and more computationally expensive than desirable. Or in some cases, ratios of any permutation of these numbers may characterize a relevant scenario. For example, a ratio of example images per object to objects in an ontology of less than $1/100$; $1/1,000$; $1/10,000$; or $1/100,000$. Further, many approaches become particularly computationally expensive as more complex convolutional layers are added to models and as the size of an ontology of objects being detected grows.

Some embodiments augment computer-vision object detection by enriching a feature set by which objects are detected with a classification of a context in which the objects appear in an image. Examples include models that upweight kitchen utensils in response to classifying an image as depicting a scene in a kitchen as the image context, or upweight home improvement equipment in response to classifying an image as depicting a scene in a garage as the image context.

In some embodiments, an object recognition model may be positioned downstream from a context classification model in an image processing pipeline. The context classification model may receive an image and output a context classification vector indicative of a confidence that the image depicts a particular context. Some examples of context include scenes, temporal information, geographical information, input information, and the like. In some embodiments, the context classification model may be a scene classification model that receives an image and outputs a scene classification vector indicative of a confidence that the image depicts a particular scene. This scene classification vector may be input to the object recognition model as an enriched feature set along with the corresponding image itself for which objects are to be detected. Some embodiments may classify scenes according to various exclusive or non-exclusive attributes. For example, exclusive attributes may indicate whether an image depicts a scene that is indoors or outdoors, while non-exclusive attributes may classify the scene as a living room decorated for a holiday. The output from the scene classification model may be passed to an object recognition model along with the image for which the scene was classified.

In some embodiments, the object recognition model is trained to recognize (e.g., classify and locate) objects in an ontology of objects, only a small (e.g., less than 0.1%) subset of which may appear in any given image in some cases. Each object in the ontology may have associated therewith a context vector having dimensions indicative of a correlation of that object with a respective context classification (e.g., in the same taxonomy (or other ontology) as is applied by the scene classification model). In some cases, the object recognition model may be trained on a training data set in which both objects depicted are labeled and scenes are labeled according to the context (e.g., scene) ontology or taxonomy, such that the object recognition model is responsive to both pixel values and context classifications when recognizing objects.

In some cases, the context classification model is separately trained from the object recognition model. For example, the context classification model may be trained in a distinct training operation in which a distinct objective function is optimized that differs from the object function to be optimized during training of the object recognition model. As another example, the context classification model may be trained using a different labeled training set of images than that of the object recognition model. The context classification model and the object recognition model may then be combined further down the pipeline of models for classification. Or in some cases, the object recognition model and the context classification model are jointly optimized.

In some embodiments, the context of an image may be identified using metadata obtained with the image. For example, the obtained metadata may include geographic information, ambient lighting information, directionality information, etc. For instance, the metadata may be obtained from geo-positional sensors, motion sensors, ambient light sensors, and other sensors located on a mobile computing device used to capture an image, in communication with the mobile computing device, or a combination thereof. As an example, global positioning data may be used to identify and confirm whether a background of an image includes snow (e.g., by determining a geographical position of the mobile computing device and determining whether that geographical region experienced snowfall recently). If so, this may indicate that it is likely wintertime, and so a vertical of clothing with a focus on winter coats or winter products may be more relevant form a search perspective. Thus, the vertical of clothing with a focus on winter coats or winter products may be upweighted when performing a visual search for an object detected within the image. In some embodiments, metadata may be generated to reflect the context of the image. For example, if an image is taken in a kitchen, then there is a higher likelihood that the item to be searched for is a kitchen-related item. In some embodiments, labels indicative of the context may be obtained and used to either (1) restrict a search to be narrowed to items only related to the identified context's label, or (2) apply a weight to the search to weigh items related to the identified context's label greater than items not related to the identified context's label. The weighting may be accomplished by adding an additional dimension to the feature space or by attaching a multiplier to the distance of certain items.

In some embodiments, upon receiving an image, objects and regions of interests (ROIs) may be detected from the image. The objects and ROIs may be run through a first set of classifiers to identify characteristics such as, but not limited to, pattern, color, material, category, vertical, logo, etc. The information obtained from the first set of classifiers may be provided with the ROIs to a deep learning model to extract a set of features for a given ROI. The information from the first set of classifiers may be used to supplement the features searched against the database of items. The entire image may be used to classify context and then the classified context of the image may be used for identifying additional labels associated with each ROI detected in the image. In some embodiments, after using the context to identify labels associated with each ROI, a weighted or narrowing search against an object database of items may be performed to identify an object or objects that match the features of the ROI(s) based on the extracted context.

In some embodiments, the system may loop back and use the identified objects from the ROI to further refine the context information. In other words, after identifying the object(s) from the search and the context of the original image, the model can go back and use the images for refining the classifiers for the explicit categories to better understand the aspects that encompass different contexts.

In some embodiments, a context classification model, such as a scene classification model, may be a unified ontology of retail, where retail can encompass various items, products, or services that are searchable and capable of being obtained (e.g., purchased). In some examples, a scene classification model may be configured to identify (e.g., classify or otherwise determine) a vertical to which an image relates. For example, a scene classification model may identify whether an image is related to a fashion vertical, food/beverage vertical, financial vertical, media vertical, technology vertical, etc., based on the scene classified as being depicted by the image. Based on the identified vertical, different attributes (e.g., scores for dimensions) may be added to a feature vector (e.g., increasing its dimensionality) for an object recognition model, or different extant attributes of the feature vector may be weighted based on the vertical (e.g., by scaling the size of various scalars). For example, if (e.g., in response to determining that) an image is identified as being part of the home improvement vertical, then attributes associated with home improvement products, such as saws, drills, hammers, etc., may be added to a feature vector for classifying objects within the image, or the attributes may be upweighted in the object recognition model. In some embodiments, attributes that are not associated with the vertical may be removed from the feature vector or down-weighted. Continuing the previous example, attributes associated with food products may be removed from a feature vector for classifying objects within the image if the image was identified as being part of the home improvement vertical, or attributes associated with food products may be down-weighted in the object recognition model. As another example, in the home improvement vertical, certain features may be irrelevant or have less importance for classifying an object (e.g., pattern), whereas if the scene classification model identified the vertical as being the fashion vertical, then such features may be more relevant for object classification.

In some embodiments, the object recognition model following the context classification model may recognize (e.g., classify, locate, etc.) objects in an ontology of objects that includes cross-reference information connecting objects of one hierarchy to objects in another hierarchy (e.g., in a knowledge graph). For example, if a scene classification model identifies that an image has a garage background and includes a hammer, the scene classification model may access the knowledge graph, select adjacent nodes to hammer having edges indicating complements, and determine that nails are connected to hammers. Some embodiments may increase a weight in the object recognition model for a feature or features related to nails. In some embodiments, a graph may be built from objects detected using a scene classification model, the object recognition model, or both, as a series of single purpose rules. In some embodiments, the graph may be built by extracting information from previously obtained data. For example, a retailer may provide a product catalog that includes product information such as name, description, category, etc., and some embodiments may extract node identifiers and relationship edges for a knowledge graph based on natural language text in the catalog. The graph may even further be enhanced by obtaining information related to a product available through publicly accessible resources, such as the Internet. For instance, some embodiments may crawl Wikipedia or other websites and determine relationships based on term-frequency inverse document frequency (TF-IDF) (e.g., BM25) scores and co-occurrence rates in webpages of terms relating to the nodes, for example by detecting that hammer and nail tend to co-occur, for instance with relationships determined based on (e.g., for those with less than a threshold) distance determined with latent semantic analysis or word2vec (e.g., cosine distance, Minkowski distance, Euclidian distance, or the like). Or these techniques may be applied to co-occurrence of objects in images (e.g., hammers occurring frequently in images with nails and rarely in images without nails may cause embodiments to add an edge to a knowledge graph between a node representing a hammer and a node representing a nail). The graph therefore may be built to include various available information relating to a particular product. When an image is captured and an object or pair of objects is/are identified therein, a likely context for that image may be determined, and the search space for that object may be narrowed or portions of the search space may be more heavily weighted. As an example, if an image of a slice of pizza is captured, the slice of pizza may be identified using the object recognition model. To recommend products to a user, the context may be used to determine that providing products related to purchasing a slice of pizza are less optimal (e.g., because the user already has a slice of pizza), as opposed to information like a food blog, nutritional information, recipes, etc. Using the contextual information surrounding the captured image, the connected features may be used to curate the decisions, recommendations, and actions provided to a user to enhance user experiences.

Tap-to-Search

Existing computer-vision object recognition and localization approaches often fail to align with user-intent when processing an image. In some cases, this is because an image depicts many objects and there is no clear indication of which one prompted the user to select (e.g., capture) the image. And in some cases, such processes suffer from lower accuracy and are more computationally expensive than desirable. Various phenomena contribute to errors, including, but not limited to, blurring, irrelevant objects in a camera's field of view (FOV), novel camera poses relative to a training data set, suboptimal lighting in run-time images, etc. These issues are compounded by many of the aforementioned issues with respect to training data set sizes being limited while object ontology being large.

To mitigate some of the above-described problems, some embodiments may leverage an additional channel of information beyond the image itself to improve object detection, object recognition, object selection, or any combination thereof. Some embodiments may use input information, such as touch location or eye gaze location, to reduce the search space of an image (or modulate the amount of computational effort expended in different areas of the image) when detecting objects therein or inferring user intent from images with multiple objects. Some embodiments may determine whether (and in some cases where) objects appears in an image based on a location of a detected input from a user on a displayed user interface, like a touch screen, an eye gaze sensor, or a pointer in an augmented reality or virtual reality interface. Additionally, or alternatively, some embodiments may select an object among such objects depicted within an image based on a location of the detected input. This is expected to accommodate use of less robust object recognition models based on smaller training sets than versions of such models trained on larger training sets, as the set of inputs may be constrained by the added channel, and in some cases, the search space may be reduced by narrowing which pixels in an image are pertinent to a search. For instance, noise from objects at the periphery of a touch location may be discarded based on the touch location.

In some embodiments, a user may open a search application on their user device to search for information related to an item, like an object that may appear in an image. The application (like a native application on a mobile computing device) may cause a camera on the mobile computing device to sense an image in a field of view (FOV) of the camera (or set of cameras in systems implementing computational photography) and display the image (e.g., a single image or video) sensed by the camera in a user interface (UI) of the application.

In some embodiments, a user may tap (or otherwise select pixel coordinates) on the display screen that displays the UI to cause an image representing the displayed contents to be captured. In some cases, the input may generate a UI event, like an on-touch event, a touch-release event, a draw-circle event, or the like, and the event may include various parameters, like pixel coordinates. In some cases, a coordinate location of where the input was detected on the display screen may also be obtained. Some embodiments may execute an event handler that receives this event and causes responsive actions, like storing the image displayed while the event was received in memory and associating the image with the event in memory.

In some embodiments, the captured image (or set of images, such as those in a video preceding or following (or both) a frame in which the event occurred) and the coordinate location (or other parameters of the UI event) may be provided to a computer-vision object recognition system (which in some cases, may be an object detection and localization system). The object recognition system, which may include or use an object recognition model, may output a score for an object in an ontology of objects indicative of a confidence level that the object was recognized (e.g., the object was detected in the image, the object was selected, or both, where selection indicates that the selected object accords with the user's intent). Some embodiments may output such scores for each of a plurality of objects in an object ontology (e.g., in an object detection vector) and, in some cases, bounding polygons (with vertices expressed in pixel coordinates) of each object. For example, a feature vector may be generated from an input image, where dimensions correspond to features (like edges, blobs, corners, colors, and the like) in the input image. The feature vector may be input into a discriminative computer vision object recognition model, which may match the feature vector to a closest feature vector of an object in a labeled training set of images. Some embodiments may select an object having a highest score based on such a distance (e.g., upon determining the distance is greater than a threshold) as the object in the image. In some embodiments, the score may be used to select an object to be searched for (e.g., against a product catalog or object database). In some embodiments, data associated with the detected event may be used as training data for training an object recognition model to perform object recognition.

In some embodiments, multiple inputs may be detected. For example, two taps on a display screen at two different locations may indicate two different searches to be performed. As another example, a multiple-tap gesture (or pinch gesture or circle event) may indicate a boundary polygon (e.g., box) of an item or items to be searched. As still another example, a front-facing camera may be employed to detect eye gaze, which may also be used to determine an object of interest of the user. In some cases, a user may place an object, like their hand, in a field of view of the camera capturing the image in which objects are to be detected, and the user-placed object may indicate pixel coordinates. For example, by sticking out one's arm and pointing at an object within the field of view of the camera, the hand may appear in the image being processed. In some embodiments, human pose estimation may also be used to determine an object of interest of a user. For example, the OpenPose architecture may be used to identify, from an image, different portions of a human body (e.g., a hand, a face, a leg, etc.), and a determination may be made as to whether the identified portions are directed towards an object depicted within the image.

The image displayed on the UI may include an object or objects with which the user would like to search for and obtain information. In some embodiments, the UI may not include an explicit image capture button. In other words, the entire UI may display the contents viewed by the camera, and no capture image button physically or virtually may be available. In some embodiments, multiple objects may be recognized as being present within the input image, and the coordinate location of the user input (e.g., tap input) may be used to select one of the objects as being reflective of the user's intent based on the location of the user input in pixel coordinates (e.g., selecting the object having a centroid with a closest location to the touch location in pixel coordinates. In some embodiments, a distance from an input's coordinate location with respect to one or more bounding boxes may serve as an additional input for determining an object of interest for the user.

In some embodiments, a visual search system may obtain the image and coordinate location information. The visual search system may extract features from the image and determine, based on locations of objects depicted by the image and the coordinate location information, a likely object (or other type of object) of interest for which the user is searching. Each object detected within the image may be reverse weighted with respect to the coordinate location information, and the object that is most proximate to the coordinate location information may be selected as the likely object of interest. For example, scores of an object recognition model may be adjusted based on the reverse weighting such that a first object for which the model indicates a lower confidence (indicated by a lower) score is selected over a second object with a higher confidence based on the first object being depicted in the image closer to the touch location than the second object (e.g., by multiplying the score by the reverse weighting).

Information about the object may be retrieved by the visual search system and may be provided to the computing device with which the input was detected. For instance, embodiments may access an index keyed to object identifiers (e.g., stock keeping units (SKUs)), and may retrieve and present records related to the object, including a URL of a merchant's website at which the object can be purchased, descriptions of products corresponding to the object, related objects, reviews, and the like. Identifiers of detected objects may be used to a variety of ends, including input to queries in search applications (like product recommendation application), selection of items in augmented reality interfaces, and selections of items for language translation applications that return a name of objects in an image.

In some embodiments, tap point information (or coordinates of other forms of user input) may be used to enhance or selectively process an image prior to being provided to a server. For instance, enhancement may be performed on-device (e.g., on a computing device) to a portion of an image centralized around the tap point. Such enhancements may include light balance enhancement and shadow removal (e.g., embodiments may transform an image in a raw file format (having a relatively wide color gamut) into a file format in a positive file format (having a narrower color gamut), and tradeoffs in white balance, intensity, and other pixel values may be made to favor areas of an image near (e.g., within a threshold distance of, like less than 10%, less than 20%, or less than 50% of an images width in pixels) a touch location. Additionally, patterns and colors may be detected within a region of the image where the tap point is located, which may be used to select an object from an object ontology. In some embodiments, the enhancement or other form of processing may be performed additionally or alternatively by server-side operations of a search system. This may balance the tradeoff between reducing the processing time associated with server side image processing and latency issues associated with transmitting high-quality images to the server.

In some embodiments, the coordinate location of a tap point may be used to compress portions of an image non-proximate to the coordinate location. For example, an image may be segmented into portions (e.g., blocks), and portions further than a threshold distance (like those examples above) from the tap point may be compressed with a first amount of loss, while the portions proximate the tap point may be compressed with a second (e.g., smaller or zero) amount of loss. In some embodiments, the quantization matrices for the compression algorithm may be changed for different portions of the image, which may address file size issues that can increase latency.

For example, in some embodiments, images may be adjusted within the image to reduce bandwidth and memory usage relatively to implementations that naively upload all captured images. Some embodiments may crop images to exclude portions not depicting the object adjacent a tap point or further than a threshold distance from a tap point or other coordinate of user input on a screen (e.g., outside a bounding box of the object in question). Some embodiments may modulate image compression within a frame based on the location of an object. For instance, some embodiments may compress images with a lossy compression algorithm (like JPEG, etc.), and the amount of data loss within different areas of the frame may be modulated such that areas of an image within a threshold distance of a tap point or detected object corresponding thereto (like where the object is detected based on a tap point) have less loss of data (and thus lower compression ratios) while areas not depicting the object or further from the tap point have greater loss of data (and thus higher compression ratios). For example, some embodiments may select different quantization matrices for different areas (e.g., square blocks in a tiling) of an image to modulate data loss/compression (e.g., before dividing a discrete cosine transform coefficient matrix by the quantization matrix in an element-by-element division and rounding to the nearest integer), such that larger values in the quantization matrix tend to result in zero values in the result, and more prevalent use of larger values corresponding to higher frequency components tend to increase compression ratios, thereby increasing efficiency of subsequent run-length encoding of the result. By conserving processing capabilities to only a portion of the image surrounding the tap point and not the entire image, the local processing power may be conserved for only the portion of the image identified as being of interest.

In some embodiments, aspects of a visual search may be executed on client-side (e.g., on a mobile computing device), such as the bounding box proposal aspect of an object detector. For instance, the visual search system may detect the presence of an object within a bounding box, but may not be able to identify the object. In some embodiments, after placing the bounding box around a detected object, computational enhancement techniques may be applied to improve the quality of the portion of the image including the bounding box (e.g., contours, color schemes). Furthermore, the distance from the tap point's coordinate location to a centroid of the bounding box may be computed, and the bounding box may be extended.

As mentioned above, a compressed image may initially be sent to a server for initial processing. In some embodiments, one or more additional images may be obtained in the background, either spatially or temporally, and these images may subsequently be provided to the server as part of the same image processing job as that of the initially provided (compressed) image. By doing so, different objects, backgrounds, contexts, and visualization aspects (e.g., lighting, angle, etc.) may be analyzed in parallel processing with the initially sent image. As an example, an initial image sent to the server may be analyzed to identify a candidate object or objects depicted within a portion of the image surrounding a tap point (a term used generally herein and which should be read as also disclosing coordinates on a display or image corresponding to the other types of user input mentioned). As the initial image is processed, one or more background images may also be captured and provided to the server, and information associated with the background may be used to refine and clarify the candidate item or items that possible were detected in portion of the image surrounding the tap point (e.g., scene classification information indicating a scene within the image).

On the client-side (e.g., on a mobile computing device), object tracking associated with a coordinate location of a tap point may be used to obtain depth information associated with an object. In some embodiments, an object depicted within an image displayed by the UI may be tapped, and in response to the input, a search anchor may be attached to the object in a 3D virtual space. Subsequent movements of the mobile computing device, the object, or both, may be detected and depth information indicated the relative distance from the object to the mobile computing device may be determined on the mobile computing device to provide a relatively low-latency augmented reality display based on the depth information.

Furthermore, in some embodiments a scene graph may be generated to connect contextual information and a detected object to resolve an identity of the object. For example, if an object detected in a background of an image is a stove or microwave, and the object detected proximate to the tap point is identified as possibly being a fork, then this may indicate that the contextual information indicates that a user is likely in a kitchen. Similarly, if a hammer is detected in a same image as other home improvement images (e.g., a drill, saw, etc.) then this may indicate an increased likelihood that the user is currently in a garage. The scene graph may encompass this information to describe the scene with which the image is captured, which may further help in object identification, product recommendation, and contextual analysis.

FIG. 1 illustrates an example system for recognizing an object depicted within an image, in accordance with various embodiments. In some embodiments, system 100A may include a computer system 102A, a mobile computing device 104A, a kiosk device 106A, databases 130A, and other components, each of which may be configured to communicate with one another via one or more networks 150A (e.g., the Internet, an Intranet, etc.). In some embodiments, computer system 102A may be a mobile computing device, which is the same or similar to mobile computing device 104A, however computer system 102A may also refer to a server-side system that receives data from one or more devices (e.g., mobile computing device 104A, kiosk device 106A), and outputs data to the devices. Although a single instance of kiosk device 106A and mobile computing device 104A is included by system 100A, additional instances of kiosk device 106A and mobile computing device 104A may be present, and are not illustrate so as to simplify the depicted system components. Further still, while only a single computer system 102A is illustrated, the functionality of computer system 102A may be replicated on multiple instances of computer system 102A, shared across such instances of mobile computer system 102A, distributed across multiple instances of computer system 102A, and the like.

In some embodiments, computer system 102A may include a context classification subsystem 112A, an object recognition subsystem 114A, a model subsystem 116A, a visual search subsystem 118A, an input determination subsystem 120, a distance determination subsystem 122A, and other components. As mentioned above, some or all of the aforementioned subsystems (e.g., subsystems 112A-122A) may be offloaded to a mobile computing device (e.g., mobile computing device 104A), computer system 102A may be a mobile computing device, or both. Therefore, while the functionalities of each subsystem may be described in the context of being performed client-side or server-side, the functionalities of these subsystems are not restricted to be performed only client-side or only server-side.

In some embodiments, context classification subsystem 112A may be configured to classify a context of an image based on a context classification model. As described herein, a context of an image may include, but is not limited to, a scene depicted by an image, geographical information regarding where an image was captured (e.g., from one or more location sensors resident on a device used to capture the image), temporal information indicating a time that an image was captured, input information regarding inputs detected by a device used to capture an image, user information related to a user operating a device used to capture the image, and so on. In some embodiments, scene classification may refer to a process whereby objects depicted by an image, the layout of those objects within the image, and ambient contextual information, are used to determine a scene of an image. A "scene," as defined herein, may refer to a view of a real-world environment that includes multiple surfaces and objects, which may be organized in a meaningful way. A scene may represent one type of context, and may refer to a physical place (e.g., a geographical location, such as a landmark, address, point of interest, etc.), a type of place (e.g., a home, a school, an office, etc.), a sub-type of place (e.g., a bedroom within a home, a garage of a home, a classroom within a school, etc.), background information (e.g., trees, snow, bodies of water), or any other information, or any combination thereof. For example, context classification subsystem 112A may be configured to determine, based on an input image and a scene classification model, that the image depicts a snow-covered field.

In some embodiments, context classification subsystem 112A may be configured to classify an image as including, describing, being related to, or a combination thereof, a context or contexts of a context ontology including a plurality of contexts. For example, a context ontology may include a scene ontology, a geographical ontology, a season ontology, and so on. In some embodiments, a scene classification model may refer to a genre of context classification models configured to classify an image as depicting a scene from a scene ontology including a plurality of scenes, each scene from the scene ontology being labeled with a scene identifier of the scene. As described below, with respect to model subsystem 116A and training subsystem 120, a context classification model may be trained to classify an input image as depicting a context from the context ontology using a training data set including a plurality of images including different contexts. In some embodiments, context database 132A may include different contexts with which an image may be classified. For example, context database 132A may include different scenes that an image may be classified as depicting.

In some embodiments, context classification subsystem 112A may obtain a trained context classification model, such as a trained scene classification model, from model database 138A. The scene classification model may be a convolutional neural network (CNN) including a plurality of layers (e.g., 4 or more layers, 5 or more layers, 6 or more layers, 8 or more layers, etc.), which may form a portion of a deep neural network for classifying, or recognizing, a scene. In some embodiments, the CNN may include, in addition to the plurality of convolutional layers, a number of batch normalization layers, a number of ReLU layers, a number of max-pooling layers, one or more fully-connected layers, and one or more Softmax layers. One example of a CNN used to perform automatic scene classification is AlexNet. The AlexNet architecture includes five convolutional layers and three fully connected layers, and a Softmax layer following the last fully connected layer to output a classification distribution, with a ReLU non-linearity applied to the output of every convolutional layer and every fully connected layer. However, the scene classification model used by context classification subsystem 112A may include a same, fewer, or more convolutional layers and fully connected layers. In some embodiments, the kernels may be grouped together as residual blocks, and the kernels may be 1×1, 3×3, 5×5, or other sizes.

In some embodiments, context classification subsystem 112A may output a classification vector including weights representative of the contexts determined for a given input image based on the context classification model. In some embodiments, the classification vector may upweight (e.g., if all weights are initialized to zero) features of the classification vector that were determined to be represented by the image. For example, an image depicting a snow-covered field may have a vector element associated with winter scenes upweighted (e.g., to a non-zero positive value), whereas a vector element associated with a desert or a beach may remain at its initialized value (e.g., zero). In some embodiments, additional features may be added to a feature vector for object recognition based on the contexts identified by context classification subsystem 112A.

In some embodiments, context classification subsystem 112A may receive an image and output a context classification vector indicative of a confidence that the image depicts a particular context. For example, an image captured by an image capture component (e.g., a camera) of computer system 102A, mobile computing device 104A, or kiosk device 106A may be provided to context classification subsystem 112A. Upon receiving the image, context classification subsystem 112A may retrieve a context classification model from model database 138A (e.g., a scene classification model), input the image to the context classification model, and obtain an output from the context classification model of a context classification vector. For instance, context classification subsystem 112A may use a scene classification model to output a context classification vector indicative of a confidence that the image depicts a particular scene. This context classification vector, or a portion of that vector associated with the scene (e.g., a scene classification vector), may be input to an object recognition model as an enriched feature set along with the corresponding image itself for which objects are to be detected.

In some embodiments, context classification subsystem 112A may be configured to receive object identifiers of objects depicted within an image by object recognition subsystem 114A, which may serve, with the classified context vector, as inputs to the context classification model to determine whether the identified context should be updated. For example, a scene classification model may determine a scene of an image, which may be provided to object recognition subsystem 114A. Based on the scene and the image, one or more objects may be recognized within the image. The image, the identified objects, and the initial scene may then be provided back to context classification subsystem 112A to determine whether the scene was correctly classified, and, if not, a new scene to classify the image as depicting based on the objects. As an example, initially, a scene classification model may classify an image as depicting a winter scene, and may assign a winter classification label to the image. The winter classification label and the image may be provided to an object recognition model, which may determine, based on the winter classification label and the image, that a tree is depicted within the image and may assign a tree identification label to the image. Subsequently, the tree identification label, the winter classification label, and the image may be provided back to the scene classification model. The scene classification model may then determine, based on the winter classification label, the tree identification label, and the image, that the image depicts a winter holiday scene, and may update the image with a winter holiday scene classification label.

In some embodiments, object recognition subsystem 114A may be configured to recognize one or more objects depicted within an image. Object recognition subsystem 114A may obtain the image to be analyzed from mobile computing device 104A or kiosk device 106A, or alternatively, the image may be captured by a camera or other image capture component of computer system 102A. In some embodiments, the image as well as a context classification vector may be obtained by object recognition subsystem 114A for performing object recognition. For example, a scene classification vector output from context classification subsystem 112A may be obtained with an image depicting one or more objects, both of which may serve as inputs for object recognition subsystem 114A.

In some embodiments, object recognition subsystem 114A may retrieve an object recognition model from model database 138A. The object recognition model may be a trained object recognition model trained using a training data set of objects from an object ontology, such as an object ontology stored in object database 134A. Each object from the object ontology may be labeled with an object identifier of a corresponding object. In some embodiments, the object recognition model may be a convolutional neural network (CNN) including a plurality of convolutional layers, one or more fully connected layers, one or more non-linearity layers, and one or more pooling layers. The object recognition model may receive an input image, and some embodiments may also include receiving a context classification vector (e.g., a scene classification vector), which may serve as inputs to the object recognition model. The output of the object recognition model may be one or more object identifiers indicating objects recognized as being present within a given image. In some embodiments, outputs from object recognition subsystem 114A may be provided to context classification subsystem 112A for determining a confidence level of the previously identified context responsive to the object(s) identified within the image, and if the confidence level is less than a confidence threshold level (e.g., less than 75%, less than 80%, less than 90%, etc.) then context classification subsystem 112A may be configured to recompute a context of the image using the initial context, the image, and the identified object identifier(s) as inputs. For example, initially a scene classification model may classify an image as depicting a winter scene, and may assign a winter classification label to the image with a first confidence level (e.g., a confidence score). The winter classification label and the image may be provided to an object recognition model, which may determine, based on the winter classification label and the image, that a tree is depicted within the image and may assign a tree identification label to the image with a second confidence level (e.g., a confidence score). Subsequently, the tree identification label, the winter classification label, the first and second confidence levels, and the image may be provided back to the scene classification model. The scene classification model may determine that the confidence level assigned to the scene (e.g., winter classification label) is less than a threshold value, and therefore may analyze the image again to determine if an updated scene for the image may be determined. Therefore, based on the winter classification label, the tree identification label, and the image, the scene classification model may determine the image depicts a winter holiday scene with a higher confidence level than the initial confidence level for the scene, and may update the image with a winter holiday scene classification label.

In some embodiments, object recognition subsystem 114A may be configured to detect the presence of one or more additional objects within an image based on an object recognized within the image. For instance, the output of a computer-vision object recognition model may be provided as reference feedback to determine whether any other objects are depicted by the image. For example, an object recognition model may determine that an image depicts a first object with a first confidence level, and a second object with a second confidence level. If the first confidence level exceeds a threshold confidence level, then the object recognition model may assign a first object identifier of the first object from an object ontology to the recognized first object. However, if the second confidence level is less than the threshold confidence level, then the object recognition model may not assign an object identifier to the second object. In this example, the first object identifier, the image, and a context classification vector (e.g., the context of the image determined by a context classification model), may be looped back into the object recognition model to determine, based on the new inputs, whether the second object can be identified. If so, the object identifier for the second object may then be assigned to the second object.

In some embodiments, one or more post-image analysis processes may be performed to the image to enhance the image and perform additional, or subsequent, object recognition analysis to the enhanced image. For example, if an image is determined to include a first object at a first location within the image, the image may be cropped about a region of interest (ROI) centered about the first location, the region of interest may have its resolution, clarity, or prominence increased, or portions of the image not included within the region of interest may be compressed or otherwise have their resolution downscaled. The enhanced may then be provided as an input to the object recognition model to determine whether a second (or other) object is recognized within the enhanced image, and if so, an object identifier of the second object may be assigned to the second object.

In some embodiments, context classification subsystem 112A and object recognition subsystem 114A may extract visual features describing an image to determine a context of the image and objects depicted by the image. In some embodiments, the process of extracting features from an image represents a technique for reducing the dimensionality of an image, which may allow for simplified and expedited processing of the image, such as in the case of object recognition. An example of this concept is an N×M pixel red-blue-green (RBG) image being reduced from N×M×3 features to N×M features using a mean pixel value process of each pixel in the image from all three-color channels. Another example feature extraction process is edge feature detection. In some embodiments, a Prewitt kernel or a Sobel kernel may be applied to an image to extract edge features. In some embodiments, edge features may be extracted using feature descriptors, such as a histogram of oriented gradients (HOG) descriptor, a scale invariant feature transform (SIFT) descriptor, or a speeded-up robust feature (SURF) description.

In some embodiments, the feature extraction process may use deep learning processing to extract features from an image. For example, a deep convolution neural network (CNN), trained on a large set of training data (e.g., the AlexNet architecture, which includes 5 convolutional layers and 3 fully connected layers, trained using the ImageNet dataset) may be used to extract features from an image. In some embodiments, to perform feature extraction, context classification subsystem 112A and object recognition subsystem 112A may obtain a pre-trained machine learning model from model database 138A, which may be used for performing feature extraction for images from a set of images provided to computer system 102A. In some embodiments, a support vector machine (SVM) may be trained with a training data to obtain a trained model for performing feature extraction. In some embodiments, a classifier may be trained using extracted features from an earlier layer of the machine learning model. In some embodiments, preprocessing may be performed to an input image prior to the feature extraction being performed. For example, preprocessing may include resizing, normalizing, cropping, etc., to each image to allow that image to serve as an input to the pre-trained model. Example pre-trained networks may include AlexNet, GoogLeNet, MobileNet-v2, and others. The preprocessing input images may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in memory (e.g., within training data database 136A as an update to training data set for training an object recognition model, a context classification model, etc.). In some embodiments, a feature vector describing visual features extracted from an image may be output from context classification subsystem 112A and object recognition subsystem 114A, which may describe one or more contexts of the image and one or more objects determined to be depicted by the image. In some embodiments, the feature vector, the input image, or both, may be used as an input to a visual search system (e.g., visual search subsystem 124A) for performing a visual search to obtain information related to objects depicted within the image (e.g., products that a user may purchase).

In some embodiments, model subsystem 116A may be configured to retrieve models stored within model database 138A, provide the retrieved models to one or more subsystems for analyzing an image or set of images (e.g., to context classification subsystem 112A, object recognition subsystem 114A, etc.), as well as to train one or more models and generate training data for training the one or more models. For example, model subsystem 116A may be configured to train a context classification model to be used by context classification subsystem 112A, an object recognition model to be used by object recognition subsystem 114A, and the like. In some embodiments, model subsystem 116A may build or assist in the build of a given model.

In some embodiments, model subsystem 116A may train a context classification model based on a training data set including a plurality of images having different contexts, where each image includes a label corresponding to the context of that image. For example, the context classification model may include a scene classification model, which may be trained on a training data set including a plurality of images depicting various scenes, where each image includes a label of the scene depicted by that image. In some embodiments, the training data set may be stored in training data database 136A, and model subsystem 116A may be configured to retrieve the training data set for training the context classification model. However, some embodiments may also include model subsystem 116A generating the training data set by obtaining images labeled with different contexts from context database 132A. For instance, context database 132A may include various sets of images, where each set of images is related to a context (e.g., a scene), and may be used to train a context classification model. In some embodiments, context database 132A may include a set of images depicting various scenes, which may be used to generate training data for training a scene classification model. An example set of images depicting various scenes labeled with scene identifiers of those scenes include the Places365-Standard data set, which includes over 10 million images having over 400 different categories.

In some embodiments, model subsystem 116A may train an object recognition model based on a training set including a plurality of images depicting different objects, where each image is labeled with an object identifier of the object from an object ontology depicted by the image. In some embodiments, the computer-vision object recognition model may be generated to specifically recognize the objects depicted by the images within a training data set. For example, a propriety visual search system may train an object recognition model to recognize a particular set of objects within input images (e.g., an object recognition model trained to recognize hardware tools in images, an object recognition model trained to recognize furniture in images, a facial recognition model trained to recognize human faces in images, etc.). In some embodiments, the computer-vision object recognition model may be a deep learning network including a plurality of layers, such as a plurality of convolutional layers, a plurality of pooling layers, one or more SoftMax layers, and the like.

Some embodiments may include the trained computer-vision object recognition model having parameters that encode information about a subset of visual features of the object depicted by each image from the training data set. For example, by training the computer-vision object recognition using the training data set, weights and biases of neuron of a neural network (e.g., a convolutional neural network, a discriminative neural network, a region-based convolution neural network, a deep neural network, etc.) may be adjusted. The adjustment of the weights and biases, thus the configurations of the parameters of the object recognition model, enable the object recognition model to recognize objects within input images. For example, for a given input feature vector, generated from features extracted from an image, the model is able to identify an identifier of the object depicted by an image, where the identifier corresponds to one of the identifiers of the objects from the training data set, and a location of the object within the image. Furthermore, the subset of visual features of each object, with which the parameters are encoded with information about, is determined—for each object—based on the extracted visual features from a corresponding image depicting that object. For example, the subset of visual features may include localized gradients for edge detection of each image, a mean pixel value for a multichannel color image, and the like.

In some embodiments, the context classification model, the object recognition model, or both, may be a deep learning model, such as, and without limitation, a convolutional neural network (CNN), a region-based CNN (R-CNN), a Fast R-CNN, a Masked R-CNN, Single Shot Multibox (SSD), and a You-Only-Look-Once (YOLO) model (lists, such as this one, should not be read to require items in the list be non-overlapping, as members may include a genus or species thereof, for instance, a R-CNN is a species of CNN and a list like this one should not be read to suggest otherwise). As an example, an R-CNN may take each input image, extract region proposals, and compute features for each proposed region using a CNN. The features of each region may then be classified using a class-specific SVM, identifying the location of any objects within an image, as well as classifying those images to a class of objects.

In some embodiments, the context classification model, the object recognition model, or both, may be optimized for use on a mobile computing device. For example, the context classification mode, the object recognition model, or both, may be generated using a neural network architecture that runs efficiently on mobile computing devices (e.g., smart phones, tablet computing devices, etc.). Some examples of such neural networks include, but are not limited to Mobile-Net V1, MobileNet V2, MobileNet V3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster. Generally, neural networks running on mobile computing devices include a stack or stacks of residual blocks. Each residual blocks may include an expansion layer, a filter layer, and a compression layer. With MobileNet V2, three convolutional layers are included, a 1×1 convolution layer, a 3×3 depthwise convolution layer, and another 1×1 convolution layer. The first 1×1 convolution layer may be the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. In Mobile Net V2, the compression layer includes another 1×1 kernel. Additionally, with MobileNet V2, there is a residual connection to help gradients flow through the network and connects the input to the block to the output from the block.

In some embodiments, visual search subsystem 118A may be configured to perform, or facilitate the performance of, a visual search. In some embodiments, visual search subsystem 118A may include a computer vision search system that obtain an input image, a feature vector describing the input image, object identifiers of an object or objects depicted within the image, context classifications of a context or contexts described by the image, or a combination thereof, and retrieves object information for the object(s) and context(s) of the image. For instance, visual search system 118A may access search index database 140A, which stores information regarding objects (e.g., products, services, etc.). In some embodiments, search index database 140A may be organized as an index of object identifiers, context identifiers, and object information. For example, each object identifier (e.g., a SKU of a product) may be associated with an object from an object ontology, and information regarding the corresponding object identifier (e.g., a URL of a merchant website where the object can be purchased, descriptions of the object, objects that are related to that object, etc.). When an image, object identifiers, feature vectors, context classifications, a combination thereof, is provided to visual search subsystem 118, search index database 140A may be queried, and the information related to the identified objects may be retrieved and returned to visual search subsystem 118A and provided to a user.

In some embodiments, visual search subsystem 118A may generate training data for training a visual search system, and may cause the visual search system to be trained. For instance, a training data set may be generated that includes object identifiers of objects depicted within images, features extracted from images, or both. The training data set may be stored within training data database 136A and used to train the computer-vision visual search system periodically, upon request, or both.

In some embodiments, input determination subsystem 120A may be configured to determine whether an input was detected by computer system 102A, mobile computing device 104A, or kiosk device 106A, a type of input that was detected, and an input location of the detected input. In some embodiments, different types of inputs may be detected by a computing device including, but not limited to, touch events, eye gaze events, object motion events, and the like.

Touch events may be detected by touch sensitive surfaces, and may be classified into various event types, such as, and without limitation, a touch event representing a single contact point on a touch-sensitive surface (e.g., via finger or stylus), a touch list event indicating a list of contact points on a touch-sensitive surface (e.g., multiple fingers), a touch start and touch end event (e.g., returning coordinates where a touch event begins and ends), a touch move event where one or more touch points are moved along a touch-sensitive surface, and so on. Each of these touch events may return coordinates or a set of coordinates in pixel-space of where the touch event occurred. As described herein, pixel-space corresponds to a location on a display screen where an input event (e.g., an on-touch event) was detected, where the location is described in terms of the pixels of the display screen that were interacted with. For example, if the display screen is a N pixel by M pixel array, the coordinates of the input may include a first coordinate along the N pixel direction and a second coordinate along the M pixel direction. In some embodiments, a scaling factor may be applied to input location to obtain the coordinates. For example, if a particular location of a touch screen is determined to have detected the input, this may relate to another point in pixel space, and the mapping of from the two different coordinates may be scaled by the scaling factor.

In some embodiments, pressure may also be detected by a touch-sensitive display screen. As an example, pressure sensitive device or pressure may be configured to determine an amount of pressure applied to a surface. Based on an amount of pressure, a characteristic of the input may be determined. In some embodiments, an amount of force that an input has may indicate a depth of focus of the image. For example, a hard touch may indicate a larger area of interest, whereas a soft touch may indicate a smaller area of interest, or vice versa. The amount of force, and the corresponding area that the input was detected by, may indicate what a user sought to select within an image, the user's focus or interest within an image, and the like.

In some embodiments, eye gaze may also be used as an input channel for determining a location of an input to a display screen. In some embodiments, eye gaze may include tracking a position and movement of an individual's eyes to determine a location on a display screen (or other surface) that an individual's focus is directed towards. A front facing camera may be used to monitor and track an individual's pupils, and based on the individual's depth from the camera (e.g., a distance from the camera), and vectors from the camera to each pupil, a reconstruction of the individual's focus vector may be determined. The direction of the individual's gaze may be resolved to a location on a display screen, which may correspond to a particular location of the individual's focus at a given instant. In some embodiments, the eye tracking may also include capturing, continuously at a given sampling frequency (e.g., 240 Hz, 400 Hz, 600 Hz, etc.), the individual's gaze direction and therefore the location of focus of the individual. In some embodiments, the eye tracking may determine whether the individual's focus has dwelled on a particular location for more than a predefined threshold amount of time. If so, this may indicate, or be classified, as an input associated with a particular location in pixel-space of the dwell.

In some embodiments, input determination subsystem 120A may be configured to perform gesture recognition to determine an input to a computing device. The gestures, for example, may include touchless gestures (e.g., no keyboard, mouse, or screen is touched) or semi-touchless gestures (e.g., an auxiliary device is held by a user). In some embodiments, one or more cameras, which may be 2D or 3D cameras) may be used to detect a motion of an individual and, based on that motion, determine an action of the individual and a location that the action is directed towards. In some embodiments, a particular gesture may be classified as being an input (e.g., a point-like gesture), and using the directionality of the gesture and a reconstruction of where the gesture relates on a display screen, an input location in pixel-space may be determined.

In some embodiments, distance determination subsystem 122 may be configured to determine a distance between an input location of an input detected by a display screen and a location of an object depicted within an image displayed by the display screen. Additionally, distance determination subsystem 122 may be configured to determine a distance between feature vectors of an object depicted within an image and an object from a training data set or object ontology, which may indicate a similarity between the objects.

In some embodiments, the distance between an input location of an input and a location of an object may be computed by determining coordinates of the input location and coordinates of the object in pixel-space. For example, an image depicting an object may indicate that the object is located in pixel-space at coordinates (X1, Y1), while the coordinates in pixel-space of the input location may be (X2, Y2). In some embodiments, a distance between the object and the input may be determined by computing a difference between a vector directed to coordinates (X1, Y1) and a vector directed to coordinates (X2, Y2). In some embodiments, if an image depicts multiple objects, a determination may be made as to a focus of the input (e.g., which object an individual intended to select) based on a distance between the coordinates in pixel-space of the input location of the input and the coordinates in pixel space of each object. The coordinates in pixel space of the object may correspond to a centroid of the object, however alternatively a nearest edge, a farthest edge, or other anchor point of the object within the image may be used.

In some embodiments, the distance between two feature vectors (e.g., a feature vector describing an image depicting an object obtained by computer system 102A and a feature vector describing an image depicting an object from the training data set) may be compared to a threshold distance. If the distance is less than or equal to the threshold distance, then the two images may be classified as being similar, classified as depicting a same or similar object, or both. For example, if a cosine of an angle between the two vectors produces a value that is approximately equal to 1 (e.g., $\cos(\theta) \geq 0.75$, $\cos(\theta) \geq 0.8$, $\cos(\theta) \geq 0.85$, $\cos(\theta) \geq 0.9$, $\cos(\theta) \geq 0.95$, $\cos(\theta) \geq 0.99$, etc.), then the two feature vectors may describe similar visual features, and therefore the objects depicted within the images with which the features were extracted from may be classified as being similar. In some embodiments, the distance may refer to a distance in an n-dimensional feature space between the feature vector representing an obtained image and a feature vector of a corresponding image from the training data set. For example, the distance computed may include a cosine distance, a Minkowski distance, a Euclidean distance, or other metric by which similarity may be computed.

Figure 2:
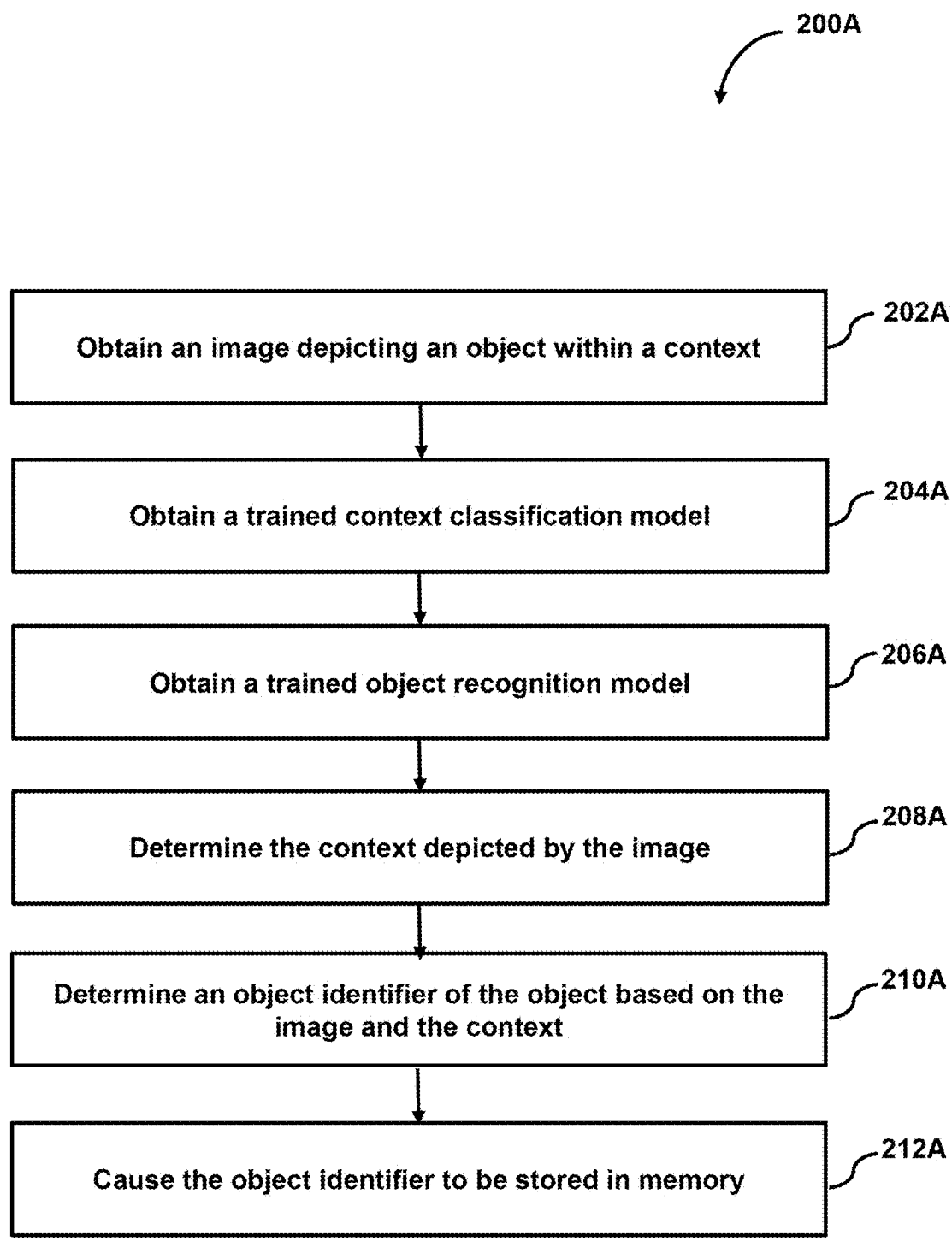
FIG. 2 illustrates an example process for recognizing an object depicted within an image based on a context of the image, in accordance with various embodiments.

FIG. 2 illustrates an example process for recognizing an object depicted within an image based on a context of the image, in accordance with various embodiments. In some embodiments, a process 200A may begin at step 202A. At step 202A, an image depicting an object within a context may be obtained. Some embodiments include obtaining the image from a camera of computer system 102A, mobile computing device 104A, kiosk device 106A, or any other device. For example, an individual may capture an image using mobile computing device 104A. In some embodiments, the image may depict one or more objects within a context, such as a scene. For example, the image may depict a hammer, nails, and saw within a garage. As another example, an image may depict a coat, skis, and a snowboard within an image of a snow-covered mountain. In some embodiments, the image may be provided to a visual search system for determining an identity of objects depicted within the image, as well as obtaining information regarding those objects (e.g., a name of the objects, where the objects may be purchased from, a material composition of the objects, etc.). In some embodiments, step 202A may be performed by a subsystem that is the same or similar to context classification subsystem 112A, object recognition subsystem 114A, or a combination thereof.

At step 204A, a trained context classification model may be obtained. Various context classification models may be stored in model database 138A. Each context classification model may be trained for a particular context. For example, one context classification model corresponds to a scene classification model. Context database 132 may store contexts from a context ontology including a plurality of contexts. In some embodiments, the context ontology may be organized into different types of contexts. For example, one type of context may be a scene, and a portion of the context ontology may be a scene ontology including a plurality of scenes. In some embodiments, the context classification model may be trained using a training data set including a set of images including different contexts, where each image is labeled with a context identifier of the context described by that image. For example, if the contexts are scenes, and the context classification model is scene classification model, the training data set may include a plurality of images of different scenes, where each scene is labeled with a scene identifier indicating a scene depicted within the corresponding image (e.g., a beach, a field, a garage, etc.). In some embodiments, the context identifiers may include a context classification vector in a continuous vector space, where the vector includes null values for all elements except for the element corresponding to the context (or contexts) depicted by a given image. For example, if the image is of a beach, a scene vector, $V=\{v1=0, v2=0, \ldots, v50=1, \ldots, vn\}$, associated with the image may be stored in training data database 136A, where element v50 corresponds to the category "beach." In some embodiments, step 204A may be performed by a subsystem that is the same or similar to context classification subsystem 112A, model subsystem 116, or a combination thereof.

At step 206A, a trained object recognition model may be obtained. Various object recognition models may be stored in model database 138A. Each object recognition model may be trained for a particular object (e.g., a specific object recognition model, such as an object recognition model configured to recognize dogs, logos, hardware, etc., within an image) or trained for general object recognition (e.g., capable of recognizing various different objects). Object database 134A may store objects from an object ontology including a plurality of objects. In some embodiments, the object ontology may be organized into different types of objects. For example, one type of object may be cats, while another type of object may be drills, and while yet another type of object may be human faces. In some embodiments, the object recognition model may be trained using a training data set including a set of images depicting different objects, either of a same type (e.g., all depicting dogs) or of different types (e.g., some depicting dogs, some depicting cats, some depicting houses, etc.). Each image may be labeled with an object identifier of the object depicted by that image. In some embodiments, the object identifiers may be associated with a feature vector in a continuous vector space, where the feature vector of an image describes visual features extracted from the image depicting an object labeled with the object identifier. The image, the object identifier, the feature vector, or a combination thereof, may be stored in training data database 136A. The object recognition model may be trained using the training data set such that the object recognition model is capable of recognizing instances of the objects included within the images of the training data set if included within an input image (e.g., an image captured by computer system 102A, mobile computing device 104A, or kiosk device 106A). In some embodiments, step 206A may be performed by a subsystem that is the same or similar to object recognition subsystem 114A, model subsystem 116, or a combination thereof.

At step 208A, the context depicted by the image may be determined. In some embodiments, the image may be provided as an input to the trained context classification model, and a context classification vector indicating an identified context of the image may be output. For example, if the trained context classification model is a trained scene classification model, a scene classification vector indicating a scene depicted within the image may be output from the trained scene classification model. In some embodiments, step 208A may be performed by a subsystem that is the same or similar to context classification subsystem 112A.

At step 210, an object identifier of the object depicted within the image may be determined based on the image and the context. In some embodiments, the image and the context identified by the context classification model (e.g., a context classification vector) may be provided as an input to the trained object recognition model. The trained object recognition model may output an object classification vector, object distribution, or probability function, that indicates an object (or objects) depicted within the image. In some embodiments, the object identifier of the object may be assigned or associated with the image based on the object recognition model's determination. In some embodiments, the object identifier or feature vector associated with the identified object, the initially identified context, and the image, may be provided back to the context classification model, the object recognition model, or both, to determine (i) if the initially identified context is accurate based on the object(s) depicted within the image, as well as, or alternatively (ii) whether any other objects are determined to be present within the image based on the detected object. In some embodiments, step 210 may be performed by a subsystem that is the same or similar to object recognition subsystem 114A.

At step 212A, the object identifier may be caused to be stored in memory. For example, the object identifier for the identified object may be stored in training data database 136A as being associated with the analyzed image, a feature vector describing the image, context classification vector describing the context of the image, or a combination thereof. In some embodiments, step 212A may be performed by a subsystem that is the same or similar to context classification subsystem 112A, object recognition subsystem 114A, or a combination thereof.

Figure 3:
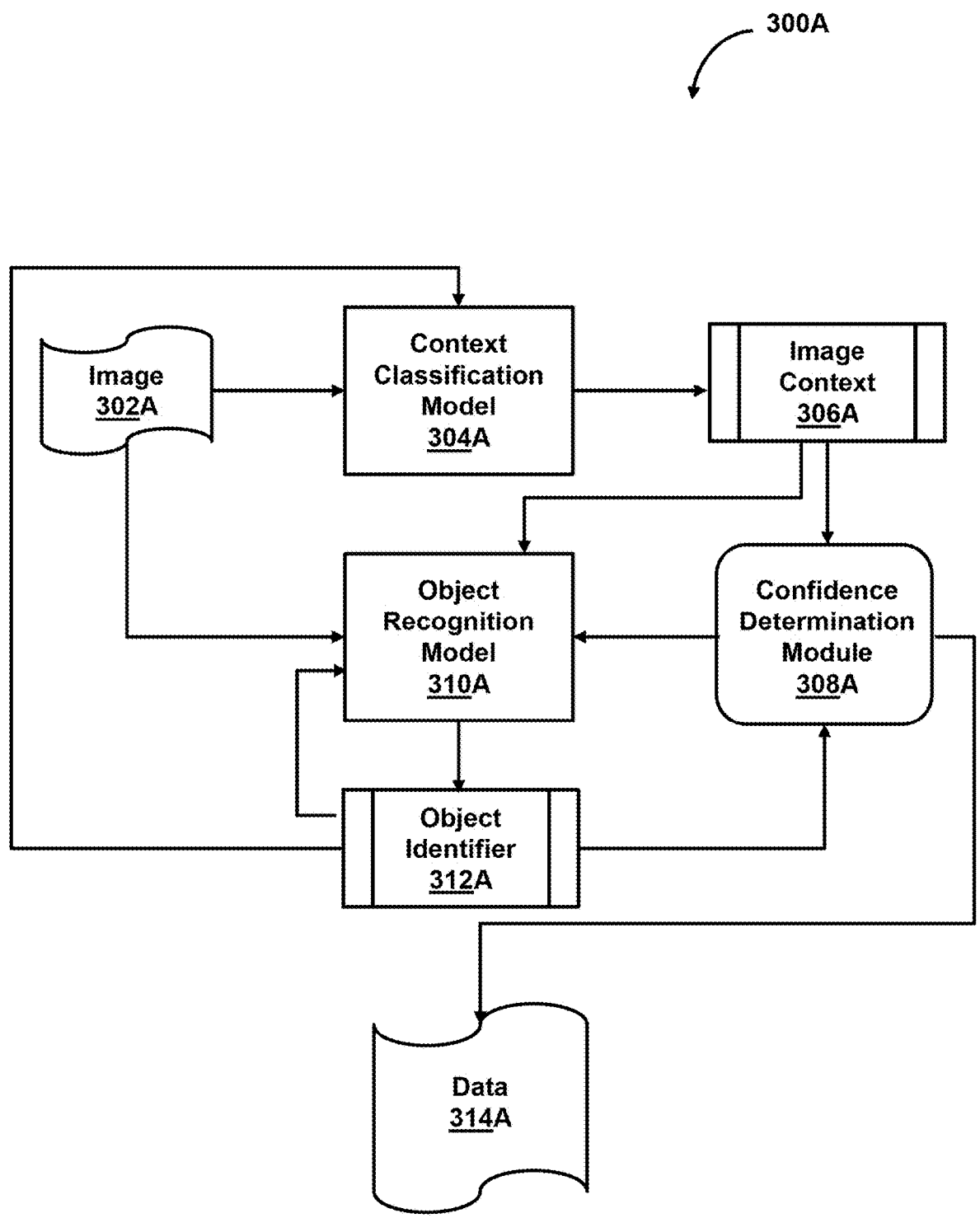
FIG. 3 illustrates an example data pipeline for determining an object depicted within a context of an image, in accordance with various embodiments.

FIG. 3 illustrates an example data pipeline for determining an object depicted within a context of an image, in accordance with various embodiments. Pipeline 300A may include two central components: (i) a context classification model 304A and (ii) an object recognition model 310. As previously mentioned, context classification model 304A may be a trained context classification model and object recognition model 310 may be a trained object recognition model. In some embodiments, context classification model 304A may be a scene classification model. Context classification model 304A and object recognition model 310 may both include, or be formed by, a convolutional neural network (CNN), a discriminative neural network, a region-based CNN (R-CNN), a Fast R-CNN, a Masked R-CNN, Single Shot Multibox (SSD), and a You-Only-Look-Once (YOLO) model, or any other type of machine learning model, or any combination thereof. Furthermore, context classification model 304A, object recognition model 310, or both, may be implemented using server-side programming architecture, such as Python, Keras, and the like, or they may be implanted using client-side programming architecture, such as TensorFlow Lite or TensorRT.

In some embodiments, image 302A may be provided as an input to context classification model 304A. Context classification model 304A may be configured to determine a context of the image, and may output image context 306A. Some embodiments include multiple image contexts being output by context classification model 304A. For instance, a scene classification of a scene depicted within image 302A may be output, as well as a geographical classification indicating a geographical location where image 302A was captured. The geographical location may include GPS coordinates of computer system 102A, mobile computing device 104A, or kiosk device 106A. For example, the geographical location may indicate where a user is based on the GPS location (e.g., a country where the user is when capturing an image, a city where the user's computing device is, an address proximate the GPS coordinates of the mobile computing device, etc.). In some embodiments, the geographical location may also indicate a location of a mobile computing device, and by relation a user, within a given area. For example, the geographical location of an image may be used to determine an approximate location of the user within a retail store (e.g., the image was determined to be taken in a Sporting Goods section of a store). In some embodiments, image context 306A (e.g., a scene classification) may be provided as an input to object recognition model 310. Object recognition model 310 may be configured to determine an object identifier of an object depicted within image 302A based, at least in part, on image context(s) 306A and image 302A. Some embodiments may include multiple object identifiers being output by object recognition model 310.

In some embodiments, object identifier 312A may be provided to context classification model 304A for determining whether image context 306A is to be updated based on object identifier 312A. For example, context classification model 304A may have initially classified a context of image 302A, such as a scene of image 302A, as being an outdoor scene. However, object recognition model 310 may have determined that an object depicted within image 302A is a hammer. Therefore, using object identifier 312A (e.g., an identifier for a hammer), context classification model 304A may determine that a scene of image 302A is not an outdoor scene, but instead is a garage scene. Therefore, image context 306A may be updated to now include a scene classification of a garage. Furthermore, the updated image context, which may still be labeled as image context 306A, may be provided back to object recognition model 310 for determining whether any additional objects are now determined as being present within image 302A based on the updated image context 306A, as well as based on object identifier 312A. For example, now that the scene classification indicates that the scene is a garage, other objects typically found in a garage may be upweighted by object recognition model 310 (e.g., automobiles, bikes, etc.) and a likelihood of those object's presence within image 302A may be determined. In some embodiments, multiple regions of interest (ROIs) may be detected within an image, and for each ROI, a determination may be made as to whether an object is detected, and a confidence level associated with that determination may be computed. If the confidence level exceeds a threshold confidence level, then the identified object may be classified as being detected within that ROI. However, if the confidence level does not exceed the threshold confidence level, then the image may not be classified as including the object. In some embodiments, after providing the updated image context 306A, as well as object identifier 312A, to object recognition model 310, the confidence level for those objects previously detected (e.g., that had a confidence level not exceeding the threshold confidence level), may be recomputed. If the confidence level is determined to exceed the threshold confidence level, then the object identifier associated with those objects may be attributed to image 302A and stored in memory (e.g., within training data database 136A). However, if not, then the previously determined object identifier 312A may be stored in memory in association with image 302A.

In some embodiments, the object recognition model and context classification model may form a loop for dynamically analyzing captured video or images in real-time, and making adjustments based on the continuously evolving analysis. For example, a mobile robot, autonomous vehicle, drone, mobile manipulator, assistive robots, and the like, may ingest video or images in real-time, determine a context of the image (e.g., a scene), determine objects within the image based on the determined context and the image, and then return the determined object and initially determined context to update, if necessary, the context. Furthermore, the continuous real-time analysis of the object(s) within the image and the context(s) of the image may further refine the sub-class of object and sub-class of context of the image.

In some embodiments, a confidence determination module 308A may be included within pipeline 300A. Confidence determination module 308A may be configured to determine whether a confidence level of an image context output by context classification model 304A (e.g., image context 306A) exceeds a threshold confidence level. If so, then the input image (e.g., image 302A) may be classified as depicting that context. The image context (e.g., image context 306A) may then be provided to object recognition model 310 (along with image 302A) for performing object recognition on image 302A. Furthermore, confidence determination module 308A may also be configured to determine a confidence level of an object identifier of an object or objects determined to be present within image 302A based on image context 306A and image 302A. As mentioned above, if the confidence level of the objects determined to be depicted within image 302A exceeds the threshold confidence level, then data 314A including object identifier 312A, image 302A, image context 306A, a feature vector describing image 302A, or visual features extracted from image 302A, may be output to be stored in memory. For example, object identifier 312A may be assigned to image 302A, image context 306A, a feature vector or features describing image 302A, or a combination thereof. However, if the confidence level does not exceed the threshold confidence level, then those objects may not be stored in association with image 302A, image context 306A, or a feature vector or features describing image 302A.

In some embodiments, object recognition model 310 may proceed context classification model 304A. For example upon receiving image 302A, object recognition model 310 may determine object identifier 312A of an object determined to be presented within image 302A (e.g., having a confidence level exceeding a threshold confidence level). Object identifier 312A may then be provided to context classification model 304A with image 302A for determining image context 306A of image 302A. In some embodiments, object identifier 312A may also be provided back to object recognition model 310 for determining whether any other objects are present within image 302A. For example, because the identifier object is known to be related to one or more other objects (e.g., skis are determined to be related to winter coats), those related objects (e.g., nodes connected by edges in a knowledge graph to the identified object) may be upweighted during analysis by object recognition model 310.

Figure 4:
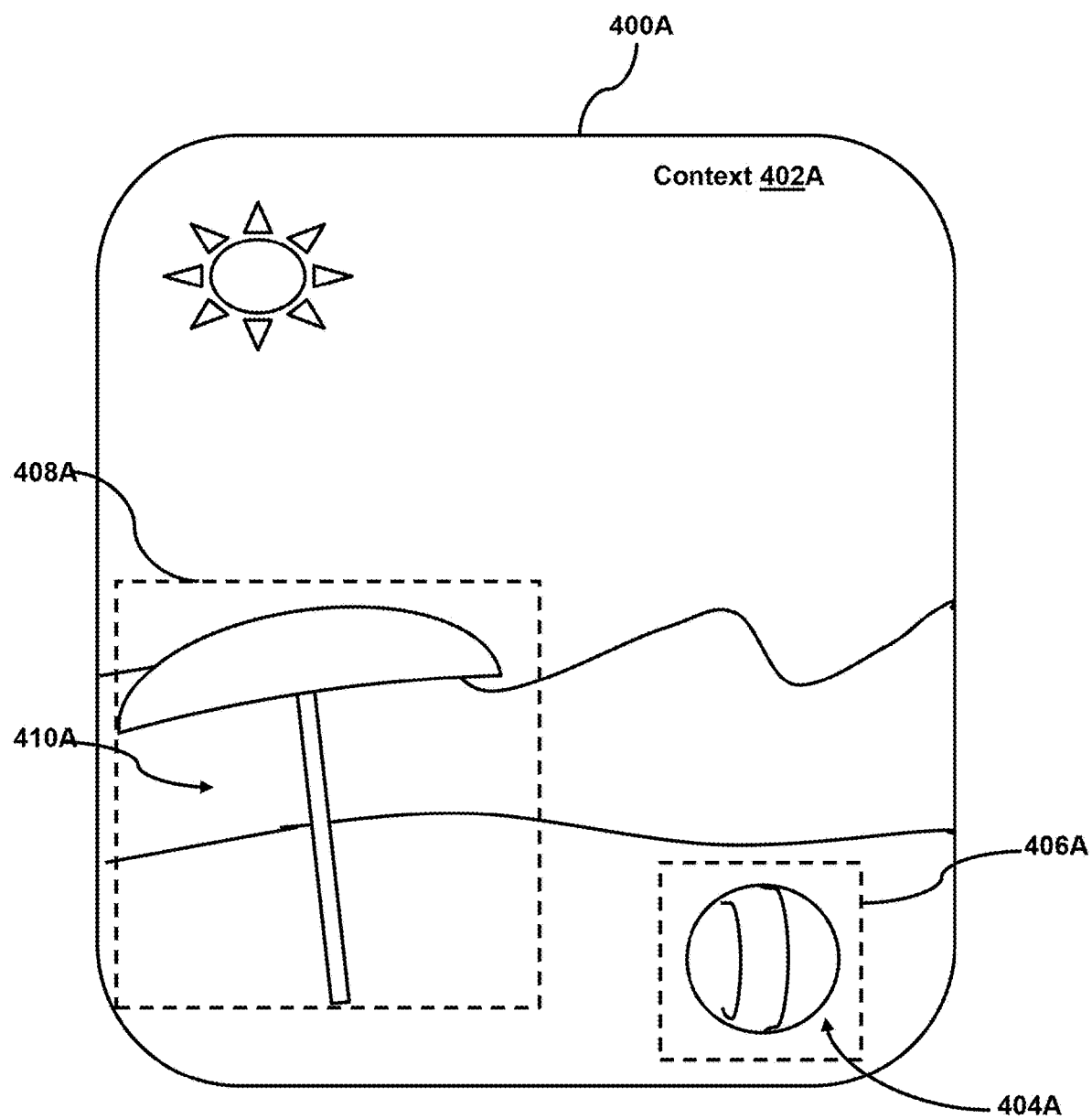
FIG. 4 illustrates an example of an image depicting a first object and a second object within a context, in accordance with various embodiments.

FIG. 4 illustrates an example of an image depicting a first object and a second object within a context, in accordance with various embodiments. In some embodiments, image 400A may include a context 402A, a first object 404A, and a second object 410. For example, context 402A may refer to a scene of image 400A, such as a beach scene; first object 404A may correspond to a ball; and second object 410 may correspond to a beach umbrella. In some embodiments, image 400A may be provided to a context classification model, such as a scene classification model, to determine a context of image 400A. For example, context 402A of image 400A may be a beach scene. The identified context (e.g., Scene=Beach) may be provided with image 400A to an object recognition model for determining whether any objects are present within image 400A.

The identified context may function to (1) restrict a search to be narrowed to objects only related to the identified context, or (2) apply a weight to the search to weigh object related to the identified context greater than objects not related to the identified context. For example, the object recognition model may restrict the search for potential objects within image 400A to objects associated with a beach scene (e.g., beach balls, umbrellas, kites, sunscreen, coolers, towels, surfboards, etc.). This technique may be advantages in some cases as the object recognition model may be able to quickly identify objects within the image that fall within the restricted subset of objects, however it is possible for objects to be present in the image that are not normally located within this restricted subset of objects. Therefore, this technique may quickly and accurately identify objects within a given context. As another example, the object recognition model may weight objects related to the beach scene greater than objects not related to the beach scene. In this example, objects related to a beach scene (e.g., beach balls, umbrellas, kites, sunscreen, coolers, towels, surfboards, etc.) may have their weights increased in the object recognition model, whereas objects unrelated to a beach scene (e.g., winter coats, snowboards, etc.) may not have their weights increased, or even may have their weights decreased. This technique may be advantages in some cases as the object recognition model may be able to more readily identify objects present in the image even if those images are not associated with the identified context, however because more potential objects are available as being classified within the image, more computing resources and time may be needed. Therefore, this technique may be able to identify a broad range of objects regardless of whether they are part of the classified context of the image.

In some embodiments, while image 400A may depict both first object 404A and second object 410, the object recognition model may initially be only available to classify image 400A as including one object. For example, the object recognition model may initially only recognize first object 404A within first bounding box 406A, where first object 404A may be identified based, at least in part, on context 402A. In some cases, the object recognition model may have determined that image 400A includes two regions of interest, each of which includes a candidate object, and placed a bounding box around those candidate objects. For example, first bounding box 404A may be placed around first object 404A and a second bounding box 408A may be placed around second object 410. A confidence level may be computed that the object detected in each of bounding boxes 406A and 408A is a particular object from an object ontology, based at least in part on context 402A of image 400A. In some embodiments, the confidence level for first object 404A may exceed a threshold confidence level, while the confidence level for second object 410 may not exceed the threshold confidence level. Therefore, while two candidate objects were detected, the object recognition model may only be able to output an object identifier for first object 404A. In some embodiments, upon recognizing first object 404A, the object recognition model may be provided with an object identifier associated with first object 404A and context 402A as feedback, and another iteration of searching for objects within image 400A may be performed. In this iteration, the confidence level for second object 410 may increase based on a known relationship with first object 404A, for example based on information included within a knowledge graph. Therefore, the object recognition model may be configured to output object identifiers for both first object 404A and second object 410, and may further store the object identifiers in memory in association with image 400A.

Figure 5:
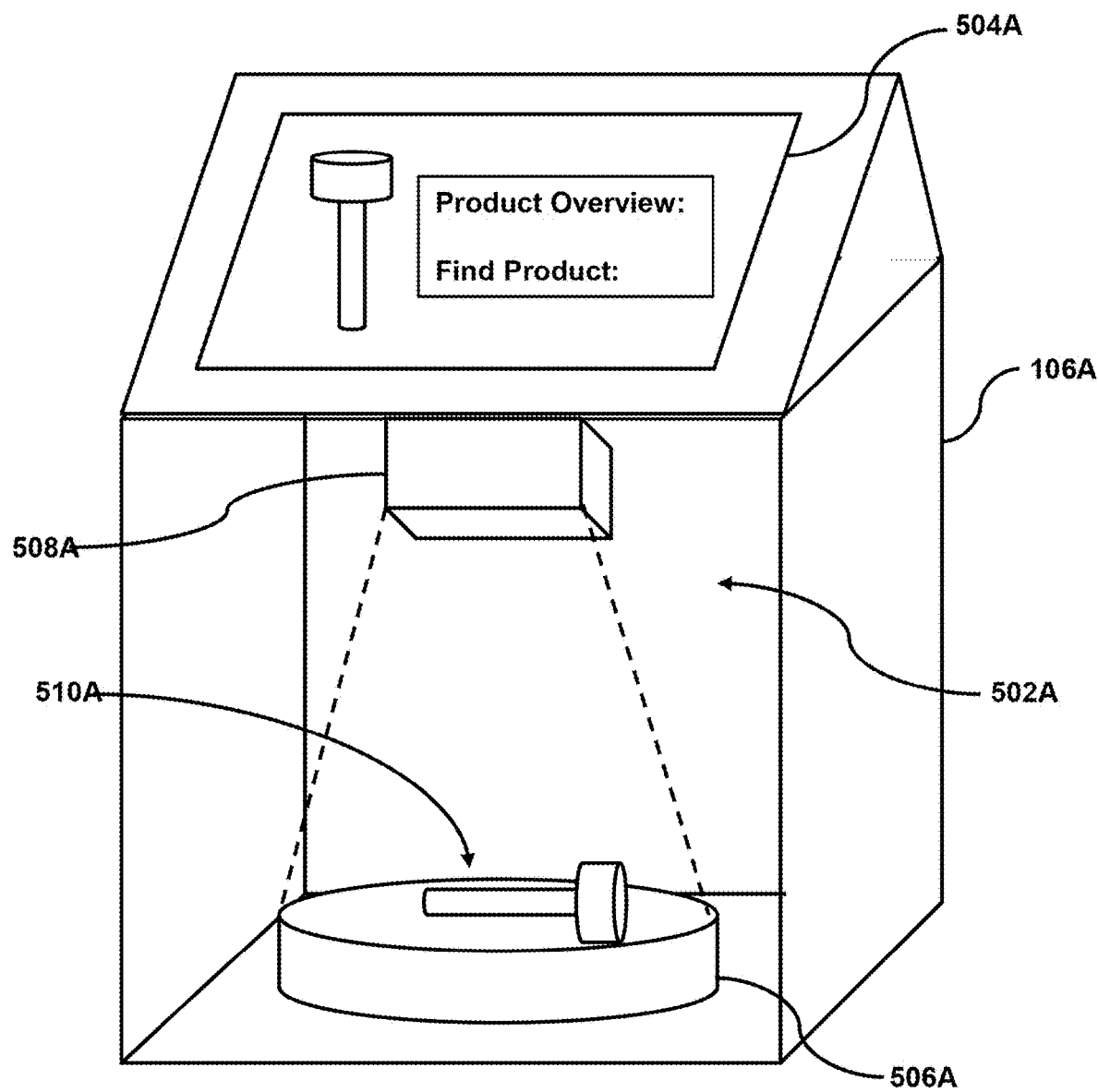
FIG. 5 illustrates an example of a kiosk device for capturing an image of an object and facilitating a performance of a visual search based on the image, in accordance with various embodiments.

FIG. 5 illustrates an example kiosk device for capturing images of objects and performing visual searches for those objects, in accordance with various embodiments. In some embodiments, kiosk device 500A may be a device configured to receive an object, capture an image of the object, facilitate performance of a visual search using the image of the object as an input query image, and provide information regarding one or more results of the visual search. Kiosk device 500A of FIG. 5 may be substantially similar to kiosk 106A of FIG. 1, and the previous descriptions may apply equally.

Kiosk device 500A may include an open cavity 502A where objects may be placed. For example, cavity 502A may be surrounded on five sides by walls or other physical structures, which may be impermissible to light, semi-transparent, or fully transparent, while one side may be open such that individuals may place objects within cavity 502A. In some embodiments, individuals may place objects within cavity 502A to obtain information about the object. For example, if an individual needs to identify a type of nail, the individual may bring the nail to a facility where kiosk device 500A is located, place the nail within cavity 502A, and obtain information regarding the type of nail, sub-type of nail, color, shape, size, weight, material composition, location of that nail within the facility, a cost for purchasing the nail, or any other information related to the nail, or any combination thereof. In some embodiments, kiosk device 500A may include one or more sensors capable of determining information about the object placed within cavity 502A. For example, kiosk device 500A may include a weight sensor 506A, which may be configured to determine a weight of an object 510 placed within cavity 502A. As another example, kiosk device 500A may include sensors capable of determining a density of object 510, length, width, depth, height, etc., of object 510, density of object 510, a material composition of object 510, or any other feature or characteristic of object 510, or any combination thereof. In some embodiments, sensors 506A may be located on an inner surface of cavity 502A of kiosk device 500A. In some embodiments, one or more of sensors 506A may be integrated within a lower wall of cavity 502A (e.g., a bottom wall), any of the side walls, the upper wall, or a combination thereof. In some embodiments, kiosk device 500A may include one or more processors and memory storing computer program instructions that, when executed by the processors, cause sensors 506A to record data representative of a measurement captured by sensors 506A. For example, sensors 506A may continually, periodically, or upon request (e.g., in response to a user pressing a button or determining that an object has entered into the space of cavity 502A) capture a weight detected by sensors 506A. In some embodiments, the data (e.g., weight data) may be stored in memory of kiosk device 500A and used as an input channel for a visual search.

In some embodiments, kiosk device 500A may include one or more image capture components 508A configured to capture an image of an object (e.g., object 510) placed within cavity 502A. For example, image capture components 508A may include one or more cameras configured to capture two-dimensional images, three-dimensional images, high definition images, videos, time series images, image bursts, and the like. In some embodiments, image capture components 508A may have a field of view (FOV) capable of capturing an image or video of some or all of a surface of sensors 506A. In some embodiments, image capture components 508A may include one or more infrared scanning devices capable of scanning cavity 502A to determine a shape of object 510, textures, patterns, or other properties of object 510, or additional features of object 510. In some embodiments, image capture components 508A may generate, store, and output data representative of the image, video, scan, etc., captured thereby, which may be stored in memory of kiosk device 500A.

Kiosk device 500A may also include a display screen 504A located on an upper surface of kiosk device 500A. Alternatively, display screen 504A may be a separate entity coupled to kiosk device 500A (e.g., a separate display screen). In some embodiments, display screen 504A may display an interface viewable by an individual, such as the individual that placed object 510 within cavity 502A. Display screen 504A may provide a real-time view of object 510 from various perspectives, such as a perspective of image capture components 508A. In some embodiments, display screen 504A may display a captured image or video of object 510 after being captured by image capture components 508A. For instance, after capturing an image of object 510, an image of object 510 may be displayed to an individual via display screen.

Some embodiments may include providing the image of the object (e.g., object 510), as well as any additional information about the object determined by sensors 506A, image capture components 508A, or both, to a computer system capable of performing a visual search. For instance, the image and any other data regarding object 510 determined by kiosk device 500A may be provided to a computer system, such as computer system 102A of FIG. 1, to perform a visual search. In some embodiments, a computer system including visual search functionality may be located at a same facility as kiosk device 500A. In some embodiments, kiosk device 500A may include the visual search functionality, and may therefore perform the visual search itself. Upon providing the image depicting object 510, and any other information (e.g., weight of object 510), to the visual search system, search results indicating objects determined as being similar to object 510 may be displayed via display screen 504A. For example, the image depicting object 510, as well as the additional information, if available, may be provided to computer system 102A. Computer system 102A may extract visual features describing object 510 using a trained computer-recognition object recognition model, and may generate a feature vector describing at least a subset of the extracted visual features. The feature vector may be mapped to an n-dimensional feature space, and distances between the feature vector and other feature vectors (each corresponding to a set of visual features extracted from an image previously analyzed by the computer-vision object recognition model) may be computed. If the distance between the feature vector describing the visual features extracted from the image depicting object 510 and a feature vector describing visual features extracted from an image depicting an object is determined to be less than a threshold distance value, then the image depicting object 510 and the image depicting the object may be classified as being similar to one another. Therefore, an object identifier used to label the object depicted by the previously analyzed image may be assigned to the image depicting object 510. In some embodiments, the object identifier, the image depicting object 510, and the feature vector describing the image depicting object 510 may be stored in memory (e.g., image database 132) together. Furthermore, information previously obtained describing the other image may be presented to an individual (e.g., the individual that placed object 510 within cavity 502A) via display screen 504A. For example, if object 510 is a particular nail that an individual seeks to purchase additional instances of, the results of the search performed using the image of the nail may indicate the name of the nail, a brand of the nail, a type of the nail, a cost of the nail, a material composition of the nail, and a location of where the nail is located within a facility so that the individual may obtain additional instances of the nail. In some embodiments, an individual may be capable of purchasing instances of the identified object via kiosk device 500A, such as by inputting payment information and delivery information such that the additional instances of the identified object may be shipped directly to the individual's home. In some embodiments, kiosk device 500A may be in communication with a three-dimensional printing device, and in response to identifying the object, kiosk device 500A may facilitate the three-dimensional printing device to print a replica of the identified object.

Figure 6:
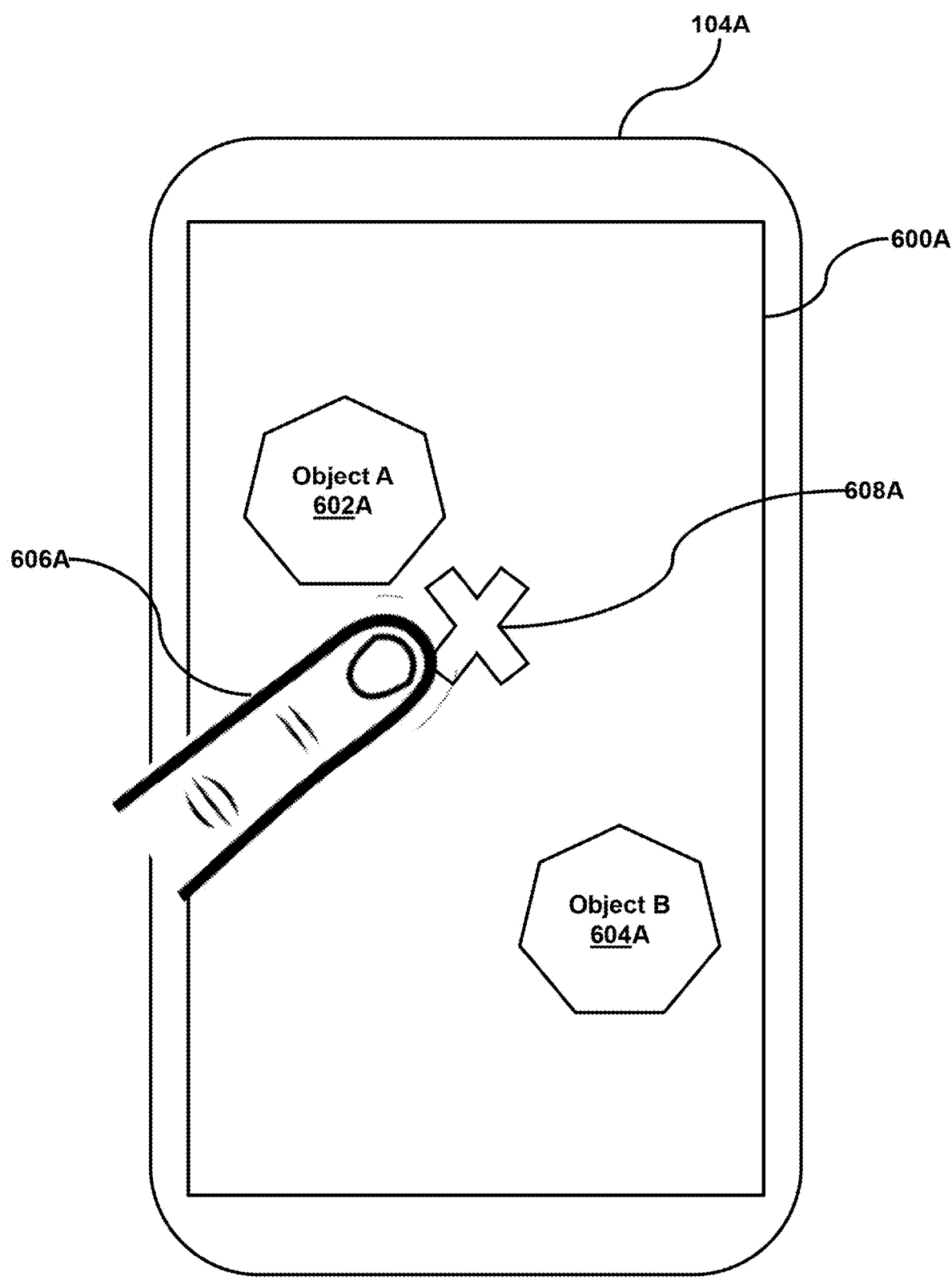
FIG. 6 illustrates an example of an image depicting objects being captured responsive to an input detected by a mobile computing device, in accordance with various embodiments.

FIG. 6 illustrates an example of an image depicting objects being captured responsive to an input detected by a mobile computing device, in accordance with various embodiments. In some embodiments, mobile computing device 104A may include a display screen 700A. For instance, display screen 700A may a touch-sensitive display screen capable of detecting touch inputs. For example, display screen 700A may be a touch screen including capacitive sensing panels capable of recognizing touch inputs thereon. For instance, a touch screen may correspond to a projected capacitive touch ("PCT"), screen include one or more row traces and/or driving line traces, as well as one or more column traces and/or sensing lines. In some embodiments, display screen 700A may include a touch-sensing display interface that includes a multi-touch panel coupled to one or more processors to receive and detect gestures. Multi-touch panels, for example, may include capacitive sensing mediums having a one or more of row traces and/or driving line traces, and one or more column traces and/or sensing lines. In some embodiments, mobile computing device 104A may include one or more image capturing components, such as a front-facing camera, a rear facing camera, multiple instances of either, or both.

In some embodiments, a user interface (UI) of a native application may be displayed by display screen 700A. The native application may access a camera functionality of mobile computing device 104A, such as a front-facing or rear-facing camera, and may display within the UI a visual depiction of an environment captured by a field of view of the camera currently in use. To capture an image or video, a user operating mobile computing device 104A may perform an action to signify to the native application that a capture image or capture video event has been invoked. Typically, such an input may be detected by an actuation of a button, which may be a physical button (e.g., a button that can be compressed to close a circuit to cause the image to be captured) or a virtual button (e.g., a button depicted on a portion of the UI such that when display screen 700A detects a touch event at an input location of where the button is displayed, the image is captured).

In some embodiments, the native application rendered by the UI displayed on display screen 700A may not include a physical or virtual button. Instead, the native application may facilitate capture of an image or video in response to detecting a particular input event. Some examples of such input events may include, but are not limited to, an on-touch event whereby a capacitive object (e.g., a finger, a stylus, etc.) physical contacts a surface of display screen 700A (e.g., a touch-sensitive display screen), a multi-touch event whereby multiple objects physical contact the surface of display screen 700A, a touch gesture whereby a capacitive object physical contacts multiple points on the surface of display screen 700A in a defined manner, a hover gesture whereby direct physical contact between the surface of display screen 700A is not detected but a determination is made that a capacitance change as a result of a capacitive object being in close enough proximity (e.g., 1-2 mm away) to display screen 700A to augment a local electric field about a portion of the capacitive elements of display screen 700A, an eye gaze event whereby a user's eyes are tracked and determined to dwell on a location of display screen 700A for a predefined amount of time (e.g., 1-3 seconds), or a physical gesture such as a hand wave, air-drawn circle, and the like detected by a gesture tracking system, or any other input type, or any combination thereof. In response to detecting such an input event, the native application may cause the camera component of mobile computing device 104A, or a camera component coupled to mobile computing device 104A, to capture an image or begin (or end) capture of a video or other series of images.

In some embodiments, the image captured in response to the input may include one or more objects. For example, display screen 700A may display an image depicting a first object 702A ("Object A") and a second object 704A ("Object B"). Both objects may be displayed within the image at different locations, may encompass a different amount of area of display screen 700A (e.g., have different pixel areas), and may represent different objects (e.g., different objects of an object ontology including a plurality of objects).

In some embodiments, an individual may select an object displayed on display screen 700A, or otherwise provide an inference of an intended target of the input provided by the individual, based on which object is proximate to the input. For example, an individual providing a touch input via their finger 706A, where the touch input is proximate one of the objects displayed by display screen 700A. Depending on which object the touch input is closest to in pixel-space, that object may be inferred as the intended target intent or interest of the user, and that object may be provided to a visual search system for obtaining additional information about the object. As an example, a touch input by finger 706A may contact display screen 700A at an input location 708A. Input location 708A may be closer to a location of first object 702A on display screen 700A as compared to second object 704A. In other words, a distance in pixel-space of the image displayed by display screen 700A between coordinates of input location 708A and coordinates of first object 702A may be less than a distance in pixel-space between coordinates of input location 708A and coordinates of second object 704A. Therefore, the visual search may focus its search on first object 702A.

In some embodiments, the native application may crop a portion of the image including first object 702A and input location 708A, and the cropped portion of the image may be input to the visual search system. In some embodiments, the native application may apply a bounding box to first object 702A and may enhance a portion of the image within the bounding box, where the enhanced portion may be input to the visual search system alone, with the rest of the image, or with the rest of the image and a weight applied to the portion to indicate prominence of the portion. In some embodiments, the remaining portions of the image not including first object 702A may be down-scaled in resolution or otherwise compressed to reduce a file size of the image for the visual search. For example, if the visual search functionality resides, at least in part, on a remote server system, the reduced file size image may be transmitted faster to the remote server system and may also facilitate a faster search.

Figure 7:
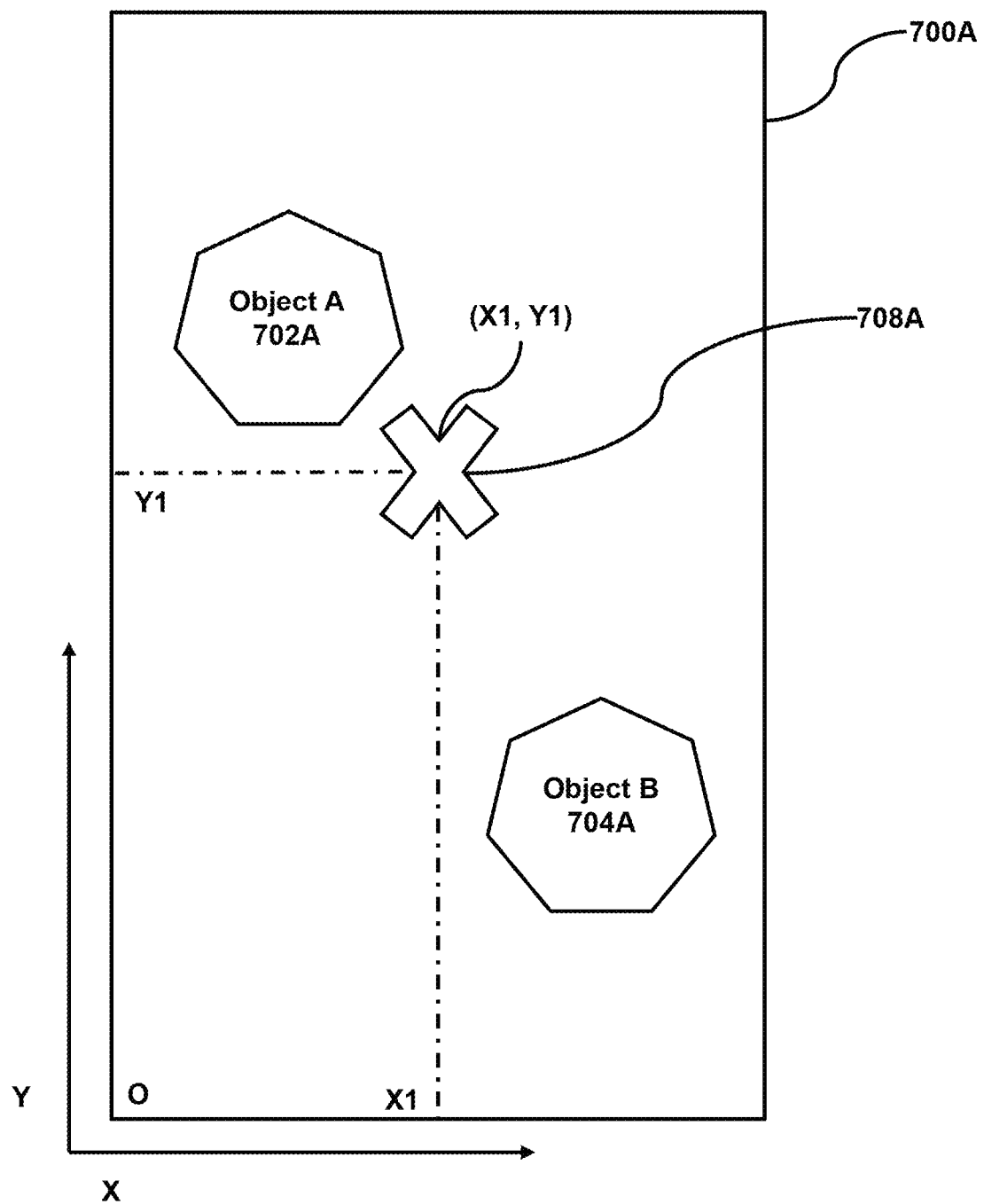
FIG. 7 illustrates an example of determining coordinates of an input location of an input detected by a display screen of a mobile computing device, in accordance with various embodiments.

FIG. 7 illustrates an example of determining coordinates of an input location of an input detected by a display screen of a mobile computing device, in accordance with various embodiments. In some embodiments, coordinates (X1, Y1) in pixel-space of input location 708A may be resolved by mobile computing device 104A including display screen 700A (or computer system 102A if computer system 102A includes an instance of display screen 700A). Coordinates (X1, Y1) may be determined based on a position of input location 708A along a first and second axes of display screen 700A, such as an X axis and a Y axis. Upon detecting the input at input location 708A, the coordinates along each dimension (e.g., the X-dimension and the Y-dimension) may be extrapolated, thereby obtaining the coordinate X1 along the X-axis and coordinate Y1 along the Y-axis for input location 708A.

Figure 8:
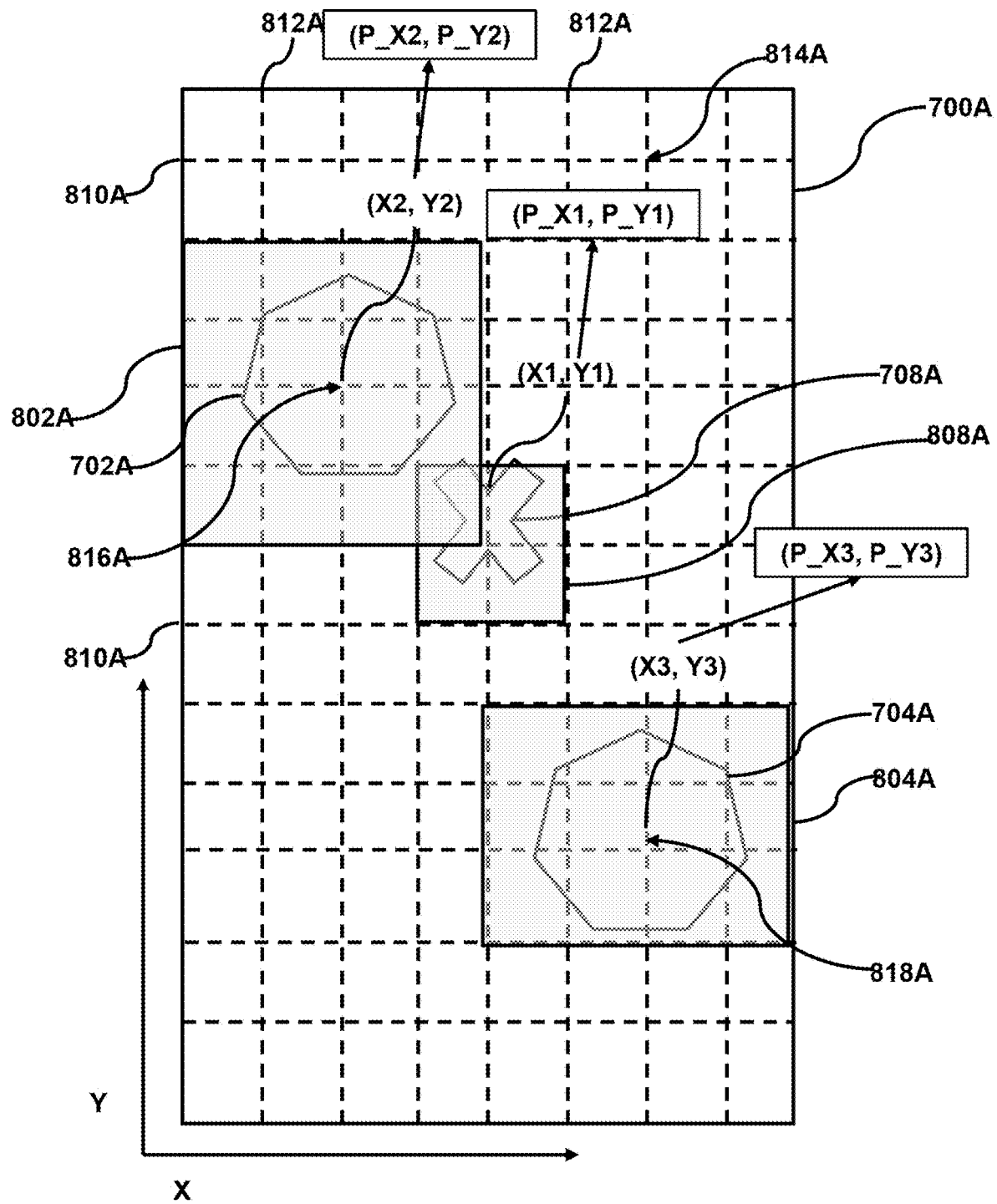
FIG. 8 illustrates an example of a display screen for a mobile computing device segmented into blocks for determining regions of interest and coordinates of an input location of an input detected by the display screen, as well as objects depicted within an image displayed by the display screen, in accordance with various embodiments.

FIG. 8 illustrates an example of a display screen for a mobile computing device segmented into blocks for determining regions of interest and coordinates of an input location of an input detected by the display screen, as well as objects depicted within an image displayed by the display screen, in accordance with various embodiments. In some embodiments, display screen 700A may be segmented into blocks, and coordinates (X1, Y1) of input location 708A may be determined based on which blocks are encompassed by input location 708A. Similarly, coordinates (X2, Y2) and (X3, Y3) of first object 702A and second object 704A, respectively, may also be determined based on the blocks encompassed by those objects as displayed within the UI of display screen 700A.

In some embodiments, each block may represent a portion of display screen 700A obtained by segmenting display screen 700A based on driving lines 812A and sensing lines 810. Intersections 814A between driving lines 812A and sensing lines 810 may correspond to coordinates in pixel-space of an image displayed on display screen 700A. For example, input location 708A may intersect with a driving line 812A and a sensing line 810 at coordinates (X1, Y1), which may be mapped to coordinates in pixel-space based on a density of driving lines 812A and sensing lines 810. In some embodiments, the mapping from physical coordinates of driving lines 812A and sensing lines 810 may be 1:1 (e.g., each coordinate along each axes relates to a corresponding pixel along that axes), or a scaling factor may be applied. In the latter example, a number of intersections 814A may be less than (or greater than) a resolution of the image displayed by display screen 700A, and therefore each intersection 814A may relate to a subset of pixels in pixel-space along an associated axes. As an example, coordinates (X1, Y1) in a coordinate space of display screen 700A may map to pixels (P_X1, P_Y1) in pixel-space.

In some embodiments, a mapping function may be stored in memory of mobile computing device 104A (or computer system 102A) that serves to map a given location in coordinate space of display screen 700A to coordinates in a pixel space of an image displayed on display screen 700A. The coordinates in pixel-space of the image may depend on a resolution of the image that is (or is to be) captured and a resolution of display screen 700A. For example, display screen 700A may have a 1920×1080 resolution, meaning that along a first axis (e.g., the X axis) there are 1920 pixels and along a second axis (e.g., the Y axis) there are 1080 pixels. Therefore, depending on the input location, the mapping function may relate the coordinates resolved on display screen 700A to coordinates in pixel-space of the image.

In some embodiments, each object depicted within an image may also have a coordinate location identified in a coordinate space of display screen 700A. In some embodiments, because the object may encompass multiple intersections 814A of driving lines 812A and sensing lines 810A, a region of intersections 814A may be determined initially, and each region may be used to extract coordinate locations for the object, which may then be mapped to coordinates in pixel-space. As an example, first object 702A may encompass a first region 802A and second object 704A may encompass a second region 804A. A size of first region 802A and second region 804A may depend on a size of objects 702A and 704A, respectively. However, in some embodiments, each region may be designated as having a same size capable of encompassing both objects.

In some embodiments, a center of each region may be determined, and the coordinates of the center of each region may be used to compute a distance in pixel-space between the corresponding object and input location 708A. For instance, first region 802A may have a center point coordinates (X2, Y2) and second region 804A may have a center point coordinates (X3, Y3). In some embodiments, a same mapping function used to map coordinates (X1, Y1) of input location 708A to coordinates in pixel-space (P_X1, P_Y1) of the image may also map coordinates (X2, Y2) and (X3, Y3) to coordinates in pixel-space, such as (P_X2, P_Y2) and (P_X3, P_Y3), respectively. After obtaining the coordinates in pixel-space of each object and input location 708A, a distance between each object and input location 708A may be determined. In some embodiments, instead of using center point coordinates of a region, a leading edge or trailing edge of the region may be used to identify a location of the object in coordinate space, which in turn may be mapped to coordinates in pixel-space.

Figure 9:
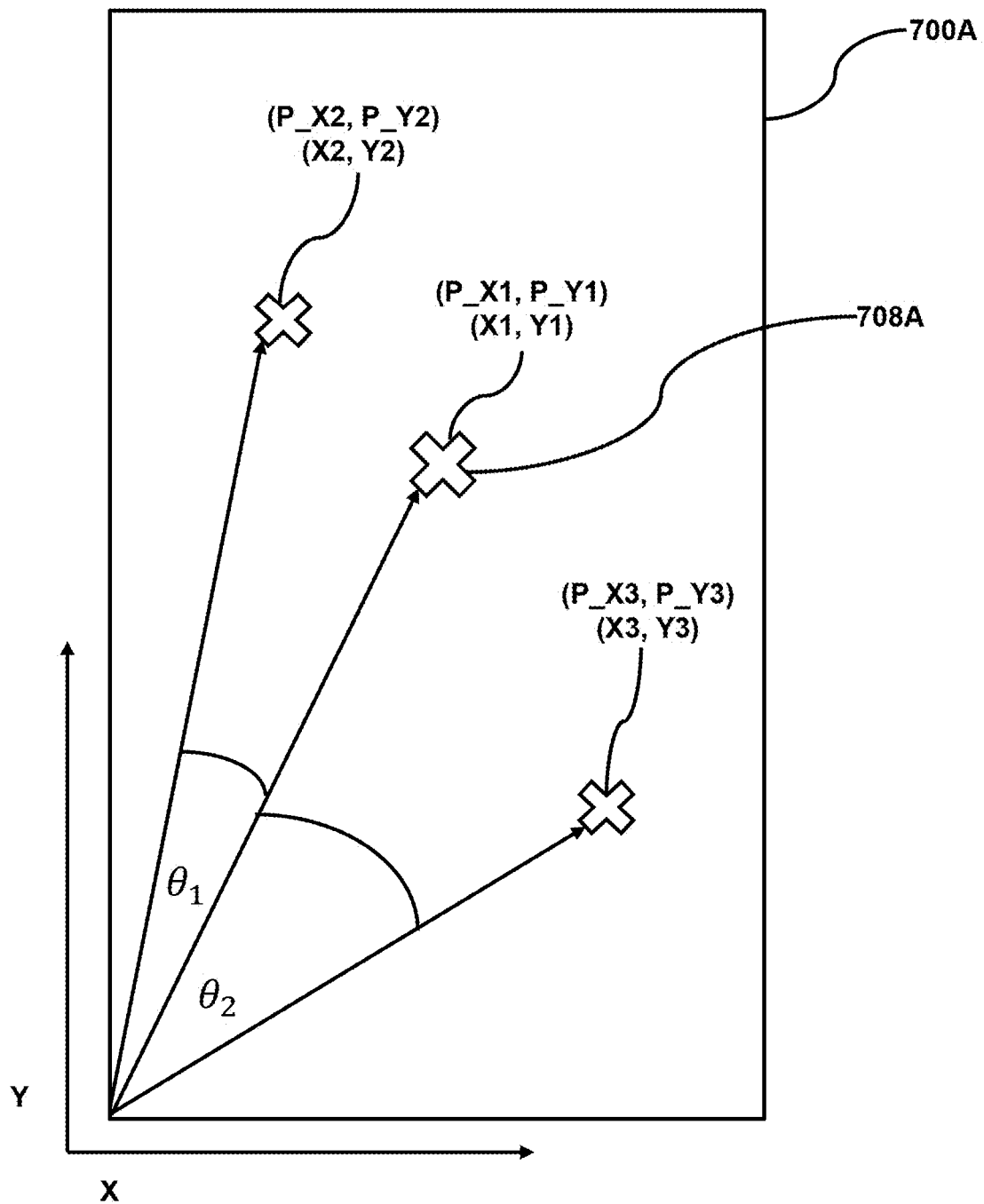
FIG. 9 illustrates an example of determining distances in pixel-space of an image between an input location of an input and objects depicted by the image, in accordance with various embodiments.

FIG. 9 illustrates an example of determining distances in pixel-space of an image between an input location of an input and objects depicted by the image, in accordance with various embodiments. In some embodiments, a first distance between coordinates in pixel-space of first object 702A and input location 708A and a second distance between coordinates in pixel-space of second object 704A and input location 708A may be determined. In some embodiments, a first vector in pixel-space beginning at the origin (e.g., a bottom left corner of display screen 700A) and ending at pixel-space coordinates (P_X2, P_Y2) for first object 702A may be determined. Similarly, a second vector in pixel-space beginning at the origin and ending at pixel-space coordinates (P_X3, P_Y3) for second object 704A may be determined. The first vector may then be compared to a vector depicting input location 708A in pixel-space (e.g., coordinates (P_X1, P_Y1)) to determine a first distance D1 between input location 708A and first object 702A within the image, and a second distance D1 between input location 708A and second object 704A within the image.

In some embodiments, first distance D1 and second distance D2 may be compared to determine which distance is smaller. As an example, if first distance D1 is less than second distance D2, this may indicate that the input detected by display screen 700A, and which was used to invoke a capture image operation to capture an image depicted within display screen 700A, was directed towards first object 702A. Therefore, a subsequent visual search performed using the image may apply a weighting factor to a region of the image encompassing object 702A as the user's intent (e.g., which object the user sought to obtain additional information about when capturing the image) may have been directed towards first object 702A. In some embodiments, upon determining the object of interest based on the distances D1 and D2, the native application on mobile computing device 104A may crop the image to encompass only a portion of the image including the object of interest (e.g., first object 702A for distance D1 being less than distance D2). The cropped image may then be provided to the visual search system for performing a visual search as opposed to the entire image, which may decrease network resources by providing a smaller image to the visual search system (e.g., visual search subsystem 122). In some embodiments, portions of the image not including the region of interest (e.g., a region encompassing first object 702A) may be compressed or downscaled in resolution, and the resulting version of the image may be provided to the visual search system. In some embodiments, the portion of the image including the object of interest (e.g., a region encompassing first object 702A) may be enhanced, such as by causing a resolution of that region to be increased, increasing a contrast of that region, or performing any other image enhancement processing to the region, prior to being provided to the visual search system so as to improve a visual search for the object depicted within the region.

Figure 10:
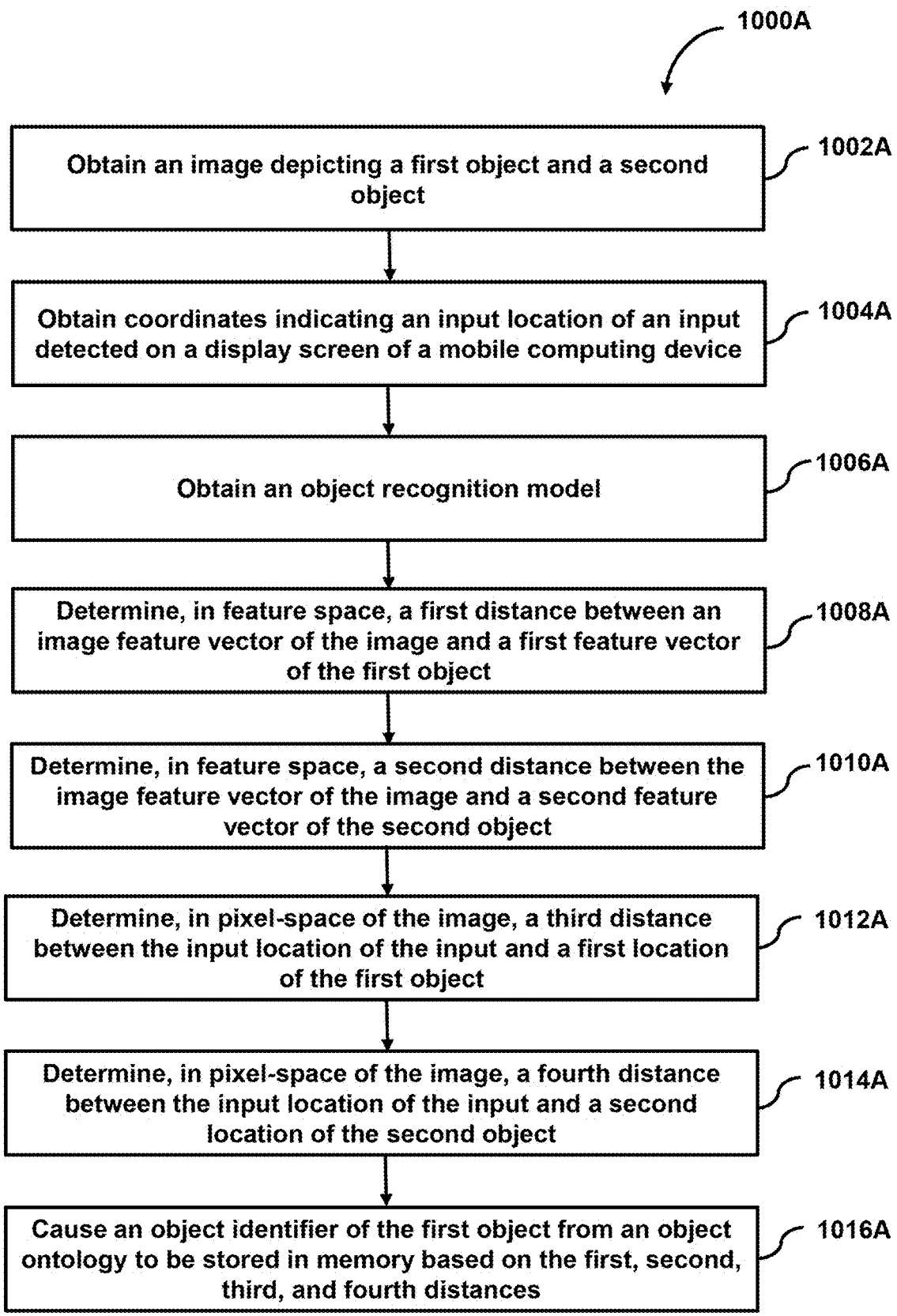
FIG. 10 illustrates an example of a process for determining an object identifier of an object to be used as an input for a visual search based on a detected input on a display screen of a mobile computing device, in accordance with various embodiments.

FIG. 10 illustrates an example of a process for determining an object identifier of an object to be used as an input for a visual search based on a detected input on a display screen of a mobile computing device, in accordance with various embodiments. In some embodiments, a process 1000A may begin at step 1002A. At step 1002A, an image depicting a first object and a second object may be obtained. In some embodiments, the image may be captured by a camera or other image capture component that is integrated within or communicatively coupled to mobile computing device 104A, kiosk device 106A, or computer system 102A. As an example, an image depicting first object 702A and second object 704A may be captured. In some embodiments, the image may depict the first object and the second object at different locations within the image. For example, the first object may be located at a first location within the image and the second object may be located at a second location in the image. The locations may correspond to locations in a coordinate space of the display screen, or the coordinates may correspond to a location of each object in a pixel-space of the image. For example, first object 702A may be located at a coordinate location (X2, Y2) and second object 704A may be located at a coordinate location (X3, Y3). In some embodiments, the coordinate locations in a coordinate space of the display screen (e.g., display screen 700) may be mapped to coordinates in pixel-space of the image using a mapping function, or may be determined directly based on the image. As an example, the coordinates in pixel-space of first object 702A and second object 704A may be (P_X2, P_Y2) and (P_X3, P_Y3), respectively. In some embodiments, step 1002A may be performed by a subsystem that is the same or similar to input determination subsystem 120A.

At step 1004A, coordinates indicating an input location of an input detected on a display screen of a mobile computing device may be obtained. In some embodiments, the input may be a touch input, such as an on-touch event detected by an event handler of a programming interface of mobile computing device 104A. Alternatively, the input may be an eye gaze or gesture that is determined to be directed towards an object (or objects) depicted within an image displayed by a display screen of mobile computing device 104A. In some embodiments, the input may cause the image to be captured by a camera of mobile computing device 104A. For example, instead of or in addition to including a physical or virtual button, whose invocation causes an image capture functionality of mobile computing device 104A to capture an image, an input detected by a display screen of mobile computing device 104A while rendering a UI of a native application may cause an image to be captured. In some embodiments, coordinates of the input location may be determined based on a detected portion of the display screen that the input was directed. For example, an intersection of driving and sensing lines of a touch-sensitive display screen may indicate where the input occurred on the display screen. In some embodiments, the coordinate in pixel-space of the image may be determined. For instance, the coordinates in pixel-space may be determined based on the coordinates of the input in a coordinate space of the display screen of mobile computing device 104A, which may be mapped to coordinates in the pixel space of the image (e.g., based on a resolution of the image and a density of the driving and sensing lines of the touch-sensitive display screen). Alternatively, the coordinates in pixel-space of the input may be extracted directly via the native applications application programming interface (API). In some embodiments, step 1004A may be performed by a subsystem that is the same or similar to input determination subsystem 120A.

At step 1006A, an object recognition model may be obtained. The object recognition model may be a trained object recognition model that has been trained using a training data set including a plurality of images depicting objects. In some embodiments, the trained object recognition model may be obtained from model database 138A. In some embodiments, the plurality of images included within the training data set used to train the object recognition model may each be labeled with an object identifier of an object depicted within that image. For example, an image depicting a drill may be labeled with an object identifier of the drill for performing supervised learning. In some embodiments, each object identifier may correspond to an object from an object ontology. The object ontology may include a plurality of objects, which may differ from one another or which may be similarly. For example, the object ontology may include images depicting a plurality of different objects, such as drills, baseballs, coats, etc. As another example, the object ontology may include images depicting a plurality of objects of a similar category, scene, or which are otherwise related, such as a plurality of images depicting different types of dogs, or a plurality of images depicting different construction hardware. In some embodiments, the first object and the second object depicted within the captured image (e.g., first object 702A and second object 704A) may be part of the object ontology. In some embodiments, step 1006A may be performed by a subsystem that is the same or similar to input determination subsystem 120A.

At step 1008A, a first distance, in feature space, between an image feature vector of the image and a first feature vector of the first object may be determined. In some embodiments, the object recognition model may be used to determine whether any objects are present within the image. Object recognition model may extract visual features from the image, and may generating a feature vector describing the visual features in a continuous vector space. The feature space may correspond to an N-dimensional space. In some embodiments, the process of extracting features from an image represents a technique for reducing the dimensionality of an image, which may allow for simplified and expedited processing of the image, such as in the case of object recognition. An example of this concept is an N×M pixel red-blue-green (RBG) image being reduced from N×M×3 features to N×M features using a mean pixel value process of each pixel in the image from all three-color channels. Another example feature extraction process is edge feature detection. In some embodiments, a Prewitt kernel or a Sobel kernel may be applied to an image to extract edge features. In some embodiments, edge features may be extracted using feature descriptors, such as a histogram of oriented gradients (HOG) descriptor, a scale invariant feature transform (SIFT) descriptor, or a speeded-up robust feature (SURF) description.

In some embodiments, the feature vector of the image may be compared to feature vectors of objects from an object ontology. The object ontology may, for example, be stored in object database 134A. As mentioned previously, each object from the object ontology may be labeled with an object identifier. In some embodiments, the training data set used to train the object recognition model may include a plurality of images, each of which includes a feature vector describing visual features extracted from that image and an object identifier of a corresponding object from the object ontology that is depicted by that image. In some embodiments, a distance may be computed between the feature vector of the image and each feature vector of the images depicting objects from the training data set. Based on the distances, a determination may be made that the object depicted in the image corresponds to a first object from the object ontology labeled with a first object identifier. In some embodiments, the distance in feature space between the feature vector of the image and the feature vector of the image from the training data set depicting the first object may be determined. For example, a cosine distance, a Minkowski distance, a Euclidean distance, or another distance measure, or a combination thereof, may be used to compute the distance between the feature vector of the image and the feature vector of the image from the training data set depicting the first object. In some embodiments, step 1008A may be performed by a subsystem that is the same or similar to distance determination subsystem 122.

At step 1010A, a second distance in feature space between the image feature vector of the image and a second feature vector of the second object may be determined. For instance, similar to step 1008A above, the feature vector of the image may be compared against the feature vectors of the images from the training data set to determine which object is depicted within the image. The feature vector from the training data set's images that is determined to be closest in feature space to the feature vector of the image may indicate that that object is depicted within the image. In some embodiments, if a distance between the feature vector of the image and a feature vector of an image from the training data set is less than a threshold distance value, then the image may be classified as including the object depicted by the image from the training data set. In some embodiments, the distance between the feature vector of the image and the feature vector of the classified object may be determined. For example, a cosine distance, a Minkowski distance, a Euclidean distance, or another distance measure, or a combination thereof, may be used to compute the distance between the feature vector of the image and the feature vector of the image from the training data set depicting the second object. In some embodiments, step 1010A may be performed by a subsystem that is the same or similar to distance determination subsystem 122.

At step 1012A, a third distance, in pixel-space of the image, between the input location of the input and a first location of the first object may be determined. As mentioned previously, the coordinates in a coordinate space of a display screen with which the input is detected may be determined. In some embodiments, determining the coordinates in the coordinate space of the display screen of the input may include determining a location of a change in resistance of a touch-sensitive display screen, indicative of where a conductive object (e.g., a finger, stylus, etc.) interacted with the touch-sensitive display. The coordinates in the coordinate space of the display screen may be mapped to a location in pixel-space based on a precomputed mapping function. The pre-computed mapping function may map each coordinate (e.g., X coordinate, Y coordinate) in the coordinate space of the display screen to a pixel or set of pixels in pixel-space for a given pixel resolution of an image. For instance, depending on the resolution of an image, the coordinate space coordinates may map to different the pixel-space coordinates. Using the coordinates in pixel space of the input, determined from the mapping of the coordinates in coordinate space of the display screen, and the coordinates of the first object in pixel-space (or coordinate space, where a similar mapping may be employed), a distance between the input's coordinates and the first object's coordinates may be determined. In some embodiments, step 1012A may be performed by a subsystem that is the same or similar to distance determination subsystem 122.

At step 1014A, a fourth distance, in pixel-space of the image, between the input location of the input and a second location of the second object may be determined. In some embodiments, step 1014A may be similar to step 1012A with the exception that the distance computed is in relation to the second object, as opposed to the first object. In some embodiments, step 1014A may be performed by a subsystem that is the same or similar to distance determination subsystem 122.

At step 1016, an object identifier of the first object from an object ontology may be caused to be stored in memory based on the first distance, the second distance, the third distance, and the fourth distance. For instance, based on the first distance and the second distance, which are in feature space, a determination may be made that the first object (e.g., first object 702A) depicted in the image corresponds to an object from the object ontology labeled with a first object identifier, while the second object (e.g., second object 704A) depicted in the image corresponds to another object from the object ontology labeled with a second object identifier. In some embodiments, a determination may be made that, based on the third distance and the fourth distance, which are in pixel-space of the image, that the input was closer to the first object. This may indicate that the input was likely directed to the first object, and therefore the first object identifier may be assigned to the image and stored in memory in association with the image (e.g., within training data database 136A). In some embodiments, the image and the first object identifier may be provided to a visual search system, such as visual search subsystem 118A, to facilitate performance of a search for information related to the first object (e.g., which may be resolved as being the object from the object ontology labeled with the first object identifier). In some embodiments, step 1016 may be performed by a subsystem that is the same or similar to distance determination subsystem 122.

Sparse Learning for Computer Vision

Existing computer-vision object detection and localization approaches often suffer from lower accuracy and are more computationally expensive than is desirable. In many cases, these challenges are compounded by use cases in which training sets are relatively small, while candidate objects in an ontology are relatively large. For example, a training data set may have less than 100 example images of each object, less than 10 example images of each object, or even a single image of each object. A computer-vision object recognition model trained with a training data set of these sizes may have a lower accuracy and scope, particularly when the candidate objects in an object ontology include more than 1,000 objects, more than 10,000 objects, more than 100,000 objects, or more than 1,000,000 objects. In some cases, ratios of any permutation of these numbers may characterize a relevant scenario. For example, a ratio of example images per object to objects in an ontology of less than $1/100$; $1/1,000$; $1/10,000$; or $1/100,000$ may characterize a scenario where an object recognition model trained with training data having one of the aforementioned ratios may produce poor results.

Some embodiments accommodate sparse training sets by implementing continual learning (or other forms of incremental learning) in a discriminative computer-vision model for object-detection. An example of a model for implementing incremental learning may include incremental support vector machine (SVM) models. Another example model may be a deep metric learning model, which may produce results including embeddings that have higher discriminative power than a regular deep learning model. For instance, clusters formed in an embedding space using the results of a deep metric learning model may be compact and well-separated. In some embodiments, feature vectors of an object the model is configured to detect are enriched at runtime. In some cases, after detecting the object in a novel image (e.g., outside of the model's previous training set), some embodiments enrich (or otherwise adjust) the feature vector of the object in the model with additional features of the object appearing in the new image, enrich parameters of the object recognition model, or both.

In some embodiments, a downstream layer of the model (e.g., a last or second to last layer) may produce an embedding for each image from the training data set and each newly received image. Each embedding may be mapped to an embedding space, which has a lower dimensionality than a number of pixels of the image. In some embodiments, a density of a cluster in the embedding space may be used to determine relationships between each embedding's corresponding image. In some embodiments, a clustering quality may be determined using a clustering metric, such as an F1 score, a Normalized Mutual Information (NMI) score, or the Mathews Correlation Coefficient (MCC). In some embodiments, embeddings for each image may be extracted using a pre-trained deep learning network. In some embodiments, the pre-trained deep learning network may include a deep neural network having a large number of layers. For example, the deep neural network may include six or more layers. A pre-trained deep learning network may include a number of stacked neural networks each of which includes several layers. As mentioned previously, the embeddings may refer to a higher dimension representation of a discrete variable where the number of dimensions is less than, for example, a number of pixels of an input image. Using the pre-trained deep learning network, an embedding may be extracted for each image. The embedding may be a representation of an object depicted by an image (e.g., a drill to be exactly matched). The embeddings may be generated using different models for aspects such as color, pattern, or other aspects. For example, a model may extract a color embedding that identifies a color of the object within an image, while another model may determine a pattern embedding identifying patterns within the image. In some embodiments, the embedding may be represented as a tensor. For example, an embedding tensor of rank 1 may refer to an embedding vector composed of an array of numbers (e.g., a 1 by N or N by 1 vector). The dimensionality of an embedding vector may vary depending on use case, for instance the embedding vector may be 32 numbers long, 64 numbers long, 128 numbers long, 256 numbers long, 1024 numbers long, 1792 numbers long, etc. The embeddings mapped to an embedding space may describe a relationship between two images. As an example, a video depicting a drill split into 20 frames may produce 20 vectors that are spatially close to one another in the embedding space because each frame depicts a same drill. An embedding space is specific to a model that generates the vectors for that embedding space. For example, a model that is trained to produce color embeddings would refer to a different embedding space that is unrelated to an embedding space produced by an object recognition model (e.g., each embedding space is independent form one another). In some embodiments, the spatial relationship between two (or more) embedding vectors in embedding space may provide details regarding a relationship of the corresponding images, particularly for use cases where a training data set includes a sparse amount of data.

Some embodiments perform visual searches using sparse data. Some embodiments determine whether to enrich a training data set with an image, features extracted from the image, or both, based on a similarity between the image and a previously analyzed image (e.g., an image from a training data set). Some embodiments determine whether an image previously classified as differing from the images including within a training data set may be added to the training data set based on a similarity measure computed with respect to the previously classified image and a newly received image.

To typically train a classifier, a large collection of examples are needed (e.g., 100-1000 examples per class). For example, ImageNet is an open source image repository that is commonly used to train object recognition models. The ImageNet repository includes more than 1 million images classified into 1,000 classes. However, when as little as one image is available to train an object recognition model, performing an accurate visual search can become challenging (which is not to suggest that the present techniques are not also useful for more data rich training sets or than any subject matter is disclaimed here or elsewhere herein).

In some embodiments, a plurality of images may be obtained where each image depicts a different object (e.g., a ball, a drill, a shirt, a human face, an animal, etc.). For example, a catalog of products may be obtained from a retailer or manufacturer and the catalog may include as few as one image depicting each product. The catalog of products may also include additional information associated with each product, such as an identifier used to label that product (e.g., a SKU for the product, a barcode for the product, a serial number of the product, etc.), attributes of the product (e.g., the product's material composition, color options, size, etc.), and the like. In some embodiments, a neural network or other object recognition model may be trained to produce a feature vector for each object depicted within one of the plurality of images. Depending on the number of features used, each object's image may represent one point in an n-dimensional vector space. In some embodiments, the object recognition model may output graph data indicating each object's location in the n-dimensional vector space. Generally, images that depict similar objects will be located proximate to one another in the n-dimensional vector space, whereas images that depict different objects will not be located near one another in the n-dimensional vector space.

In some embodiments, a user may submit an image of an item with the goal of a visual search system including an object recognition model identifying the corresponding object from the submitted image. The submitted photo may be run through the object recognition model to produce a feature vector for that image, and the feature vector may be mapped into the n-dimensional vector space. In some embodiments, a determination may be made as to which point or points in the n-dimensional vector space are "nearest" to the submitted feature vector's point. Using distance metrics to analyze similarity in feature vectors (e.g., Cosine distance, Euclidean distance, Manhattan distance, Minkowski distance, Mahalanobis distance), the feature vector closest to the submitted feature vector may be identified, and the object corresponding to that feature vector may be determined to be a "matching." Some embodiments may include a user brining the object to a computing device configured to capture an image of the object, and provide an indication of any "matching" objects to the user. For example, the computing device may be part of or communicatively coupled to a kiosk including one or more sensors (e.g., a weight sensor, a temperature sensor, etc.) and one or more cameras. The user may use the kiosk for capturing the image, and the kiosk may provide information to the user regarding an identify (e.g., a product name, product description, location of the product in the store, etc.) of the object. In some embodiments, the submitted image, its corresponding feature vector, or both, may also be added to a database of images associated with that product. So, instead of the database only having one image of a particular object, upon the submitted image, its feature vector, or both, being added to the database, the database may now two images depicting that product—the original image and the submitted image.

In some embodiments, prior to adding the submitted image, its feature vector, or both, to the database, a determination may be made as to whether the image should be added. For instance, if the submitted image depicts the same object in a same manner (e.g., same perspective, same color, etc.), then inclusion of this image may not improve the accuracy of the object recognition model. For example, if the distance between the feature vector of the submitted image and the feature vector of an original image depicting the object stored in the database is less than a threshold distance (e.g., the cosine distance is approximately 1), then the submitted image, its feature vector, or both, may not provide any information gain, and in some cases, may not be added to the database.

In some embodiments, previously submitted images that were not identified as depicting a same or similar object as that of any of the images stored in the database may be re-analyzed based on the newly added image (e.g., the submitted image), its feature vector, or both. For example, a first image may have been determined to be dissimilar from any image included within a training data set of an object recognition model. However, after a newly submitted image is added to the training data set, such as in response to determining that the submitted image "matches" another image included within the training data set, the newly added image may be compared to the first image. In some embodiments, a similarity measure (e.g., a distance in feature space) between the first image and the newly added image may be computed and, if the similarity satisfies a threshold similarity condition (e.g., the distance is less than a first threshold distance), the first image may be added to the training data set. Similarly, this process may iteratively scan previously obtained images to determine whether any are "similar" to the newly added image. In this way, the training data set may expand even without having to receive new images, but instead by obtaining a "bridge" image that bridges two otherwise "different" images.

Generally, the more images that are submitted for a training data set including images depicting a given object, the more accurate the object recognition model may become at identifying images that include the object. As an illustrative example, a catalog may include a single image of a particular model drill at a given pose (e.g., with at 0-degrees azimuth relative to some arbitrary plane in a coordinate system of the drill). In some embodiments, an object recognition model, such as a deep neural network, may produce a feature vector for the object based on the image. Some embodiments may receive an image of the same model drill (e.g., from another mobile computing device) at a later time, where this image depicts the drill at a different pose (e.g., with a 30-degree angle). The object recognition model may produce another feature vector for the object based on the newly submitted photo. Some embodiments may characterize the object based on both of feature vectors, which are expected to be relatively close in feature space (e.g., as measured by cosine distance, Minkowski distance, Euclidean distance, Mahalanobis distance, Manhattan distance, etc.) relative to feature vectors of other objects. Based on a proximity between the original feature vector and the submitted feature vector being less than a threshold distance (or more than a threshold distance from other feature vectors, or based on a cluster being determined with techniques like DB-SCAN), some embodiments may determine that the submitted photo depicts the same model drill (and in some cases, that it depicts the drill at a novel angel relative to previously obtained images). In response, some embodiments may: 1) add the new feature vector to a discriminative computer vision object recognition model with a label associating the added feature vector to the drill (resulting in multiple feature vectors having the same label of the drill), thereby enriching one or more parameters of the discriminative computer vision object recognition model; 2) modify an existing feature vector of the drill (e.g., representing the drill with a feature vector corresponding to a centroid of a cluster corresponding to the drill); or 3) add the image, the feature vector, or both the image and the feature vector, to a training data set with a label identifying the drill to be used in a subsequent training operation by which a computer vision object recognition model is updated or otherwise formed. Locations in vector space relative to which queries are compared may be volumes (like convex hulls of clusters) or points (like nearest neighbors among a training set's vectors).

In some embodiments, when a new image of the drill at yet another (e.g., novel relative to a training set) angle (e.g., 45-degrees) is received, a feature vector may be extracted from the image, and the resulting un-labeled feature vector may be matched to a closest labeled feature vector of the model (e.g., as determined with the above-noted distance measures). The new image may be designated as depicting the object labeled with the label born by the selected, closest feature vector of the model. In this way, a robust database of images and feature vectors for each item may be obtained.

In some embodiments, a popularity of an item or items (or co-occurrence rates of items in images) may be determined based on a frequency (or frequency and freshness over some threshold training duration, like more or less than a previous hour, day, week, month, or year) of searching or a frequency of use of a particular object classifier. For example, searches may form a time series for each object indicating fluctuations in popularity of each object (or changes in rates of co-occurrence in images). Embodiments may analyze these time series to determine various metrics related to the objects.

Some embodiments may implement unsupervised learning of novel objects absent from a training data set or extant ontology of labels. Some embodiments may cluster feature vectors, such as by using density-based clustering in the feature space. Some embodiments may determine whether clusters have less than a threshold amount (e.g., zero) labeled feature vectors. Such clusters may be classified as representing an object absent from the training data set or object ontology, and some embodiments may update the object ontology to include an identifier of the newly detected object. In some embodiments, the identifier may be an arbitrary value, such as a count, or it may be determined with techniques like applying a captioning model to extract text from the image, or by executing a reverse image lookup on an Internet image search engine and ranking text of resulting webpages by term-frequency inverse document frequency to infer a label from exogenous sources of information.

Some embodiments may enhance a training set for a visual search process that includes the following operations: 1) importing a batch of catalog product images, which may be passed to a deep neural network that extracts deep features for each image, which may be used to create and store an index; later, at run time, 2) receive a query image, pass the image to a deep neural network that extracts deep features, before computing distances to all images in the index and presenting a nearest neighbor as a search result. Some embodiments may receive a query image (e.g., a URL of a selected online image hosted on a website, a captured image from a mobile device camera, or a sketch drawn by a user in a bitmap editor) and determine the nearest neighbor, computing its distance in vector space.

Based on the distance (e.g., if the distance is less than 0.05 on a scale of 0-1), embodiments may designate the search was successful with a value indicating relatively high confidence, and embodiments may add the query image to the product catalog as ground truth to the index. If the distance is greater than certain threshold (e.g., 0.05 and less than say 0.2), embodiments may designate the result with a value indicating partial confidence and engage subsequent analysis, which may be higher latency operations run offline (i.e., not in real-time, for instance, taking longer than 5 seconds). For example, some embodiments may score the query image with each model in an ensemble of models (like an ensemble of deep convolutional neural networks) and based on a combined score (like an average or other measure of central tendency of the models) confirm that new object belongs to the same object as first network has predicted, before adding it to the index in response. The ensemble of models may operate offline, which may afford fewer or no constraints on latency, so different tradeoffs between speed and accuracy can be made.

In some embodiments, if the distance is greater than a threshold, embodiments may generate a task for humans (e.g., adding an entry and links to related data to a workflow management application), who may map the query to correct product, and embodiments may receive the mapping and update the index accordingly in memory. Or in some cases, the image may be determined to not correspond to the product or be of too low quality to warrant addition.

The machine learning techniques that can be used in the systems described herein may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

In some embodiments, a feature extraction process may use deep learning processing to extract features from an image. For example, a deep convolution neural network (CNN), trained on a large set of training data (e.g., the AlexNet architecture, which includes 5 convolutional layers and 3 fully connected layers, trained using the ImageNet dataset) may be used to extract features from an image. In some embodiments, to perform feature extraction, a pre-trained machine learning model may be obtained, which may be used for performing feature extraction for images from a set of images. In some embodiments, a support vector machine (SVM) may be trained with a training data to obtain a trained model for performing feature extraction. In some embodiments, a classifier may be trained using extracted features from an earlier layer of the machine learning model. In some embodiments, preprocessing may be performed to an input image prior to the feature extraction being performed. For example, preprocessing may include resizing, normalizing, cropping, etc., to each image to allow that image to serve as an input to the pre-trained model. Example pre-trained networks may include AlexNet, GoogLeNet, MobileNet V1, MobileNet V2, MobileNet V3, and others. In some embodiments, the pre-trained networks may be optimized for client-side operations, such as MobileNet V2.

The preprocessing input images may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in memory. In some embodiments, a feature vector describing visual features extracted from an image from the network, and may describe one or more contexts of the image and one or more objects determined to be depicted by the image. In some embodiments, the feature vector, the input image, or both, may be used as an input to a visual search system for performing a visual search to obtain information related to objects depicted within the image (e.g., products that a user may purchase).

In some embodiments, context classification models, object recognition models, or other models, may be generated using a neural network architecture that runs efficiently on mobile computing devices (e.g., smart phones, tablet computing devices, etc.). Some examples of such neural networks include, but are not limited to MobileNet V1, MobileNet V2, MobileNet V3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster. Generally, neural networks running on mobile computing devices include a stack or stacks of residual blocks. Each residual blocks may include an expansion layer, a filter layer, and a compression layer. With MobileNet V2, three convolutional layers are included: a 1×1 convolution layer, a 3×3 depthwise convolution layer, and another 1×1 convolution layer. The first 1×1 convolution layer may be referred to as the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. In Mobile Net V2, the compression layer includes another 1×1 kernel. Additionally, with MobileNet V2, there is a residual connection to help gradients flow through the network and connects the input to the block to the output from the block. In some embodiments, the neural network or networks may be implemented using server-side programming architecture, such as Python, Keras, and the like, or they may be implanted using client-side programming architecture, such as TensorFlow Lite or TensorRT.

As described herein, the phrases "computer-vision object recognition model" and "object recognition computer-vision model" may be used interchangeably.

Figure 11:
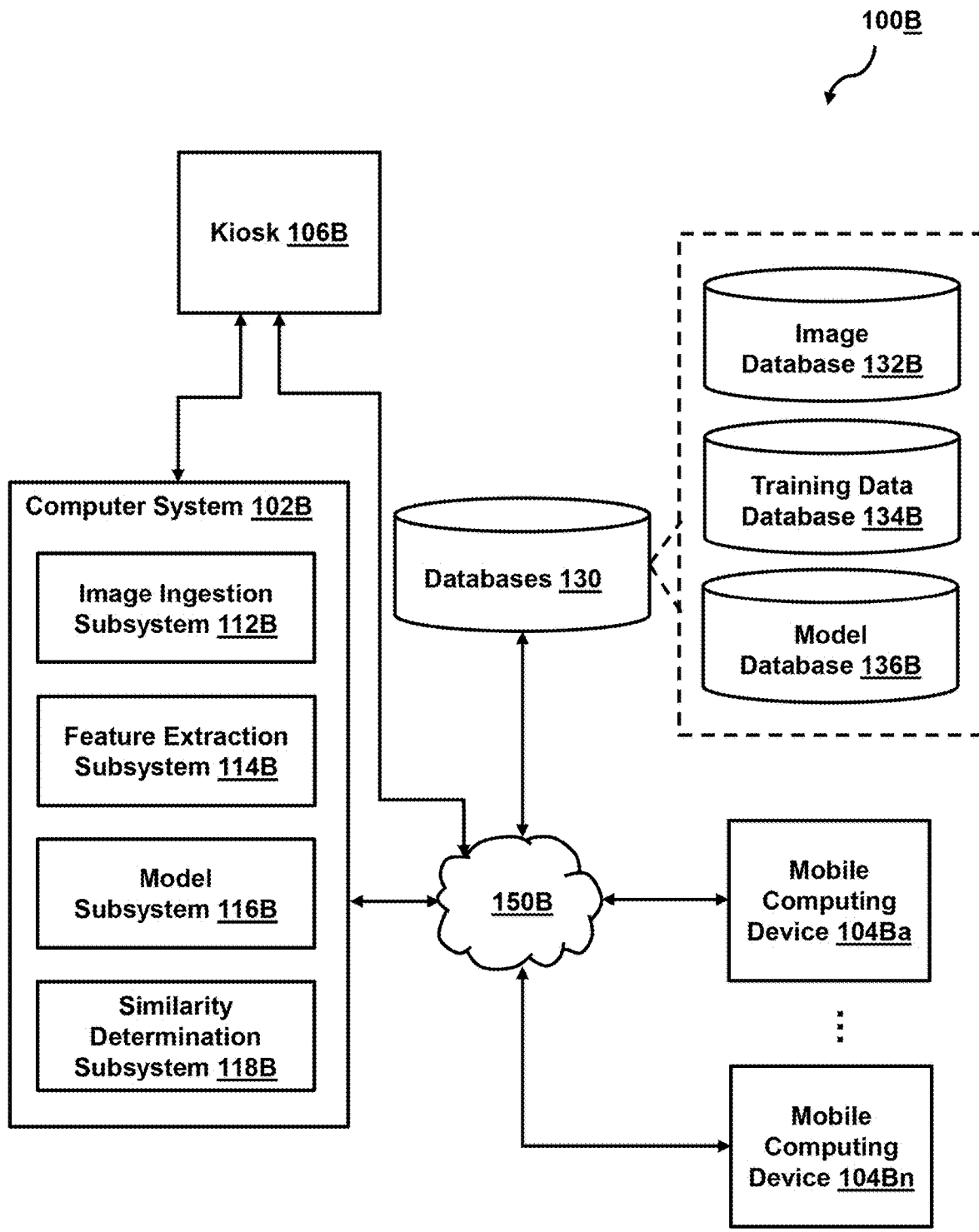
FIG. 11 illustrates an example system for performing sparse learning for computer vision, in accordance with various embodiments.

FIG. 11 illustrates an example system for performing sparse learning for computer vision, in accordance with various embodiments. System 100B of FIG. 11 may include a computer system 102B, databases 130B, mobile computing devices 104Ba-104Bn (which may be collectively referred to herein as mobile computing devices 104B, or which may be individually referred to herein as mobile computing device 104B), and other components. Each mobile computing device 104B may include an image capturing component, such as a camera, however some instances of mobile computing devices 104B may be communicatively coupled to an image capturing component. For example, a mobile computing device 104B may be wirelessly connected (e.g., via a Bluetooth connection) to a camera, and images captured by the camera may be viewable, stored, edited, shared, or a combination thereof, on mobile computing device 104B. In some embodiments, each of computer system 102B and mobile computing devices 104B may be capable of communicating with one another, as well as databases 130B, via one or more networks 150B. Computer system 102B may include an image ingestion subsystem 112B, a feature extraction subsystem 114B, a model subsystem 116, a similarity determination subsystem 118B, a training data subsystem 120B, and other components. Databases 130B may include an image database 132B, a training data database 134B, a model database 136B, and other databases. Each of databases 132B-136B may be a single instance of a database or may include multiple databases, which may be co-located or distributed amongst a number of server systems. Some embodiments may include a kiosk 106B or other computing device coupled to computer system 102B or mobile computing device 104B. For example, kiosk 106B, which is described in greater detail below with reference to FIG. 21, may be configured to capture an image of an object may be connected to computer system 102B such that the kiosk may provide the captured image to computer system 102B, which in turn may perform a visual search for the object and provide information related to an identity of the object to the kiosk.

In some embodiments, image ingestion subsystem 112B may be configured to obtain images depicting objects for generating or updating training data. For example, a catalog including a plurality of images may be obtained from a retailer, a manufacturer, or from another source, and each of the images may depict an object. The objects may include products (e.g., purchasable items), people (e.g., a book of human faces), animals, scenes (e.g., a beach, a body of water, a blue sky), or any other object, or a combination thereof. In some embodiments, the catalog may include a large number of images (e.g., 100 or more images, 1,000 or more images, 10,000 or more images), however the catalog may include a small number of images (e.g., fewer than 10 images, fewer than 5 images, a single image) depicting a given object. For example, a product catalog including images depicting a variety of products available for purchase at a retail store may include one or two images of each product (e.g., one image depicting a drill, two images depicting a suit, etc.). The small quantity of images of each object can prove challenging when training an object recognition model to recognize instances of those objects in a newly obtained image. Such a challenge may be further compounded by the large number of objects in a given object ontology (e.g., 1,000 or more objects, 10,000 or more objects, etc.).

In some embodiments, the images may be obtained from mobile computing device 104B. For example, mobile computing device 104B may be operated by an individual associated with a retailer, and the individual may provide the images to computer system 102B via network 150B. In some embodiments, the images may be obtained via an electronic communication (e.g., an email, an MMS message, etc.). In some embodiments, the images may be obtained by image ingestion subsystem 112B by accessing a uniform resource locator (URL) where the images may be downloaded to a memory of computer system 102B. In some embodiments, the images may be obtained by scanning a photograph of an object (e.g., from a paper product catalog), or by capturing a photograph of an object.

In some embodiments, each image that is obtained by image ingestion subsystem 112B may be stored in image database 132B. Image database 132B may be configured to store the images organized by using various criteria. For example, the images may be organized within image database 132B with a batch identification number indicating the batch of images that were uploaded, temporally (e.g., with a timestamp indicating a time that an image was (i) obtained by computer system 102B, (ii) captured by an image capturing device, (iii) provided to image database 132B, and the like), geographically (e.g., with geographic metadata indicating a location of where the object was located), as well as based on labels assigned to each image which indicate an identifier for an object depicted within the image. For instance, the images may include a label of an identifier of the object (e.g., a shoe, a hammer, a bike, etc.), as well as additional object descriptors, such as, and without limitation, an object type, an object subtype, colors included within the image, patterns of the object, and the like.

In some embodiments, image ingestion subsystem 112B may be configured to obtain an image to be used for performing a visual search. For example, a user may capture an image of an object that the user wants to know more information about. In some embodiments, the image may be captured via mobile computing device 104B, and the user may send the image to computer system 102B to perform a visual search for the object. In response, computer system 102B may attempt to recognize the object depicted in the image using a trained object recognition model, retrieve information regarding the recognized object (e.g., a name of the object, material composition of the object, a location of where the object may be purchased, etc.), and the retrieved information may be provided back to the user via mobile computing device 104B. In some embodiments, an individual may take a physical object to a facility where kiosk 106B is located. The individual may use kiosk 106B (e.g., via one or more sensors, cameras, and other components of kiosk 106B) to analyze the object, capture an image of the object. In some embodiments, kiosk 106B may include some or all of the functionality of computer system 102B, or of a visual search system, and upon capturing an image depicting the object, may perform a visual search to identify the object and retrieve information regarding the identified object. Alternatively, or additionally, kiosk 106B may provide the captured image of the object, as well as any data output by the sensors of kiosk 106B (e.g., a weight sensor, dimensionality sensor, temperature sensor, etc.), to computer system 102B (either directly or via network 150B). In response to obtaining the captured image, image ingestion subsystem 112B may facilitate the performance of a visual search to identify the object depicted by the captured image, retrieve information related to the identified image, and provide the retrieved information to kiosk 106B for presentation to the individual.

In some embodiments, feature extraction subsystem 114B may be configured to extract features from each image obtained by computer system 102B. The process of extracting features from an image represents a technique for reducing the dimensionality of an image, which may allow for simplified and expedited processing of the image, such as in the case of object recognition. An example of this concept is an N×M pixel red-blue-green (RBG) image being reduced from N×M×3 features to N×M features using a mean pixel value process of each pixel in the image from all three-color channels. Another example feature extraction process is edge feature detection. In some embodiments, a Prewitt kernel or a Sobel kernel may be applied to an image to extract edge features. In some embodiments, edge features may be extracted using feature descriptors, such as a histogram of oriented gradients (HOG) descriptor, a scale invariant feature transform (SIFT) descriptor, or a speeded-up robust feature (SURF) description.

In some embodiments, feature extraction subsystem 114B may use deep learning processing to extract features from an image, whether the image is from a plurality of images initially provided to computer system 102B (e.g., a product catalog), or a newly received image (e.g., an image of an object captured by kiosk 106B). For example, a deep convolution neural network (CNN), trained on a large set of training data (e.g., the AlexNet architecture, which includes 5 convolution layers and 3 fully connected layers, trained using the ImageNet dataset) may be used to extract features from an image. Feature extraction subsystem 114B may obtain a pre-trained machine learning model from model database 136B, which may be used for performing feature extraction for images from a set of images provided to computer system 102B (e.g., a product catalog including images depicting products). In some embodiments, a support vector machine (SVM) may be trained with a training data to obtain a trained model for performing feature extraction. In some embodiments, a classifier may be trained using extracted features from an earlier layer of the machine learning model. In some embodiments, feature extraction subsystem 114B may perform preprocessing to the input images. For example, preprocessing may include resizing, normalizing, cropping, etc., to each image to allow that image to serve as an input to the pre-trained model. Example pre-trained networks may include AlexNet, GoogLeNet, MobileNet-v2, and others. The preprocessing input images may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in training data database 134B as a training data set used to train a computer-vision object recognition model.

In some embodiments, model subsystem 116 may be configured to obtain a training data set from training data database 134B and obtain a computer-vision object recognition model from model database 136B. Model subsystem 116 may further be configured to cause the computer-vision object recognition model to be trained based on the training data set. An object recognition model may describe a model that is capable of performing, amongst other tasks, the tasks of image classification and object detection. Image classification relates to a task whereby an algorithm determines an object class of any object present in an image, whereas object detection relates to a task whereby an algorithm that detect a location of each object present in an image. In some embodiments, the task of image classification takes an input image depicting an object and outputs a label or value corresponding to the label. In some embodiments, the task of object localization locates the presence of an object in an image (or objects if more than one are depicted within an image) based on an input image, and outputs a bounding box surrounding the object(s). In some embodiments, object recognition may combine the aforementioned tasks such that, for an input image depicting an object, a bounding box surrounding the object and a class of the object are output. Additional tasks that may be performed by the object recognition model may include object segmentation, where pixels represented a detected object are indicated.

In some embodiments, the object recognition model may be a deep learning model, such as, and without limitation, a convolutional neural network (CNN), a region-based CNN (R-CNN), a Fast R-CNN, a Masked R-CNN, Single Shot Multibox (SSD), and a You-Only-Look-Once (YOLO) model (lists, such as this one, should not be read to require items in the list be non-overlapping, as members may include a genus or species thereof, for instance, a R-CNN is a species of CNN and a list like this one should not be read to suggest otherwise). As an example, an R-CNN may take each input image, extract region proposals, and compute features for each proposed region using a CNN. The features of each region may then be classified using a class-specific SVM, identifying the location of any objects within an image, as well as classifying those images to a class of objects.

The training data set may be provided to the object recognition model, and model subsystem 116 may facilitate the training of the object recognition model using the training data set. In some embodiments, model subsystem 116 may directly facilitate the training of the object recognition model (e.g., model subsystem 116 trains the object recognition model), however alternatively, model subsystem 116 may provide the training data set and the object recognition model to another computing system that may train the object recognition model. The result may be a trained computer-vision object recognition model, which may be stored in model database 136B.

In some embodiments, parameters of the object recognition model, upon the object recognition model being trained, may encode information about a subset of visual features of each of object from the images included by the training data set. Furthermore, the subset of visual features may be determined based on visual features extracted from each image of the training data set. In some embodiments, the parameters of the object recognition model may include weights and biases, which are optimized by the training process such that a cost function measuring how accurately a mapping function learns to map an input vector to an expected outcome is minimized. The number of parameters of the object recognition model may include 100 or more parameters, 10,000 or more parameters, 100,000 or more parameters, or 1,000,000 or more parameters, and the number of parameters may depend on a number of layers the model includes. In some embodiments, the values of each parameter may indicate an effect on the learning process that each visual feature of the subset of visual features has. For example, the weight of a node of the neural network may be determined based on the features used to train the neural network, therefore the weight encodes information about the parameter because the weight's value is obtained as a result of its optimization from the subset of visual features.

In some embodiments, model subsystem 116 may be further configured to obtain the trained computer-vision object recognition model from model database 136B for use by feature extraction subsystem 114B to extract features from a newly received image. For example, a newly obtained image, such as an image of an item captured by kiosk 106B and provided to computer system 102B, may be analyzed by feature extraction subsystem 114B to obtain features describing the image, and any object depicted by the image. Feature extraction subsystem 114B may request the trained object recognition model from model subsystem 116, and feature extraction subsystem 114B may use the trained object recognition model to obtain features describing the image. In some embodiments, model subsystem 116 may deploy the trained computer-vision object recognition model such that, upon receipt of a new image, the trained computer-vision object recognition model may be used to extract features of the object and determine what object or objects, if any, are depicted by the new image. For example, the trained computer-vision object recognition model may be deployed to kiosk 106B, which may use the model to extract features of an image captured thereby, and provide those features to a visual search system (e.g., locally executed by kiosk 106B, a computing device connected to kiosk 106B, or a remote server system) for performing a visual search.

In some embodiments, similarity determination subsystem 118B may be configured to determine whether an object (or objects) depicted within an image is similar to an object depicted by another image used to train the object recognition model. For example, similarity determination subsystem 118B may determine, for each image of the training data set, a similarity measure between the newly obtained image and a corresponding image from the training data set. Similarity determination subsystem 118B may determine a similarity between images, which may indicate whether the images depict a same or similar object. In some embodiments, the similarity may be determined based on one or more visual features extracted from the images. For example, a determination of how similar a newly received image is with respect to an image from a training data set may be determined by determining a similarity of one or more visual features extracted from the newly received image and one or more visual features extracted from the image from the training data set.

In some embodiments, to determine the similarity between the visual features of two (or more) images, a distance between the visual features of those images may be computed. For example, the distance computed may be a cosine distance, a Minkowski distance, a Euclidean distance, a Hamming distance, a Manhattan distance, a Mahalanobis distance, or any other vector space distance measure, or a combination thereof. In some embodiments, if the distance is less than or equal to a threshold distance value, then the images may be classified as being similar. For example, two images may be classified as depicting a same object if the distance between those images' feature vectors (e.g., determined by computing a dot product of the feature vectors) is approximately zero (e.g., $\cos(\theta) \sim 1$). In some embodiments, the threshold distance value may be predetermined. For example, a threshold distance value that is very large (e.g., where $\theta$ is the angle between the feature vectors, $\cos(\theta) > 0.6$) may produce a larger number of "matching" images. As another example, a threshold distance value that is smaller (e.g., $\cos(\theta) > 0.95$) may produce a small number of "matching" images.

In some embodiments, similarity determination subsystem 118B may be configured to determine based on a similarity between images (e.g., visual features extracted from the features), whether that image should be labeled with an object identifier of the matching image. As an example, a distance between visual features extracted from a newly received image, such as an image obtained from kiosk 106B, and visual feature extracted from an image from a training data set may be determined. If the distance is less than a threshold distance value, this may indicate that the newly received image depicts a same or similar object as the image from the training data set. In some embodiments, the newly received image may be stored in memory with an identifier, or a value corresponding to the identifier, used to label the image from the training data store. In some embodiments, the newly received image may also be added to the training data set such that, when the previously trained object recognition model is re-trained, the training data set will include the previous image depicting the object and the newly received image, which also depicts the object. This may be particularly useful in some embodiments where a small number of images for each object are included in the initial training data set. For example, if a training data set only includes a single image depicting a hammer, a new image that also depicts a same or similar hammer may then be added to the training data set for improving the object recognition model's ability to recognize a presence of a hammer within subsequently received images. In some embodiments, the threshold distance value or other similarity threshold values may be set with an initial value, and an updated or threshold value may be determined over time. For example, an initial threshold distance value may be too low or too high, and similarity determination subsystem 118B may be configured to adjust the threshold similarity value (e.g., threshold distance value) based on the accuracy of the model.

Some embodiments may include enriching, or causing to be enriched, the parameters of the trained computer-vision object recognition model to encode second information about a second subset of visual features of the first object based on the features extracted from the newly received image. For instance, the newly received image and the image may depict the same or similar object, as determined based on the similarity between the features extracted from these images. However, the newly received image may depict some additional or different characteristics of the object that are not present in the image previously analyzed. For example, the first image may depict a drill from a 0-degrees azimuth relative to some arbitrary plane in a coordinate system of the drill, whereas the newly received image may depict the drill from a 45-degree angle, which may reveal some different characteristics of the drill not previously viewable. Thus, the second information regarding these new characteristics may be used to enrich some or all of the parameters of the object recognition model to improve the object recognition model's ability to recognize instances of that object (e.g., a drill) in subsequently received images. In some embodiments, enriching parameters of the computer-vision object recognition model may include re-training the object recognition model using an updated training data set including the initial image (or the subset of visual features extracted from the initial image) and the newly received image (or the subset of visual features extracted from the newly received image). In some embodiments, enriching the parameters may include training a new instance of an object recognition model using a training data set including the initial image (or the subset of visual features extracted from the initial image) and the newly received image (or the subset of visual features extracted from the newly received image). In some embodiments, the parameters being enriched may include adjusting the parameters. For example, the weights and biases of the object recognition model may be adjusted based on changes to an optimization of a loss function for the model as a result of the newly added subset of features.

In some embodiments, similarity determination subsystem 118B may be configured to determine whether a newly received image is too similar to an image already included within a training data set. For instance, a determination may be made as to whether inclusion of the newly received image will improve the accuracy of the object recognition model if added to the training data set. If not, then the newly received image may not be added to the training data set. However, even in such cases, the object identifier for the matching image may be stored in memory in association with the new image. Alternatively, the newly received image may not be stored in association with the object identifier, or value corresponding to the object identifier. In such cases, the newly received image may be stored in image database 132B, temporally or indefinitely, or may be discarded.

In some embodiments, similarity determination subsystem 118B may determine, subsequent to storing a new image, visual features extracted from the new image, or both, in association with an object identifier or value corresponding to the object identifier, whether any previously analyzed images are similar to the new image, visual features, or both. For instance, prior to an image being received, another image may have been analyzed and determined to be not similar to any image stored in memory. As an example, a first image depicting a first object, either originally from the training data set or obtained by computer system 102B from kiosk 106B or mobile computing device 104B, may have been determined to be dissimilar to a second image depicting a second object included within the training data set (e.g., a distance between a feature vector representing visual features extracted from the first image and a feature vector representing visual features extracted from the second image is greater than a first threshold value). In some embodiments, a newly received third image may be determined as being similar to the first image (e.g., a distance between a feature vector representing visual features extracted from the third image is less than the first threshold value). Upon storing the third image in memory in association with an object identifier or value corresponding to the object depicted in the first image, similarity determination subsystem 118B may determine a similarity between the third image and the second image. If the third image and the second image are determined to be similar, then the second image—which previously was determined as being dissimilar to the first image—may also be stored in memory with the object identifier or value corresponding to the object identifier of the object depicted in the first image. Thus, the newly received third image may serve as a bridge to recapture images depicting objects that may have initially be viewed as dissimilar from the images from the training data set. As an example, an image depicting a hammer and an image depicting a fastener may initially have been classified as being dissimilar. However, a new image depicting a hammer and a fastener may be classified as being similar to the image depicting the hammer, and subsequently, the image depicting the fastener may be classified as being similar to the image depicting the hammer and the fastener. Therefore, the image depicting the fastener may be classified as being similar to the image depicting the hammer based on the bridge image depicting the hammer and the fastener.

In some embodiments, the process of recapturing images may be iteratively performed until one or more stopping criteria are met. For example, after each new image is analyzed, all of the stored images may be compared to the new image to determine if the new image is similar to any other images. If so, the new image may be assigned the object identifier of the similar image, as well as, or alternatively, added to a training data set including the similar image. The same steps may be repeated for all images not assigned to a given object identifier or not assigned to any object identifiers (e.g., but stored in image database 132B), to determine if those images are similar to the newly identified similar images. Such steps may loop iteratively for a predetermined number of times (e.g., one or more iterations, five or more iterations, etc.), for a predetermined amount of time (e.g., 1 second, 2 seconds, 5 seconds, 10 seconds, etc.), until no more "similar" images are identified, or a combination thereof.

Figure 12:
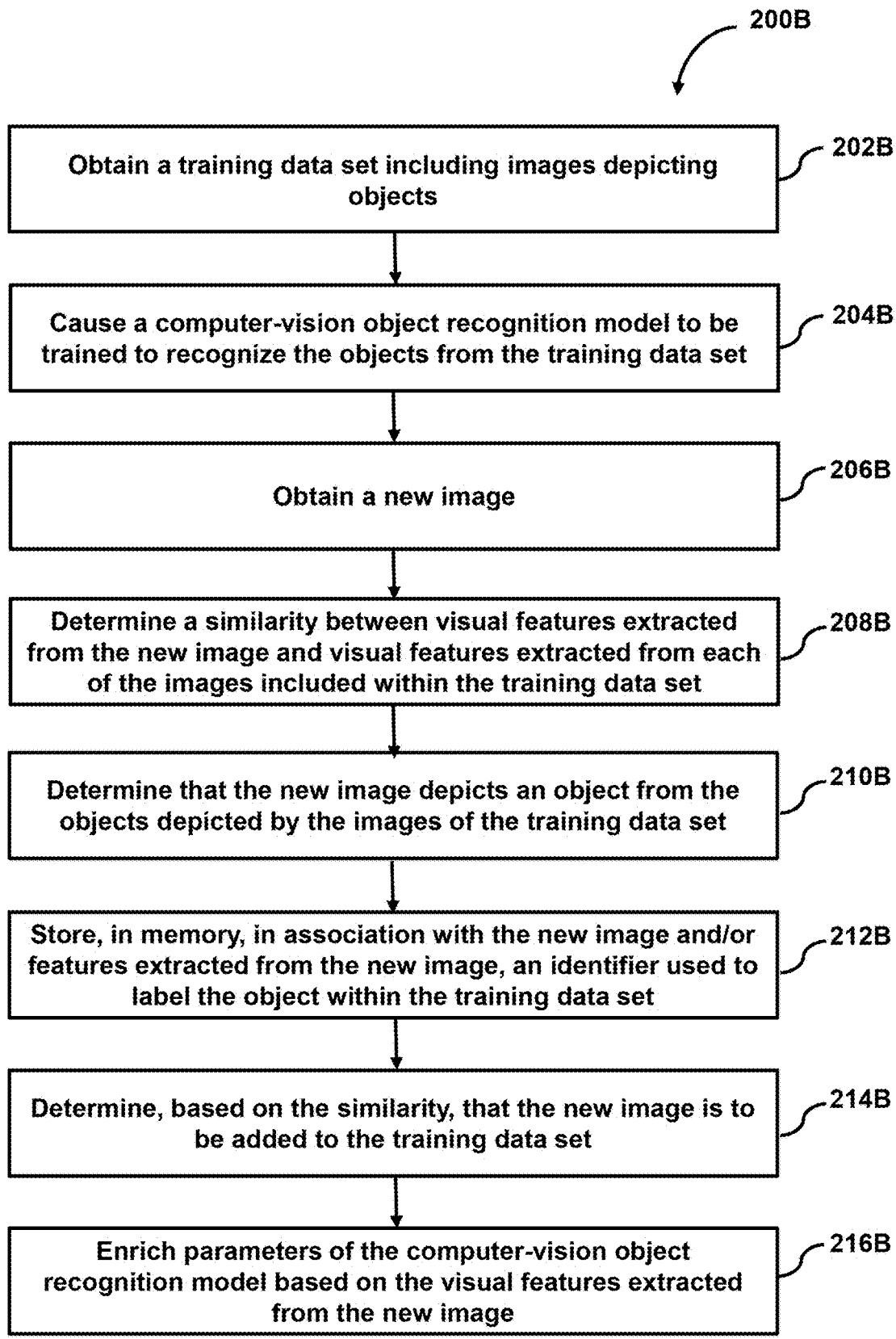
FIG. 12 illustrates an example process for determining whether to a new image is to be added to a training data set for training a computer-vision object recognition model, in accordance with various embodiments.

FIG. 12 illustrates an example process for determining whether to a new image is to be added to a training data set for training a computer-vision object recognition model, in accordance with various embodiments. In some embodiments, process 200B may begin at step 202B. At step 202B, a training data set including images depicting objects may be obtained. In some embodiments, the training data set may include a plurality of images (e.g., 1,000 or more images, 10,000 or more images, 100,000 or more images, 1,000,000 or more images, etc.). Each image may depict an object from an object ontology including a plurality of objects (e.g., 100 or more objects, 1,000 or more objects, 10,000 or more objects, etc.). Some embodiments include an object being depicted by a sparse number of images, such as five or fewer images, 2 or fewer images, or even by only a single image. For example, of the plurality of images obtained, only one image may depict a drill, only one image may depict a fastener, only one image may depict a table, and so on. In some embodiments, the training data set may be generated based on a set of images obtained from an entity, such as a retailer, a manufacturer, a human, etc. For example, the set of images may be analyzed using a pre-trained object recognition model (e.g., AlexNet, GoogLeNet, MobileNet v2, etc.), features may be extracted from each image, and the training data set may be generated based on some or all of the images of the set of images, some or all of the features extracted from the images, or both. The training data set may be stored in training data database 134B, while the set of images may be stored in image database 132B. In some cases, the set of images may be stored in image database 132B for indefinitely, or for a predetermined amount of time (e.g., one day, one week, one month, one year, etc.). In some embodiments, step 202B may be performed by a subsystem that is the same or similar to image ingestion subsystem 112B.

At step 204B, a computer-vision object recognition model may be trained, or caused to be trained, so as to recognize the objects from the training data set. The computer-vision object recognition model may differ from the pre-trained object recognition model described above for generation of the training data set. In some embodiments, the computer-vision object recognition model may be generated to specifically recognize the objects depicted by the images within the training data set. For example, a propriety visual search system may be train an object recognition model to recognize a particular set of objects within input images (e.g., an object recognition model trained to recognize hardware tools in images, an object recognition model trained to recognize furniture in images, a facial recognition model trained to recognize human faces in images, etc.). In some embodiments, the computer-vision object recognition model may be a deep learning network including a plurality of layers, such as a plurality of convolutional layers, a plurality of pooling layers, one or more SoftMax layers, and the like. Some embodiments may include obtaining the (to-be-trained) computer-vision object recognition model from model database 136B, and providing the training data set to the computer-vision object recognition model for training. However, as mentioned above, if the training data set includes a sparse number of images depicting a particular object, the computer-vision object recognition model may have difficulty recognizing instances of the object in subsequently analyzed images unless those images depict the object in a very similar manner. As a result, the overall breadth and accuracy of the object recognition model may suffer due to the limited robustness of the training data set.

Some embodiments may include the trained computer-vision object recognition model having parameters that encode information about a subset of visual features of the object depicted by each image from the training data set. For example, by training the computer-vision object recognition using the training data set, weights and biases of neuron of a neural network (e.g., a convolutional neural network, a deep metric learning network, a region-based convolution neural network, a deep neural network, etc.) may be adjusted. The adjustment of the weights and biases, thus the configurations of the parameters of the object recognition model, enable the object recognition model to recognize objects within input images. For example, for a given input feature vector, generated from features extracted from an image, the model is able to identify an identifier of the object depicted by an image, where the identifier corresponds to one of the identifiers of the objects from the training data set, and a location of the object within the image. Furthermore, the subset of visual features of each object, with which the parameters are encoded with information about, is determined—for each object—based on the extracted visual features from a corresponding image depicting that object. For example, the subset of visual features may include localized gradients for edge detection of each image, a mean pixel value for a multichannel color image, and the like. In some embodiments, step 204B may be performed by a subsystem that is the same or similar to model subsystem 116.

At step 206B, a new image may be obtained. In some embodiments, the new image may be obtained from kiosk 106B. For example, an individual seeking to identify an object, or obtain more information regarding an object, or both, may use kiosk 106B to capture an image of the object. Kiosk 106B may provide the captured image to computer system 102B for performing a visual search, or kiosk 106B may perform the visual search using a computing system integrated into or communicatively coupled or co-located with kiosk 106B. As another example, an individual may capture an image of an object using mobile computing device 104B, and may perform a visual search using mobile computing device 104B or may provide the captured image to computer system 102B (or a different computing system) for performing the visual search. In some embodiments, after the object recognition model has been trained and deployed to a visual search system, where the visual search system may reside on computer system 102B, mobile computing device 104B, kiosk 106B, another computing system, or a combination thereof, the new image may be obtained. In some embodiments, step 206B may be performed by a subsystem that is the same or similar to image ingestion subsystem 112B.

At step 208B, a similarity between visual features extracted from the new image and visual features extracted from each of the images included within the training data set may be determined. In some embodiments, visual features may be extracted from the new image. For example, the trained computer-vision object recognition model may extract one or more visual features describing the new image. The visual features may be compared to the visual features extracted from each of the images from the training data set to determine a similarity between the visual features of the new image and the visual features of the images from the training data set. In some embodiments, the visual features of the new image and the visual features of the images from the training data set may be represented as feature vectors in an n-dimensional feature space.

In some embodiments, a similarity between two images may be determined by computing a distance in the n-dimensional feature space between the feature vector representing the new image and a feature vector of a corresponding image from the training data set. For example, the distance computed may include a cosine distance, a Minkowski distance, a Euclidean distance, or other metric by which similarity may be computed. In some embodiments, step 208B may be performed by a subsystem that is the same or similar to similarity determination sub system 118B.

At step 210B, a determination may be made that the new image depicts an object from the objects depicted by the images of the training data set. In some embodiments, the distance between two feature vectors (e.g., a feature vector describing the new image and a feature vector describing one of the images from the training data set) may be compared to a threshold distance. If the distance is less than or equal to the threshold distance, then the two images may be classified as being similar, classified as depicting a same or similar object, or both. For example, if a cosine of an angle between the two vectors produces a value that is approximately equal to 1 (e.g., $\cos(\theta) \geq 0.75$, $\cos(\theta) \geq 0.8$, $\cos(\theta) \geq 0.85$, $\cos(\theta) \geq 0.9$, $\cos(\theta) \geq 0.95$, $\cos(\theta) \geq 0.99$, etc.), then the two feature vectors may describe similar visual features, and therefore the objects depicted within the images with which the features were extracted from may be classified as being similar. In some embodiments, step 210B may be performed by a subsystem that is the same or similar to similarity determination subsystem 118B.

At step 212B, an identifier used to label the object within the training data set may be stored in memory in association with the new image, the features extracted from the new image, or both the new image and the features extracted from the new image. In some embodiments, each image from the training data set may be labeled with an identifier of the object depicted by that image. Upon determining that a new image depicts a same object as an image from the training data set, the identifier of the object depicted by that image may be stored in association with the new image. For example, if a new image is determined to depict a drill matching a drill depicted by a first image from a training data set, and the first image is labeled with a first identifier depicting the drill, then the new image may be assigned the first identifier. In some embodiments, the first identifier may be stored in image database 132B, training data database 134B, or both image database 132B and training data database 134B with the new image. In some embodiment, a value corresponding to the first identifier may be stored in association with the new image instead of, or in addition to, the first identifier. For instance, an object identifier array may include n-dimensions (e.g., ID_vec=$\{v_1, v_2, \ldots, v_n\}$), where each element represents one object identifier of the object identifiers used to label the objects depicted in the training data set's images. As an example, if the object identifier for a drill corresponds to the $86^{th}$ identifier, then an image depicting a drill would have an ID vector with all elements equal to 0 except for $v_{85}$, which would have a value 1. Therefore, with this example, a new image determined to depict the drill may also have the value 1 for element $v_{85}$ of the ID vector.

In some embodiments, the identifier or value corresponding to the identifier may be stored in memory in association with the new image in response to a determination that the new image depicts a same object as an image from the training data set. For example, the assignment and storage of the identifier or value may occur automatically and immediately in real-time after the determination that the new image depicts the same object. As another example, the assignment and storage of the identifier or value may occur at a later time (e.g., one or more seconds after the determination, one or more minutes after the determination, one or more days after the determination, one or more weeks after the determination, one or more months after the determination, etc.). In some embodiments, step 212B may be performed by a subsystem that is the same or similar to similarity determination subsystem 118B.

At step 214B, a determination may be made that the new image is to be added to the training data set based on the similarity. For instance, because the new image was determined to be similar to another image from the training data set, depict a similar object as an image from the training data set, or both, the new image may be used for subsequent training of the object recognition model. In some embodiments, a determination may be made as to whether the new image is the image from the training data set are too similar. For example, and as mentioned above, a determination may be made that a distance between a feature vector describing the new image and a feature vector describing the image from the training set is less than a first threshold distance value (e.g., $\cos(\theta) \geq 0.75$, $\cos(\theta) \geq 0.8$, $\cos(\theta) \geq 0.85$, $\cos(\theta) \geq 0.9$, $\cos(\theta) \geq 0.95$, $\cos(\theta) \geq 0.99$, etc.), indicating that the two images include similar features. However, if the two images are too similar, such as if the images are identical to one another, then there may be little value in adding that image to the training data set because the object recognition model will likely not learn much, if any, new information. Therefore, a determination may be made as to whether the feature vector describing the new image and the feature vector describing the image from the training set is greater than or equal to a second threshold distance value (e.g., $\cos(\theta) \leq 0.99$, $\cos(\theta) \leq 0.95$, $\cos(\theta) \leq 0.9$, $\cos(\theta) \leq 0.85$, etc.). If so, then this may indicate that the two images include similar features, but are different enough that the new image may be added to the training set for re-training the object recognition model. In some embodiments, step 214B may be performed by a subsystem that is the same or similar to similarity determination subsystem 118B.

At step 216, parameters of the computer-vision object recognition model may be enriched based on the visual features extracted from the new image. In some embodiments, the parameters of the trained computer-vision object recognition model may be enriched such that the parameters encode information about a subset of visual features of the object from the training data set that was identified as being similar to the new image. For instance, visual features extracted from the new image may be used to adjust weights and biases of the object recognition model. In some embodiments, the features extracted from the new image may be included in an updated feature vector describing the image from the training data set that was determined to be similar to the new image. For example, a subset of visual features extracted from the new image may be added to the feature vector of the matching image from the training data set, the subset of visual features may be used to adjust or update a subset of features from the feature vector, or a combination thereof. In some embodiments, the subset of visual features of the object extracted from the new image may differ from a subset of visual features of the object extracted from the matching image. In some embodiments, the information regarding these new characteristics may be used to enrich some or all of the parameters of the object recognition model to improve the object recognition model's ability to recognize instances of that object (e.g., a drill) in subsequently received images. In some embodiments, enriching parameters of the computer-vision object recognition model may include re-training the object recognition model using an updated training data set including the initial image (or the subset of visual features extracted from the initial image) and the newly received image (or the subset of visual features extracted from the newly received image). In some embodiments, enriching the parameters may include training a new instance of an object recognition model using a training data set including the initial image (or the subset of visual features extracted from the initial image) and the newly received image (or the subset of visual features extracted from the newly received image). In some embodiments, step 216 may be performed by a subsystem that is the same or similar to model subsystem 116.

Figure 13:
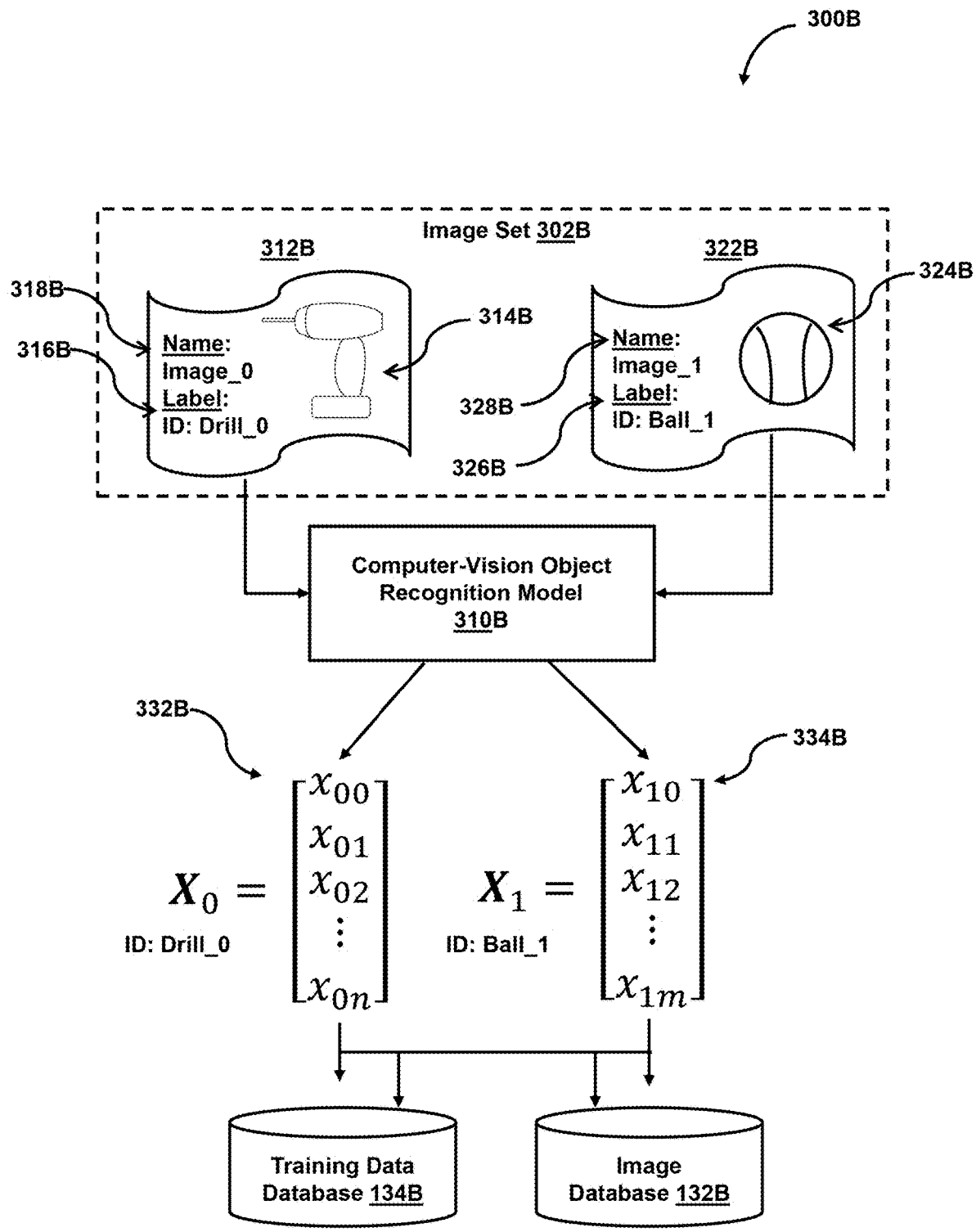
FIG. 13 illustrates an example system for extracting features from images to be added to a training data set, in accordance with various embodiments.

FIG. 13 illustrates an example system for extracting features from images to be added to a training data set, in accordance with various embodiments. In some embodiments, system 300B may include an image set 302B, which may be obtained from image database 132B, training data database 134B, computer system 102B, or another database, or another computing system. In some embodiments, image set 302B may be part or all of a set of input images obtained by image ingestion subsystem 112B. For example, image set 302B may be a portion of a product catalog provided by a retailer to computer system 102B.

In some embodiments, image set 302B may include a plurality of images each depicting at least one object, as well as additional information regarding each of the objects. For instance, image set 302B may include first image data 312B and second image data 322B. In some embodiments, the number of images included within image set 302B may be large, such as 1,000 or more images, 10,000 or more images, 100,000 or more images, 1,000,000 or more images, etc. However, while the number of images may be large, the number of images depicting a same or similar object may be small. For example, image set 302B may include only a single image of a given object. Thus, while image set 302B may be robust, it may also be sparse. Some embodiments describe first image data 312B including a first image 314B depicting a first object (e.g., a drill), a first object identifier 316 used to label the object (e.g., "ID: Drill_0"), and an image name 318B (e.g., "Image_0"). Some embodiments describe second image data 322B including a second image 324B depicting a second object (e.g., a baseball), a second object identifier 326B used to label the object (e.g., ID: Ball_1"), and an image name 328B (e.g., "Image_1"). In some embodiments, image set 302B may include only first image data 312B including first image 314B depicting the first object, and only second image data 322B including second image 324B depicting the second object.

In some embodiments, image set 302B may be provided to a computer-vision object recognition model 310B, which may be configured to analyze first image 314B and second image 324B and output a first feature vector 332B and a second feature vector 334B, respectively. For example, first feature vector 332B may be an n-dimensional feature vector $x_0$ including n elements that describe n visual features of first image 314B. Similarly, second feature vector 334B may be an m-dimensional feature vector $x_1$ including m elements that describe m visual features of first image 324B. In some embodiments, n may equal m, however the values may, alternatively, differ.

In some embodiments, computer-vision object recognition model 310B may be a pre-trained object recognition model stored within model database 136B. For example, the images from image set 302B may be analyzed using a pre-trained object recognition model (e.g., AlexNet, GoogLeNet, MobileNet v2, etc.), and features may be extracted from each image. In some embodiments, a support vector machine (SVM) may be trained with to obtain a trained model for performing feature extraction. In some embodiments, a classifier may be trained using extracted features from an earlier layer of the machine learning model.

After providing images 314B and 324B to computer-vision object recognition model 310B, feature vectors 332B and 334B may be obtained. Furthermore, providing images 314B and 324B to computer-vision object recognition model 310B may cause computer-vision object recognition model 310B to be trained to recognize objects within images. A trained instance of computer-vision object recognition model 310B may be stored in model database 136B, and upon receipt of a new image to be analyzed, the trained computer-vision object recognition model may be retrieved and used to classify and locate objects that may be depicted within the new image. In some embodiments, each of feature vectors 332B and 334B may be formed based on a subset of visual features extracted from each image. For example, the visual features may include color descriptors, shape descriptors, texture descriptors, edge descriptors, and the like. Feature vectors 332B and 334B may each be provided to one or both of training data database 134B and image database 132B to be stored. In some embodiments, feature vectors 332B and 334B may each be stored with their corresponding object identifier. For example, first feature vector 332B, describing visual features extracted from first image 314B, may be stored in image database 132B with first object identifier 316 (e.g., ID: Drill_0), while second feature vector 334B, describing visual features extracted from second image 324B, may be stored in image database 132B with second object identifier 326B (e.g., ID: Ball_1). In some embodiments, in addition to storing the feature vectors and object identifiers for each image, the image may also be stored in image database 132B, as well as, or alternatively, training data database 134B. For example, first image 314B, first object identifier 316, and first feature vector 332B may be stored together in image database 132B.

In some embodiments, the images, the feature vectors describing those images, or both, may be used to generate training data for training a computer-vision object recognition model. Therefore, when a new image is obtained, the computer-vision object recognition model may analyze the image, extract features from the image, and determine whether the image is similar to any other image from the training data set. For example, if a new image depicting a new drill is received, the computer-vision object recognition model may generate a feature vector for the new image and compare the feature vector to feature vector 332B (e.g., describing image 314B depicting a drill). If a distance between the two feature vectors (e.g., a cosine distance, Minkowski distance, Euclidean distance, etc.) is less than a threshold value, then this may indicate that the two images are similar, and therefore they both may depict the same object (e.g., a drill). In some embodiments, the object identifier associated with the "matched" image, for example first object identifier 316 of image 314B, may be assigned to the new image, and the feature vector obtained from the new image, the new image, or both the feature vector obtained from the new image and the new image, may be stored in image database 132B, as well as, or alternatively, training data database 134B with the object identifier (e.g., first object identifier 316). Thus, the initial training data set, which only included a single image depicting a drill (e.g., image 314B), may now include two images depicting a drill. Therefore, upon retraining the computer-vision object recognition model, parameters of the model may be enriched such that the parameters encode additional information describing some of the visual features from the new image in addition to the information describing the visual features of the previously analyzed image.

Figure 14A:
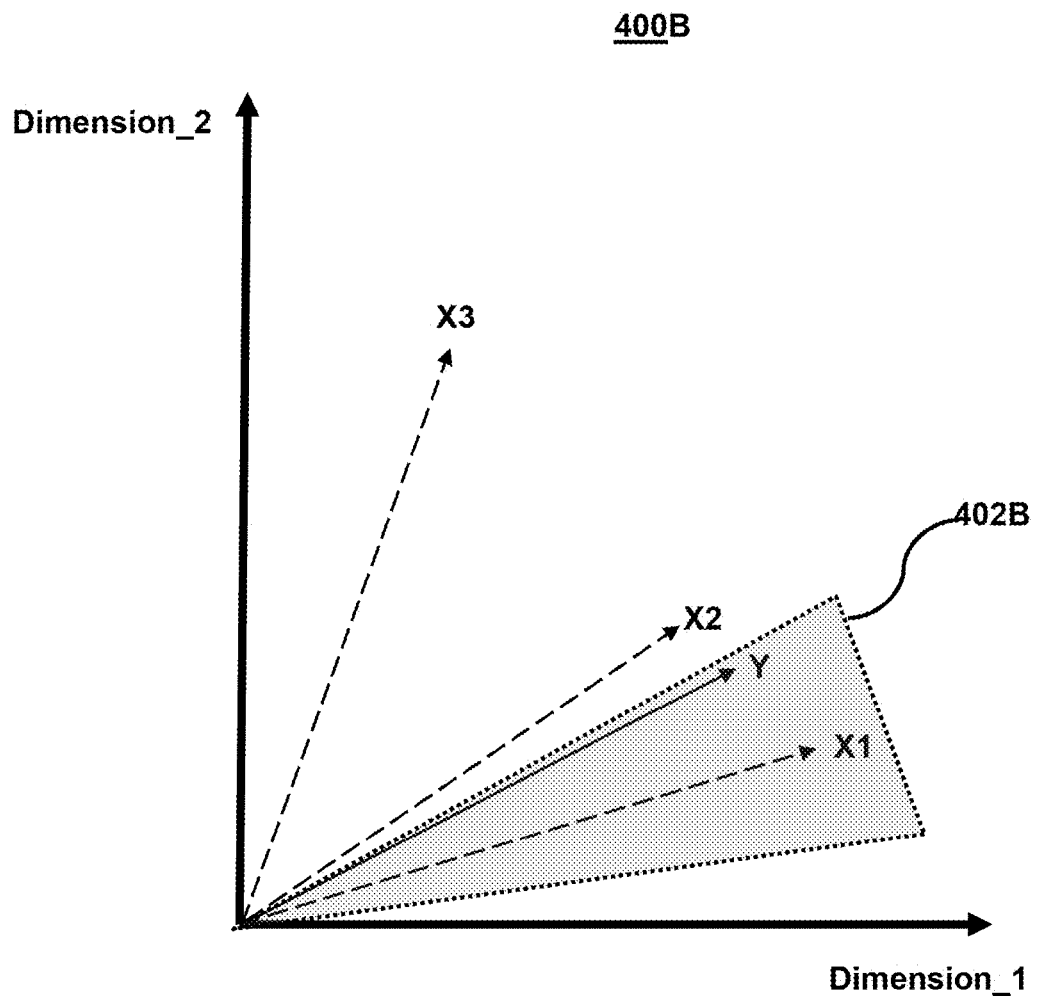
FIGS. 14A-14C illustrate example graphs of feature vectors representing features extracted from images and determining a similarity between the feature vectors and a feature vector corresponding to a newly received image, in accordance with various embodiments.
Figure 14B:
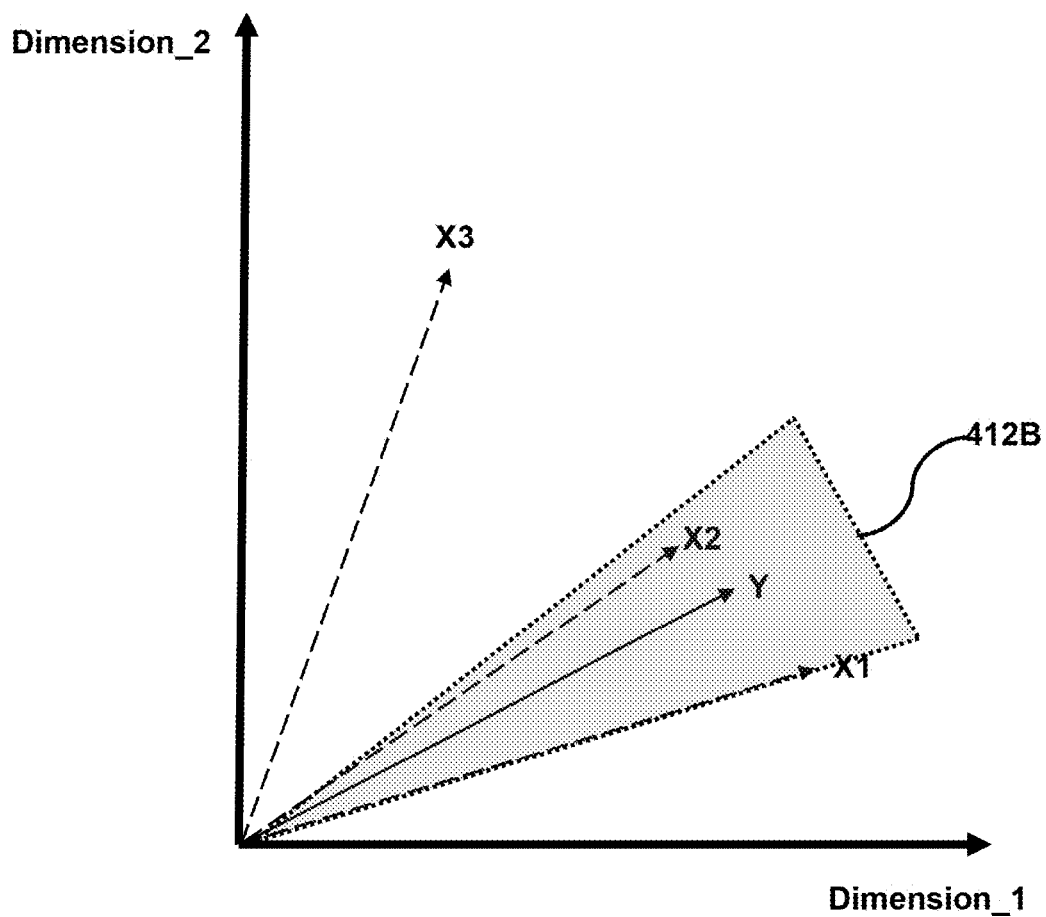
Figure 14C:
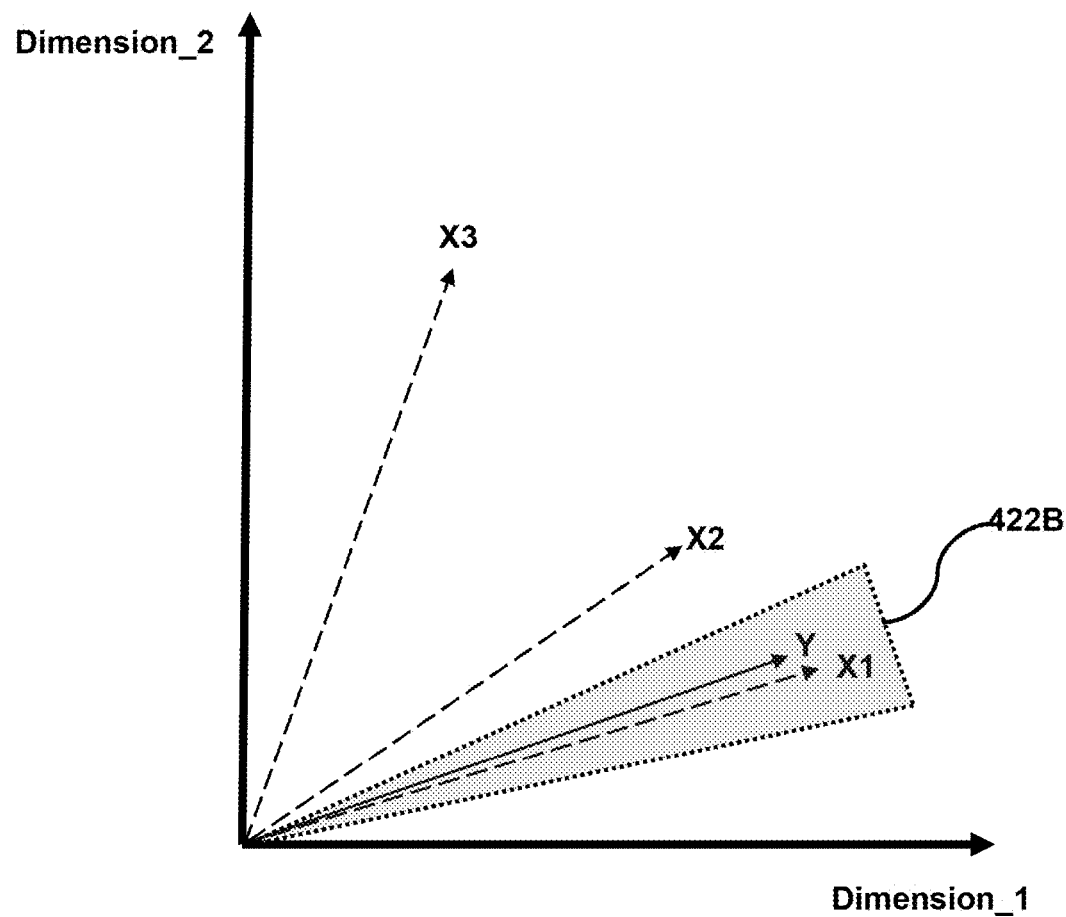

FIGS. 14A-41C illustrate example graphs of feature vectors representing features extracted from images and determining a similarity between the feature vectors and a feature vector corresponding to a newly received image, in accordance with various embodiments. In some embodiments, a graph 400B of FIG. 14A illustrates a first feature vector $x_1$, a second feature vector $x_2$, and a third feature vector $x_3$. Each of feature vectors $x_1$, $x_2$, and $x_3$ may represent visual features extracted from images depicting objects. In some embodiments, feature vectors $x_1$, $x_2$, and $x_3$ may represent feature vectors output by a computer-vision object recognition model, such as computer-vision object recognition model 310B, which may obtain a training data set including images depicting objects.

As illustrated in graph 400B, for example, each of feature vectors $x_1$, $x_2$, and $x_3$ point to a different location within a two-dimensional feature space. Use of a two-dimensional feature space in the example is merely for illustrative purpose as each feature vector may be n-dimensional. In some embodiments, feature vectors that are closer together (e.g., determined based on a cosine distance between the vectors) may describe features that are similar, and thus the images with which those features were extracted from may be similar. Conversely, feature vectors that are further from each other in the feature space may describe features that are not similar, and thus the images with which those features were extracted from may not be similar. As an example, feature vector $x_1$ and feature vector $x_2$ are closer together than feature vector $x_1$ and feature vector $x_3$ (e.g., based on the dot-product of vectors $x_1$ and $x_2$ as compared to the dot-product of vectors $x_1$ and $x_3$). Therefore, the images corresponding to feature vectors $x_1$ and $x_2$ are more likely to be similar (e.g., depict a similar object) than the images corresponding to feature vectors $x_1$ and $x_3$.

In some embodiments, when a new image is obtained by computer system 102B and analyzed using a computer-vision object recognition model trained on the image that produced feature vectors $x_1$, $x_2$, and $x_3$, a determination may be made as to whether the new image is similar to any of the other images from the training data set. For example, a new image provided to the trained computer-vision object recognition model may yield feature vector Y. As seen from graph 400B, feature vector Y is near feature vector $x_1$. In some embodiments, a similarity between feature vector Y and feature vector $x_1$ may be determined (as well as a similarity between feature vector Y and the other feature vectors included within graph 400B. For example, a cosine distance between feature vector Y and feature vector $x_1$ may be computed. If the cosine distance is less than a threshold value, then the image described by feature vector Y may be classified as being similar to the image described by feature vector $x_1$. Therefore, the image described by feature vector Y, feature vector Y, or both, may be stored in memory in association with an object identifier of an object depicted by an image described by feature vector $x_1$.

In some embodiments, a region 402B illustrated in graph 400B may represent a portion of the two-dimensional feature space that may correspond to images classified as being similar to the image associated with feature vector $x_1$. For instance, region 402B may subtend a solid angle such that any feature vector falling within region 402B would have a dot product with feature vector $x_1$ that is less than a threshold distance value, indicating that the two images (e.g., the images associated with the two vectors) depict similar objects. Thus, in some embodiments, if a feature vector, such as feature vector Y, falls within region 402B, that vector may be assigned a same object identifier that the object of the image described by feature vector $x_1$ is labeled with. Conversely, any feature vector that does not fall within region 402B may not be assigned the object identifier that the object of the image described by feature vector $x_1$ is labeled with, indicating that those two images depict dissimilar objects (e.g., the images associated with feature vectors $x_2$ and $x_3$).

In some embodiments, upon assigning the object identifier associated with an image from the training data set to a new image, the new image's feature vector, or both, a determination may be made as to whether the new image's feature vector is similar to any other feature vector. For instance, although prior to adding the new feature vector to the two-dimensional feature space, two feature vectors may have been classified as being dissimilar. For example, feature vectors $x_1$ and $x_2$ may have initially been classified as being dissimilar (e.g., feature vector $x_2$ falls outside of region 402B). However, as seen in graph 410B of FIG. 14B, feature vector Y may be determined to be similar to feature vector $x_2$, as feature vector $x_2$ may fall within a region 412B. Similar to region 402B described above, region 412B may also subtend a solid angle such that any feature vector falling within region 412B would have a dot product with feature vector Y that is less than a threshold distance value, indicating that the two images (e.g., the images associated with the two vectors) depict similar objects. Therefore, the image described by feature vector $x_2$ may be classified as being similar to the image described by feature vector Y, and thus the object identifier assigned to feature vector Y may be assigned to feature vector $x_2$, the image described by feature vector $x_2$, or both. Thus, even though initially the object recognition model classified the images described by feature vectors $x_1$ and $x_2$ as not being similar, the addition of feature vector Y is able to recapture feature vector $x_2$ and identify the corresponding image as being similar.

In some embodiments, the aforementioned process may be repeated until one or more stopping criteria are met. For instance, after determining that the images depicted by feature vector $x_2$ and feature vector Y are similar (e.g., based on a cosine distance between feature vector $x_2$ and feature vector Y being less than a first threshold distance corresponding to the angle subtended by region 412B), a determination may be made if there are any other feature vectors that may now be classified as being similar to feature vector $x_2$. If so, then those feature vectors may be assigned the object identifier recently attributed to feature vector $x_2$. As mentioned above, this process may repeat, iteratively, as new feature vectors are identified. However, in some embodiments, this process may cease upon one or more stopping criteria being met. In some embodiments, the stopping criteria may include a certain number of iterations being performed (e.g., 5 iterations, 10 iterations, etc.), allowing the process to repeat for a certain amount of time (e.g., 1 second, 2 seconds, 5 seconds, etc.), or until now more feature vectors are determined to be within the first threshold distance of the feature vector.

In some embodiments, each of the feature vectors that are determined to be similar to another feature vector may be added to a training data set used to train the object recognition model, a new instance of the object recognition model, or both. Therefore, while the initial training data set may have only included a single image depicting a given object (e.g., a drill), after the iterations are performed, multiple images may now be added to the training data set, where each of the images depict a same or similar object that each depict a drill or an object similar to the drill. For example, if the image associated with feature vector $x_1$ depicted a drill from a first perspective (e.g., first image 314B), the image associated with feature vector Y may depict another drill of a different make or model, but having the same perspective. The training data set may then be updated to include the image associated with feature vector Y, feature vector Y, or both, and so now the training data set may include two images. Continuing this example, the image associated with feature vector $x_2$ may depict the same drill as the drill depicted by the new image associated with feature vector Y, however at a different perspective (e.g., 180-degrees relative to a coordinate system of the drill within first image 314B). Therefore, by identifying that the images associated with feature vectors $x_1$ and Y both depict a same type of object (e.g., a drill) from a same perspective, this allowed the system to identify that the object depicted within the image associated with feature vector $x_2$ is also similar. Thus, the training data set may now be updated to include three images, each depicting a same class of objects (e.g., drills) but with different features. When the object recognition model, a new instance of the object recognition model, or a new object recognition model is subsequently trained using the new training data, the parameters of the object recognition model will be enriched so that the newly trained object recognition model will have improved accuracy at recognizing whether an image depicts of that object.

In some embodiments, even if an image is determined to be similar to another image, that image may not be added to a training data set. For example, if a newly received image depicting an object is a replica of another image already included by the training data set, the new image may not be added to the training data set despite the object recognition model classifying the two images as being similar.

Some embodiments may include determining whether an image is too similar to another image (e.g., imparts insufficient entropy relative to members of the set corresponding to an object, for instance measured in terms of volume of a convex hull with and without the candidate) and, if so, preventing that image from being added to the training data set. For example, if a distance between two feature vectors describing features extracted two different images, one being a newly received image and one being an image from the training data set, is determined to be smaller than a second distance threshold, then the new image and its feature vector may not be added to the training data set, despite the new image being classified as similar to the other image. As seen in graph 420B of FIG. 14C, a region 422B may subtend an angle about feature vector $x_1$ such that a feature vector Y associated with a newly received image falls within region 422B, this may indicate that the dot product between those two feature vectors is approximately one (e.g., $\cos(\theta) \sim 1$). Therefore, in some embodiments, a determination may be made as to whether the distance between the feature vectors is less than or equal to a second threshold, indicating that the two feature vectors describe images that are too similar, or alternatively, whether distance is greater than or equal to the second threshold, indicating that the two feature vectors describe images that are not too similar. As an example, a distance between feature vector Y and feature vector $x_1$ of FIG. 14C may be less than a second threshold (e.g., $\cos(\theta) \geq 0.99$, $\cos(\theta) \geq 0.95$, etc.) indicating that the image associated with feature vector Y should not be added to the training data set in association with the object identifier of the image associated with feature vector $x_1$. Alternatively, the distance between feature vector Y and feature vector $x_1$ of FIG. 14B may be greater than or equal to a second threshold, depicted by region 422B, which may indicate that the image associated with feature vector Y (i) is similar to the image associated with feature vector $x_1$ (e.g., the distance is less than or equal to a first threshold distance), and (ii) is not identical to the image associated with feature vector $x_1$.

Figure 15:
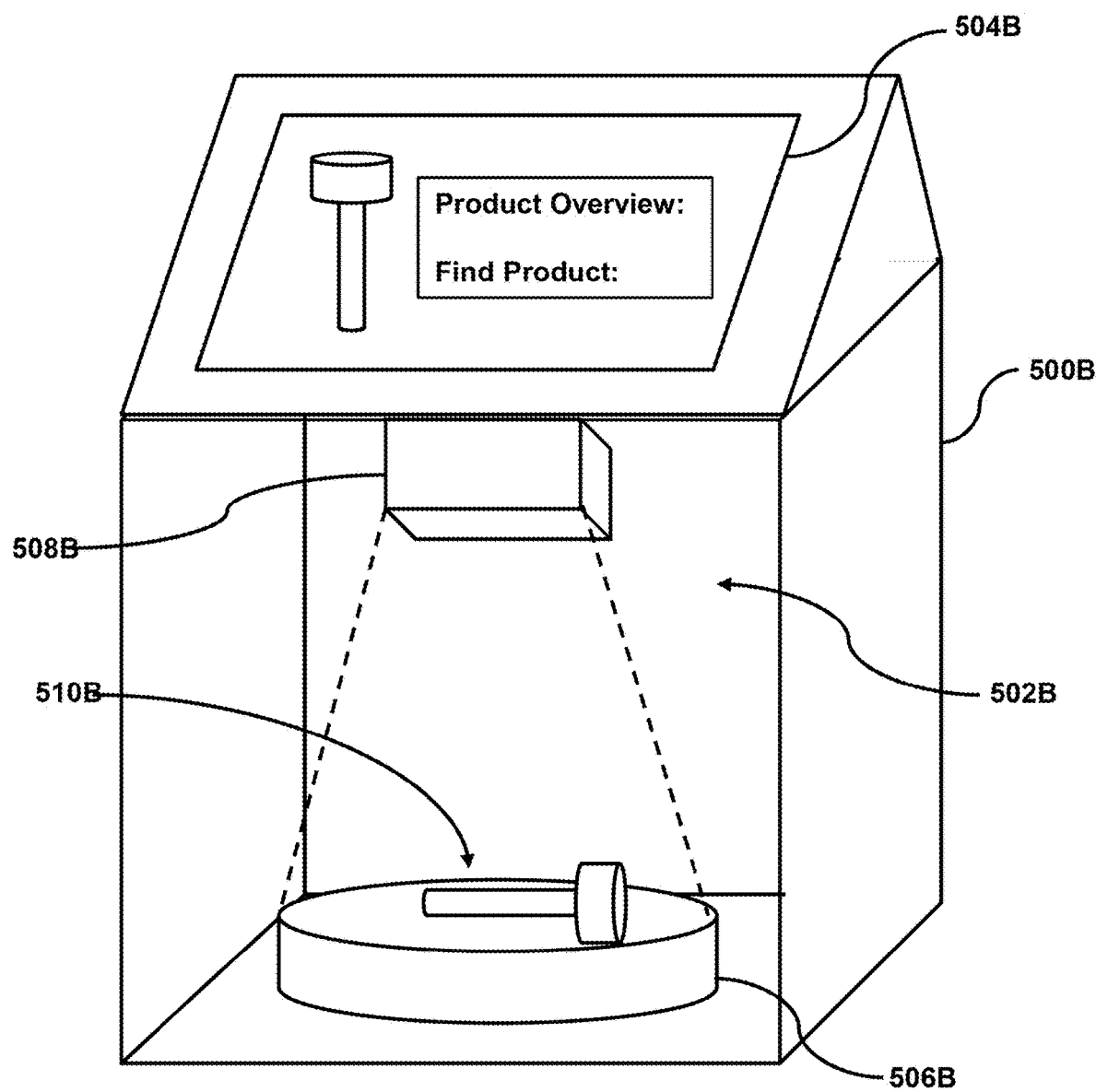
FIG. 15 illustrates an example kiosk device for capturing images of objects and performing visual searches for those objects, in accordance with various embodiments.

FIG. 15 illustrates an example kiosk device for capturing images of objects and performing visual searches for those objects, in accordance with various embodiments. In some embodiments, kiosk device 500B may be a device configured to receive an object, capture an image of the object, facilitate performance of a visual search using the image of the object as an input query image, and provide information regarding one or more results of the visual search. Kiosk device 500B of FIG. 15 may be substantially similar to kiosk 106B of FIG. 11, and the previous descriptions may apply equally.

Kiosk device 500B may include an open cavity 502B where objects may be placed. For example, cavity 502B may be surrounded on five sides by walls or other physical structures, which may be impermissible to light, semi-transparent, or fully transparent, while one side may be open such that individuals may place objects within cavity 502B. In some embodiments, individuals may place objects within cavity 502B to obtain information about the object. For example, if an individual needs to identify a type of fastener, the individual may bring the fastener to a facility where kiosk device 500B is located, place the fastener within cavity 502B, and obtain information regarding the type of fastener, sub-type of fastener, color, shape, size, weight, material composition, location of that fastener within the facility, a cost for purchasing the fastener, or any other information related to the fastener, or any combination thereof. In some embodiments, kiosk device 500B may include one or more sensors capable of determining information about the object placed within cavity 502B. For example, kiosk device 500B may include a weight sensor 506B, which may be configured to determine a weight of an object 510B placed within cavity 502B. As another example, kiosk device 500B may include sensors capable of determining a density of object 510B, length, width, depth, height, etc., of object 510B, density of object 510B, a material composition of object 510B, or any other feature or characteristic of object 510B, or any combination thereof. In some embodiments, sensors 506B may be located on an inner surface of cavity 502B of kiosk device 500B. In some embodiments, one or more of sensors 506B may be integrated within a lower wall of cavity 502B (e.g., a bottom wall), any of the side walls, the upper wall, or a combination thereof. In some embodiments, kiosk device 500B may include one or more processors and memory storing computer program instructions that, when executed by the processors, cause sensors 506B to record data representative of a measurement captured by sensors 506B. For example, sensors 506B may continually, periodically, or upon request (e.g., in response to a user pressing a button or determining that an object has entered into the space of cavity 502B) capture a weight detected by sensors 506B. In some embodiments, the data (e.g., weight data) may be stored in memory of kiosk device 500B and used as an input channel for a visual search.

In some embodiments, kiosk device 500B may include one or more image capture components 608B configured to capture an image of an object (e.g., object 510B) placed within cavity 502B. For example, image capture components 508B may include one or more cameras configured to capture two-dimensional images, three-dimensional images, high definition images, videos, time series images, image bursts, and the like. In some embodiments, image capture components 508B may have a field of view (FOV) capable of capturing an image or video of some or all of a surface of sensors 506B. In some embodiments, image capture components 508B may include one or more infrared scanning devices capable of scanning cavity 502B to determine a shape of object 510B, textures, patterns, or other properties of object 510B, or additional features of object 510B. In some embodiments, image capture components 508B may generate, store, and output data representative of the image, video, scan, etc., captured thereby, which may be stored in memory of kiosk device 500B.

Kiosk device 500B may also include a display screen 504B located on an upper surface of kiosk device 500B. Alternatively, display screen 504B may be a separate entity coupled to kiosk device 500B (e.g., a separate display screen). In some embodiments, display screen 504B may display an interface viewable by an individual, such as the individual that placed object 510B within cavity 502B. Display screen 504B may provide a real-time view of object 510B from various perspectives, such as a perspective of image capture components 508B. In some embodiments, display screen 504B may display a captured image or video of object 510B after being captured by image capture components 508B. For instance, after capturing an image of object 510B, an image of object 510B may be displayed to an individual via display screen.

Some embodiments may include providing the image of the object (e.g., object 510B), as well as any additional information about the object determined by sensors 506B, image capture components 508B, or both, to a computer system capable of performing a visual search. For instance, the image and any other data regarding object 510B determined by kiosk device 500B may be provided to a computer system, such as computer system 102B of FIG. 11, to perform a visual search. In some embodiments, a computer system including visual search functionality may be located at a same facility as kiosk device 500B. In some embodiments, kiosk device 500B may include the visual search functionality, and may therefore perform the visual search itself. Upon providing the image depicting object 510B, and any other information (e.g., weight of object 510B), to the visual search system, search results indicating objects determined as being similar to object 510B may be displayed via display screen 504B. For example, the image depicting object 510B, as well as the additional information, if available, may be provided to computer system 102B. Computer system 102B may extract visual features describing object 510B using a trained computer-recognition object recognition model, and may generate a feature vector describing at least a subset of the extracted visual features. The feature vector may be mapped to an n-dimensional feature space, and distances between the feature vector and other feature vectors (each corresponding to a set of visual features extracted from an image previously analyzed by the computer-vision object recognition model) may be computed. If the distance between the feature vector describing the visual features extracted from the image depicting object 510B and a feature vector describing visual features extracted from an image depicting an object is determined to be less than a threshold distance value, then the image depicting object 510B and the image depicting the object may be classified as being similar to one another. Therefore, an object identifier used to label the object depicted by the previously analyzed image may be assigned to the image depicting object 510B. In some embodiments, the object identifier, the image depicting object 510B, and the feature vector describing the image depicting object 510B may be stored in memory (e.g., image database 132B) together. Furthermore, information previously obtained describing the other image may be presented to an individual (e.g., the individual that placed object 510B within cavity 502B) via display screen 504B. For example, if object 510B is a particular fastener that an individual seeks to purchase additional instances of, the results of the search performed using the image of the fastener may indicate the name of the fastener, a brand of the fastener, a type of the fastener, a cost of the fastener, a material composition of the fastener, and a location of where the fastener is located within a facility so that the individual may obtain additional instances of the fastener. In some embodiments, an individual may be capable of purchasing instances of the identified object via kiosk device 500B, such as by inputting payment information and delivery information such that the additional instances of the identified object may be shipped directly to the individual's home. In some embodiments, kiosk device 500B may be in communication with a three-dimensional printing device, and in response to identifying the object, kiosk device 500B may facilitate the three-dimensional printing device to print a replica of the identified object.

Training Data Collection for Computer Vision

Existing computer-vision object recognition and localization approaches often suffer from lower accuracy and are more computationally expensive than is desirable. Various phenomena contribute to errors, including blurring, irrelevant objects in the camera's field of view, novel camera poses relative to a training set, and suboptimal lighting in run-time images. In many cases, these challenges are compounded by use cases in which training data sets are relatively small while candidate objects in an object ontology are relatively large. For example, challenges may training an object recognition model may occur when training data sets include less than 100 example images of each object, less than 10 example images, or that include a single image while candidate objects in an object ontology include more than 1,000 objects, more than 10,000 objects, more than 100,000 objects, or more than one million objects.

Existing services to crowd-source training data collection for machine-learning algorithms are not well suited for the above-described use cases. Existing services that dispatch users to capture images of places, objects, or both, are often not well suited for the type of training data that is needed. In many cases, the images that are obtained via such existing services are from a single field of view at a single pose. Furthermore, in many cases the images are not particularly diverse with respect to background, lighting position and condition, camera characteristics, and object configuration (e.g., folded, draped, etc.). Resulting training data sets often yield models that are insufficiently robust to real-world variation and that fail to sufficiently generalize out of sample. (None of which is to suggest that the above techniques or anything else herein is disclaimed, as aspects of the approaches below may also be used with traditional techniques.)

The machine learning techniques that can be used in the systems described herein may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions).

In some embodiments, a feature extraction process may use deep learning processing to extract features from an image. For example, a deep convolution neural network (CNN), trained on a large set of training data (e.g., the AlexNet architecture, which includes 5 convolutional layers and 3 fully connected layers, trained using the ImageNet dataset) may be used to extract features from an image. In some embodiments, to perform feature extraction, a pre-trained machine learning model may be obtained, which may be used for performing feature extraction for images from a set of images. In some embodiments, a support vector machine (SVM) may be trained with a training data to obtain a trained model for performing feature extraction. In some embodiments, a classifier may be trained using extracted features from an earlier layer of the machine learning model. In some embodiments, preprocessing may be performed to an input image prior to the feature extraction being performed. For example, preprocessing may include resizing, normalizing, cropping, etc., to each image to allow that image to serve as an input to the pre-trained model. Example pre-trained networks may include AlexNet, GoogLeNet, MobileNet-v2, and others. The preprocessing input images may be fed to the pre-trained model, which may extract features, and those features may then be used to train a classifier (e.g., SVM). In some embodiments, the input images, the features extracted from each of the input images, an identifier labeling each of the input image, or any other aspect capable of being used to describe each input image, or a combination thereof, may be stored in memory. In some embodiments, a feature vector describing visual features extracted from an image from the network, and may describe one or more contexts of the image and one or more objects determined to be depicted by the image. In some embodiments, the feature vector, the input image, or both, may be used as an input to a visual search system for performing a visual search to obtain information related to objects depicted within the image (e.g., products that a user may purchase).

In some embodiments, context classification models, the object recognition model, or other models, may be generated using a neural network architecture that runs efficiently on mobile computing devices (e.g., smart phones, tablet computing devices, etc.). Some examples of such neural networks include, but are not limited to MobileNet V1, MobileNet V2, MobileNet V3, ResNet, NASNet, EfficientNet, and others. With these neural networks, convolutional layers may be replaced by depthwise separable convolutions. For example, the depthwise separable convolution block includes a depthwise convolution layer to filter an input, followed by a pointwise (e.g., 1×1) convolution layer that combines the filtered values to obtain new features. The result is similar to that of a conventional convolutional layer but faster. Generally, neural networks running on mobile computing devices include a stack or stacks of residual blocks. Each residual blocks may include an expansion layer, a filter layer, and a compression layer. With MobileNet V2, three convolutional layers are included: a 1×1 convolution layer, a 3×3 depthwise convolution layer, and another 1×1 convolution layer. The first 1×1 convolution layer may be the expansion layer and operates to expand the number of channels in the data prior to the depthwise convolution, and is tuned with an expansion factor that determines an extent of the expansion and thus the number of channels to be output. In some examples, the expansion factor may be six, however the particular value may vary depending on the system. The second 1×1 convolution layer, the compression layer, may reduce the number of channels, and thus the amount of data, through the network. In Mobile Net V2, the compression layer includes another 1×1 kernel. Additionally, with MobileNet V2, there is a residual connection to help gradients flow through the network and connects the input to the block to the output from the block.

As described herein, the phrases "computer-vision object recognition model" and "object recognition computer-vision model" may be used interchangeably.

Some embodiments may generate a user interface that guides users to acquire particularly robust training data for object recognition models and other computer vision algorithms. Some embodiments may cause mobile computing devices (e.g., smart phones, wearable computing devices, and the like) to present such a user interface, and a camera of the mobile computing device may obtain videos or other sets of images of an object. The images may be added to a training data set used to train a model, such as a computer-vision object recognition model, to detect the object in other runtime images (e.g., those that are out-of-sample from the training set). In some cases, the computer-vision object recognition model may be configured to recognize, detect, and localize objects in a relatively large ontology like those described above. As an example, a native application executing on a mobile computing device may display a user interface with content describing an image-capture task or tasks to obtain a video of an object. As described herein, the "image-capture task" may also be referred to interchangeable as a task, such as a task that includes a request for a video of an object to be captured, provides an indication of the object to be depicted in the video, and the task causes a mobile computing device to present instructions via a native application executing on the mobile computing device, the instructions describing how the video of the object is to be captured. The object may be any object, such as an object purchasable at a brick-and-mortar store (e.g., a particular model of a microwave, a jacket of a particular color or size, etc.), or an object that exists in a given environment (e.g., a particular type of dog or cat, a certain type of tree, etc.). In some cases, the image-capture task may specify various attributes of the video, like camera path and pose relative to the object, a context or contexts (e.g., lighting, background scenes, object configuration (like whether clothes are folded, on a person, or on a hanger, or whether a microwave was installed, whether the microwave's door is open fully, open partially, or closed), a camera model, and an operating system or device type of the mobile computing device (e.g., a smartphone model)), among others. In some embodiments, the image-capture task may be discoverable by a user operating a mobile computing device via a native application executing on the mobile computing device. In some embodiments, the image-capture task may include (i) information regarding the object to be searched for by the user, and (ii) instructions regarding how a video of the object is to be obtained. In some cases, the native application may determine whether a data feed from the camera or other image capturing component of the mobile computing device or communicatively coupled to the mobile computing device corresponds to the image-capture task, and may provide feedback (e.g., visual, audible, haptic, etc.) via the user interface or via other components of the mobile computing device indicative of the feedback.

Some embodiments may select image-capture tasks for users based on a marginal entropy gain of the image-capture task. For instance, a native application, upon launching on the mobile computing device, may query a remote server system for an image-capture task with an identifier that indicates attributes of the mobile computing device, a user operating the mobile computing device, or both. The remote server system may select an image-capture task based on a current collection of data used to generate training data for training an object recognition model. For instance, some cases may include the remote server system determining whether the mobile computing device is of a type for which image data has not yet been obtained of a given object (or set of objects), thereby potentially acquiring images for the training data set from an additional and diverse set of user equipment. Further, some embodiments may select image-capture tasks responsive to a request from mobile computing devices based on a diversity or quantity of candidate objects in an object ontology. For example, if only a single image of a jacket (e.g., in a particular color, pattern, or size; draped, worn, or laying on a surface) is included within a fashion-related corpus of training images, then (e.g., in response) an image-capture task may be generated (e.g., selected, composed, or otherwise obtained) for obtaining additional images of the jacket (or for other images of other colors, patterns, sizes, or other forms of configuration). In some embodiments, an image-capture task, which may also be referred to herein interchangeably as a "mission," or a sub-task of the image-capture task, may be initiated based on (or an image-capture task may specify) an object indication identifying an object. For example, if the object is a product (e.g., a purchasable good or service), an indication of the product, which may also be referred to herein interchangeably as a "product identifier," may be a barcode associated with the product, Quick Response (QR) code associated with the product, a Stock Keeping Unit (SKU) of the product, a serial number of the product, or a name of the product. In some embodiments, the indications of the object (e.g., the product identifiers) may be scanned by (or to be scanned as part of an image-capture task) a mobile computing device or a scanning device communicatively coupled to the mobile computing device (e.g., a handheld scanner). Some embodiments may include using (e.g., based on) the product identifier to automatically retrieve metadata associated with a product (or such data may be cached in a native applications on a mobile computing device's memory before entering a store responsive to a user accepting an image-capture task to render the native application more robust to loss of network connections in stores), and some embodiments may include labeling objects within an image being captured (or the images themselves) with the metadata.

In some cases, captured images or videos may be held in a buffer of the native application, and the native application may periodically (or in response to an OS event) poll for whether the mobile computing device has a network connection. Upon detecting a connection (e.g., upon the user leaving an area of a store where network connectivity was impaired, as can often happen with steel shelving approximating a Faraday cage), the native application may upload the captured images or video and associate the images or video to server-side components.

In some embodiments, image-capture tasks may be generated (e.g., by server-side components) based on a particular goal, such as training a specific type or instance of object recognition model or making a model robust to (e.g., capable of discriminating among or from) a particular object or type of object. Some embodiments include an image-capture task including multiple sub-tasks that may be selected based on the specific type (e.g., an individual SKU, an instance without regard to size, an instance without regard to color, or a class of products, like drills without regard to SKU) of object that the object detection model is to recognize. For example, if the object recognition model to be trained is a furniture model, (e.g., a computer vision model configured to detect a table), then (e.g., in response to this occurrence) the sub-tasks within a related image-capture task may be generated to request or cause images of tables to be obtained (e.g., generally or specifically with respect to a type, size, model of table). In some embodiments, if a particular product identifier is scanned or to be scanned corresponds to a product with which images of that product have already been provided by one or more product providers (e.g., via a product catalog supplied by a retailer or vendor), information about the product may already be stored in a database accessible to a remote server system. Therefore, the sub-tasks within the image-capture task may relate to obtaining specific images of the product to supplement or enhance the stored images of that product (e.g., an image of the table from a particular angle, with a particular amount of ambient light, in a particular setting, etc.).

Assigning an image-capture task to a mobile computing device may include sending the mobile computing device instructions by which the mobile computing device forms a user interface. In some cases, the image-capture task includes a request for a video of an object to be captured, and provides an indication of the object to be captured via the video (e.g., a SKU). In some cases, the image-capture task may cause and prose instructions to be presented via a native application executing on the mobile computing device, where the instructions may include a first instruction to capture an image of the indication of the object (e.g., scan a barcode of a product) with a camera of the mobile computing device before beginning the image-capture task, and additional instructions describing how a video of the object is to be captured. Some examples include the native application receiving an image including a barcode of a product, parsing or determining a SKU from the images of the barcode, and determining that the barcode in the image matches that specified by the image-capture task. In some cases, an image-capture task may specify indications of multiple objects (e.g., multiple SKUs), any one of which is acceptable, or all of which are required. In response to detecting the absence of a match, the native application may alert a user and prevent subsequent images from being added to a training data set until the correct indication is scanned. In some cases, the instructions of the image-capture task may also include features of the object corresponding to the indication to facilitate object detection by the mobile computing device during training. For instance, this may include a user interface depicting the camera's view being augmented with a bounding box of the object during scanning.

In some embodiments, the image-capture task and its various sub-tasks may be influenced by data analysis that has already been performed. For example, for a particular object, historical information included within a training data database may be mined to determine what information is already logged, what information can be scraped from third party online resources (e.g., via the Internet), and what information is needed. Furthermore, the object recognition model may include or be associated with classifiers configured to extract certain aspects of an object, such as color, pattern, texture, basic object recognition and detection, or a combination thereof. Using the mini-classifiers, information about what the object in question is can be determined to identify what additional images, if any, would be beneficial to obtain to improve object recognition scope and accuracy.

In some embodiments, the image-capture task may be to obtain a video of a given (e.g., specified by a SKU, product name, or model name) object. The image-capture task may cause instructions to be presented via a native application's user interface (e.g., on a display screen or audio interface) that may provide an indication of the object to be captured by the video (e.g., a barcode, SKU, QR code for a product), and where (e.g., a store, a particular location within the store, a household, etc.) the object may be found. For example, the image-capture task may cause the native application to indicate a particular drill to be found, a store where the drill may be sold, a location within the store of where the drill may be shelved, a barcode identifying the drill, or a combination thereof. Upon locating the object (e.g., the drill), the user may instruct the native application to record the indication of the object (e.g., scan a barcode for the drill) and the native application may provide (e.g., present) instructions regarding how to capture a video of the object to the user. For example, the instructions may indicate how the user should rotate his/her mobile computing device about the object to capture different angles, backgrounds, and lighting aspects of the object. In some cases, the user may be instructed to position the object in multiple configurations and similar scans may be performed in the different configurations. For example, the different configurations may include the object being held in hand, draped on a hanger or other piece of furniture, folded on a shelf, and the like. In some embodiments, the native application may access (e.g., poll) one or more inertial measurement units (IMUS) resident on the mobile computing device and obtain a multi-dimensional time series of detected accelerations (e.g., along three or more or six axes). In some cases, in real-time or at training-time, client-side or server-side, embodiments may associate the time series with captured images (e.g., frames of a video) corresponding to the measurements. Some embodiments may determine based on the time series and images whether the pose of the mobile computing device and scene configuration is correct (e.g., within specified parameters, like within tolerances for object distance, camera pose, lighting intensity, etc.). For instance, some embodiments may infer camera pose with a Kalman filter and compare an inferred pose to a target pose to determine an error vector (e.g., in three or six spatial dimensions). Some embodiments may cause the mobile computing device to present an overlaid augmented reality display on a user interface depicting captured images or video based on the error vector, like arrows indicating how the camera should be manipulated in space to reduce the error vector. In some embodiments, IMU data, lighting data, and other sensor data from the mobile computing device may be used to obtain depth information for three-dimensional locating and point anchoring. In some embodiments, a fixed box may be displayed with a user interface of the native application, and the sub-tasks of the image-capture task to be performed is to capture a video of the object while moving the mobile computing device around the object, all while keeping the object displayed within the fixed box (overlaid in a user interface depicting the images being captured by the camera). In some embodiments, the IMU data, lighting data, other sensor data, or a combination thereof, may be used to generate a three-dimensional (3D) model, which may be used for generating training data of unseen perspectives (e.g., angles) of an object.

In some embodiments, the captured video may be provided back to the remote server system for further processing. For example, the remote server system may be configured to determine bounding box coordinates (like in pixel space) of the object at issue, perform image enhancement, identify salient frames, and the like. In some cases, captured video may be associated in memory with an image or scan result of an indicator of an object (e.g., a barcode of the object). In some cases, captured video (or a subset of frames thereof) may be associated in memory with a geolocation of the object, like an identifier of a brick and mortar store in which the object was imaged via the captured video. In some cases, captured video may be associated with attributes of the camera, such as an identifier of a model of the camera, an identifier of the mobile computing device including the camera, optical properties or configuration of the camera, lighting attributes of an environment in which the video is captured, an operating system of the mobile computing device, an application used to capture the video, and the like. In some cases, frames of video may be associated with values based on readings of IMUs taken concurrent with the frames. For example, data indicating an inferred pose of the camera relative to the object or a position along a route with six degrees of freedom may be captured, recorded, extracted, or otherwise determined based on outputs from IMUs obtained from the mobile computing device. In some cases, the camera may be a depth-sensing camera, such as a stereoscopic camera or other form of computational photography camera, and information about a light field (e.g., light intensity and direction for multiple directions at each of a plurality of points on a plane) may be captured and input into the training data set. Some embodiments may engage a machine-learning co-processor of the mobile computing device to provide real-time feedback on the video as the video is captured. For example, the machine-learning co-processor may score the video as the video is being captured based upon marginal gains in information about the object being imaged.

In some embodiments, images may be adjusted within various (e.g., each) images of a video to reduce bandwidth and memory usage relatively to implementations that natively upload all of the capture video. Some embodiments may detect the object in question in one or more frames from the video and may discard frames preceding or following frames where the object appeared. Some embodiments may crop images to exclude portions not depicting the object, (e.g., outside a bounding box of the object in question). Some embodiments may configure the images based on the location of the object in the images. For example, a white balance may be determined from raw camera sensor data based on a white component of the object or location of the object within a given image, a dynamic range may be determined based on whether portions of the object in the image are within the bounds of the camera and image format (in some cases, modulating exposure of the camera in subsequent frames to place the object within such bounds), and the like. Some embodiments may modulate image compression within a frame based on the location of an object. For instance, some embodiments may compress frames with a lossy compression algorithm (like JPEG, MPEG (1 to 4), H.265/HEVC, etc.), and the amount of data loss within different areas of the frame may be modulated such that areas of a frame depicting an object (like where the object is detected or in a bounding box on a UI showing images from the camera where the user is requested to position the object) have less loss of data (and thus lower compression ratios) while areas not depicting the object have greater loss of data (and thus higher compression ratios). For example, some embodiments may select different quantization matrices for different areas (e.g., square blocks in a tiling) of an image to modulate data loss/ compression, e.g., before dividing a discrete cosine transform coefficient matrix by the quantization matrix in an element-by-element division and rounding to the nearest integer, such that larger values in the quantization matrix tend to result in zero values in the result, and more prevalent use of larger values corresponding to higher frequency components tend to increase compression ratios, thereby increasing efficiency of subsequent run-length encoding of the result.

Upon completion, the video and accompanying metadata may be provided to a local or remote server system including computer vision processing functionality. For example, the video may be provided to a remote server system with an indication of the object (e.g., barcode) and any of the other captured information noted above. In some embodiments, the remote server system may pre-process the captured video, including selecting a subset of frames or combining information from consecutive frames. For example, the video may be segmented into a plurality of frames, where each frame may include information indicating the camera's pose (e.g., with six coordinates, three indicating spatial position and three indicating orientation) with respect to the object, ambient lighting conditions, eye gaze information (e.g., if a front-facing camera is available to obtain gaze direction), and the like. In some embodiments, the sampling rate for the video may be adjusted to increase or decrease a number of images obtained from the captured video. For example, the computer vision system may sub-sample the video at 60 frames per second (fps), 100 fps, or 200 fps. Quality checks with respect to the blurriness or recognizability of the particular item within each photo may be performed and, if the quality check satisfies quality criteria, the images (or features extracted therefrom) may be added to a database as being associated with that particular object, an identifier for the object from an object ontology, or both. Furthermore, in some embodiments, the remote server system may perform feature extraction processes to each newly added image to obtain new features for that item, and the new features may be stored in the database as being associated with that particular object.

In some embodiments, a plurality of images obtained from a captured video may be used to train a computer vision object recognition model for synthesizing new and unique objects that physically may not yet exist or were outside a training data set used to train the model. Using the information about how an object is displayed when at various orientations, ambient light levels, and backgrounds may allow the object recognition model to learn how a new instance of a same or similar object may appear. For example, an object recognition model may be trained to create a synthetic table by ingesting training data related to the various ways that different tables appear within images taken by mission-based captured videos, where mission includes directing an individual to capture one or more images or videos of one or more tables at various orientations, ambient light levels, backgrounds, or a combination thereof. In some embodiments, the object recognition model may be a generative mode where the roles of inputs and outputs may be reversed, and some embodiments may synthesize an image of an object outside the training data set by specifying inputs that correspond to the outputs of the object recognition model.

In some embodiments, the training data may also be used as an online learning tool. For example, a video of a task may be submitted by a user to a remote server system including computer vision functionality. The computer vision functionality may include, access, or otherwise employ an object recognition model to determine whether an image includes a particular object, and an application instance running on a mobile computing device may be solicited for feedback regarding the object recognition model's accuracy. If the object recognition model accurately identifies the object as being a particular item, such as a table or coffee mug, then the feedback may be used to reinforce the object recognition model's accuracy. However, if the object recognition model misidentifies the object, the feedback may be used to adjust weights and biases associated with different nodes of the object recognition model to improve the model's accuracy. In some embodiments, the online learning feature of the object recognition model may be consumer facing so as to crowd source information. Therefore, the application instance may be generated to include the learning component for reinforcing the accuracy of the object recognition model's results and identifying where additional focus is needed.

In some embodiments, some or all of an object recognition model may be offloaded from a remote server system to a local mobile computing device. For instance, a particular portion of object recognition model may be trained on the mobile computing device, and then that portion may be provided to the remote server system to be conjoined with the remaining object classification aspects, and for further refinement. For example, a specific mobile computing device may train an object recognition model for detecting tables. The mobile computing device's object recognition model may include features for identifying tables, and may include a set of weights for identifying tables. When an image is captured by the mobile computing device, the "table" object recognition model may generate values for the weights based on the objects identified within the captured image, and provide the values to the remote server system, which may be merged with one or more other mobile computing devices performing similar tasks.

Figure 16:
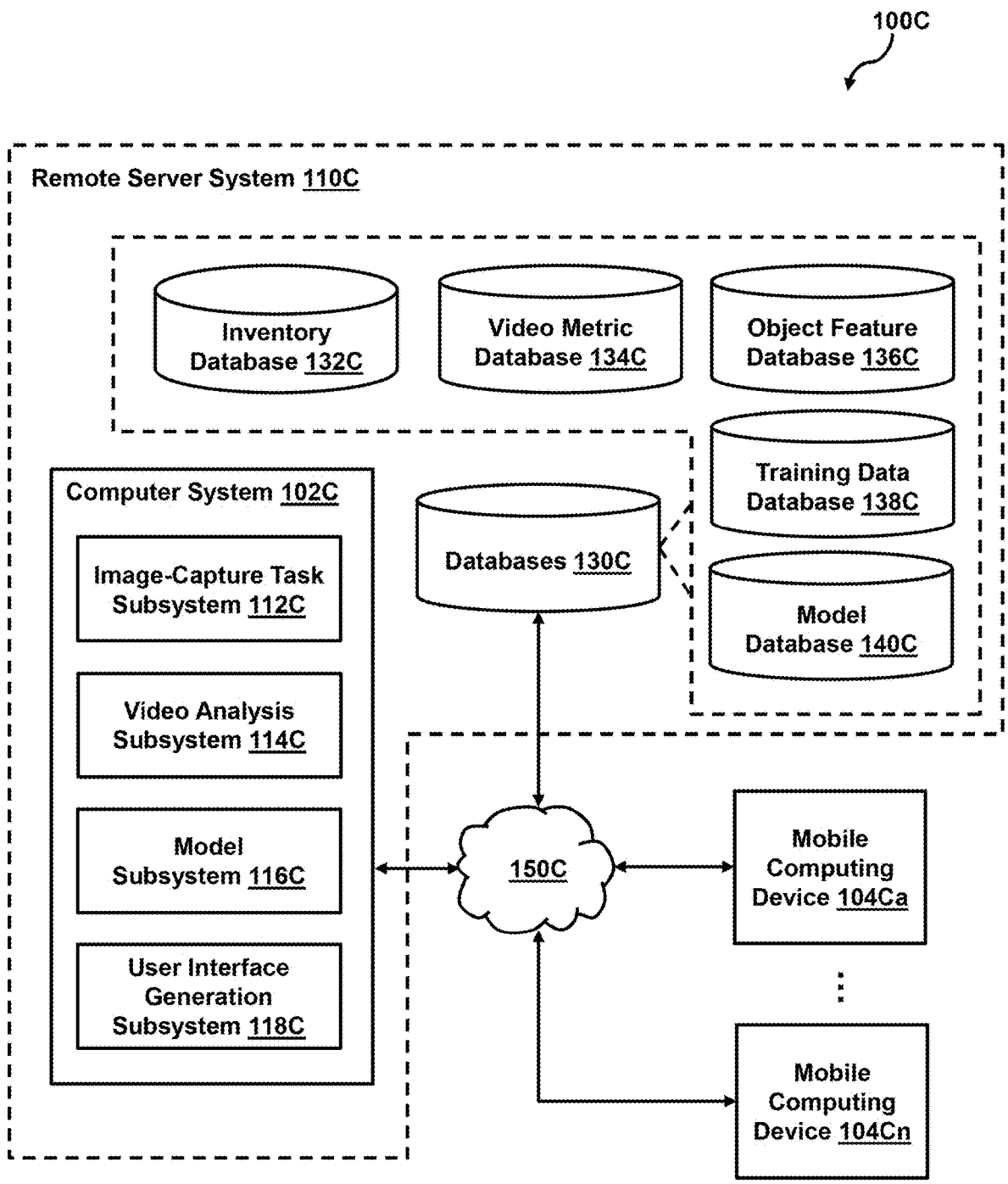
FIG. 16 illustrates an example system for obtaining images for a training data set for an object recognition model, in accordance with various embodiments.

FIG. 16 illustrates an example system for obtaining images for a training data set for an object recognition model, in accordance with various embodiments. In some embodiments, a system 100C may include a remote server system 110C, a network or combination of networks 150C, and one or more mobile computing devices 104a-104n. Mobile computing devices 104a-104n may be referred to collectively as mobile computing devices 104, and individually as mobile computing device 104. Each instance of mobile computing devices 104 may include an image capturing component, such as a camera, however some instances of mobile computing devices 104 may be communicatively coupled to an image capturing component. For example, a mobile computing device 104 may be wirelessly connected (e.g., via a Bluetooth connection) to a camera, and images captured by the camera may be viewable, stored, edited, shared, or a combination thereof, on mobile computing device 104.

Remote server system 110C may include a computer system 102, databases 130, and other components, each of which are configured to communicate with mobile computing devices 104 via networks 150C. In some embodiments, computer system 102C may include an image-capture task subsystem 112C, a video analysis subsystem 114C, a model subsystem 116C, a user interface generation subsystem 118C, and other components. Databases 130 may include an inventory database 132C, a video metric database 134C, object feature database 136C, training data database 138C, and model database 140C. Each of databases 132C-140C may be a single instance of a database or may include multiple databases, which may be co-located or distributed amongst a number of server systems.

In some embodiments, image-capture task subsystem 112C is configured to generate and output one or more image-capture tasks. In some embodiments, the image-capture tasks may be generated based on data needed for training an object recognition model. For example, an object recognition model may be trained to recognize a drill within a given image using a collection of images of drills. However, if a training data set of images of drills only includes a small number (e.g., less than 10, less than 5, less than 2) of images of a drill, the object recognition model may be unable to recognize a drill within a newly received image unless that image is formatted in a similar manner as one of the images from the training data set. Therefore, it may be beneficial to obtain additional images depicting a drill, each image having the drill orientated in a different manner, such as different poses or different contexts (e.g., different lighting condition, different background settings, etc.).

In some embodiments, image-capture task subsystem 112C determines an object or a set of objects that an image-capture task will be directed towards. To determine the objects, image-capture task subsystem 112C may access training data database 138C. Training data database 138C may include training data sets, where each training data set is associated to a particular object or category of objects with which an object recognition model uses or will use to train that object recognition model for recognizing the object within an input image. For example, training data database 138C may include a training data set including a plurality of images depicting a table, and this training data set may be used to train an object recognition model to recognize whether an input image depicts a table. As another example, training data database 138C may include a training data set including a plurality of images depicting dogs, and this training data set may be used to train an object recognition model to recognize whether an input image depicts a dog. In some embodiments, training data database 138C may include an index that includes a listing of each training data set stored within training data database 138C, a name of the object that the training data set corresponds to, an object identifier of the object, and a number of images that the training data set includes. Table 1, described below, includes a sample index of training data sets that may be stored within training data database.

TABLE 1

| Training Data Set ID | Depicted Object | Object ID | Number of Images Included within Training Data Set |
|---|---|---|---|
| TDS_1 | Table | Object_1 | 3 |
| TDS_2 | Dogs | Object_2 | 36 |

In some embodiments, image-capture task subsystem 112C, upon accessing training data database 138C, may retrieve the index of training data sets and extract the number of images included within each indexed training data set. For example, based on Table 1, image-capture task subsystem 112C may determine that training data set TDS_1 includes three images depicting a table, while training data set TDS_2 includes thirty-six images depicting dogs. In some embodiments, image-capture task subsystem 112C may determine whether the number of images included by a particular training data set satisfies a condition, such as whether the number of images is equal to or greater than a minimum number of images needed for training an object recognition model. In some embodiments, the parameters of a model may be individual weights and biases of the network, and so the number of parameters that a model may have may been in excess of 10,000,000 or more. In some embodiments, the number of parameters may be determined by counting a number of parameters in an embedding layer, a number of edges in a network, a number of layers in the model, or a combination thereof. In some embodiments, to train an object recognition model, a number of images to be included in a training data set may be equal to 1,000 or more images per object class. Still further, some embodiments may include training a model to determine an amount of data needed based on an accuracy or performance of the model. For example, a model that performs poorly (e.g., is not accurate) may require additional data to train the model to obtain improved results. In some embodiments, for a given set of images mapped to an embedding space, a density of a cluster in the embedding space may be used to determine whether additional data is needed for a training data set. For instance, a very dense cluster may indicate a large number of images mapped to a small radius within the embedding space, whereas a sparse data set (e.g., including a limited number of images of a particular category) may be less dense, generally or at a particular region of the cluster, indicating that more images are needed to fill in the gaps that exist in the cluster. In some embodiments, cluster separation may also serve as an indicator of whether additional images are needed for a training data set. For example, if the clusters overlap or are otherwise not well separable, and by clusters this refers to the clustering of given object in the embedding space, this may indicate that additional training data may be needed. Additionally clustering techniques may also be employed. In some embodiments, a clustering quality may be determined using a clustering metric, such as an F1 score, a Normalized Mutual Information (NMI) score, or the Mathews Correlation Coefficient (MCC). For example, for MCC, a value of 0 may be obtained if a maximum-likelihood function or random choice function were used, a value of 1 indicates a perfect score, and a value of −1 is always incorrect. A threshold for determining whether a model includes enough training data may be if the MCC score may be a value selected from a range of values between 0.1 and 0.9. For example, a threshold value may be 0.8, which may indicate that a training data set includes enough data for a model to product accurate results.

In some embodiments, image-capture task subsystem 112C may determine whether any training data sets lack images depicting an object in a particular orientation. Each training data set may include images of a particular object (e.g., a drill, a shirt, a table, etc.), and each image may depict that object from a similar or different perspective, having a similar or different context (e.g., lighting condition, background, orientation, etc.), or a combination thereof. For example, a training data set may include two images of a drill, where each image depicts the drill from a same perspective (e.g., head-on). In this example, the training data set may benefit from additional images depicting the drill from different perspectives (e.g., side profiles, top view, bottom view, etc.). As another example, the training data set may include two images of a drill, each from different perspectives but both having a plain white background. In this example, the training data set may benefit from additional images depicting the drill in different background settings (e.g., in a garage, held in a human hand, with other tools, etc.). As still yet another example, the training data set may include two images of a drill, however both images may include very dark lighting conditions. In this example, the training data set may benefit from additional images depicting the drill in different ambient lighting conditions (e.g., via sunlight, bright store lights, etc.). Some embodiments may include image-capture task subsystem 112C determining whether the number of images of the object satisfies a second condition, where the second condition indicates whether a given training data set includes a threshold number of images depicting an object from different perspectives and contexts (e.g., lighting conditions, backgrounds). For example, a training data set including images of tables may include a large number of images (e.g., 10 or more, 20 or more, 100 or more, etc.) of the object, but all of the images depict the object from a same perspective. As another example, the training data set may include a large number of images depicting a table from different perspectives, but not many (e.g., less than 10, less than 5, less than 2) images depicting the table in different background settings. Therefore, image-capture task subsystem 112C may determine, based on the number of images included with each training data set, and the number of images of an object depicted in each orientation, whether the training data set needs to be supplemented with additional images. Furthermore, image-capture task subsystem 112C may determine, for example, a number of images to be obtained, and the different perspectives, lighting conditions, and background settings those images should be obtained with for updating the training data set. Additionally, image-capture task subsystem 112C may determine whether images depicting variations of an object are needed or missing from a training data set. For example, image-capture task subsystem 112C may determine that a training data set depicting a long-sleeve flannel shirt lacks images depicting the shirt from one or more perspectives, and therefore the image-capture task may be for a user to obtain images of the shirt from the missing perspectives. For example, the training data set may include images of the long-sleeve flannel shirt only in the color red, only in a size large, or only worn by an individual. Therefore, additional images may be obtained of the same long-sleeve flannel shirt but in a different color (e.g., yellow, green), of a different size (e.g., small, medium), or in a different configuration (e.g., draped over a chair, hanging on a hanger, etc.).

Using the aforementioned criteria, image-capture task subsystem 112C may determine which training data sets require additional images, for instance due to a low number of images that the training data set includes, or due to a lack of diversity of those images. Furthermore, some embodiments may include image-capture task subsystem 112C retrieving an indication of the object (e.g., a barcode, a SKU, a QR code, a product name, etc.) with which a user can use to identify the object at a particular location where the object is available. Based on which training data sets require the additional images and the types of images (e.g., different perspectives, lighting conditions, variations, etc.) needed for that training data set, image-capture task subsystem 112C may generate an image-capture task and provide the image-capture task to mobile computing devices 104. Image-capture task subsystem 112C may generate the image-capture task to include a series of sub-tasks representing instructions for how a video recording process is to be performed to obtain the images of the object needed for the training data set. For example, the image-capture task may include instructions indicating how mobile computing device 104 is to be adjusted such that a particular perspective of the object is captured via the video.

In some embodiments, the image-capture task may be executed by a native application of mobile computing device 104, as described in greater detail below with reference to user interface generation subsystem 118C. Some embodiments may include image-capture task subsystem 112C generating requests to be embedded in the image-capture task to poll one or more sensors resident on mobile computing device 104. For example, the image-capture task may include requests to obtain IMU sensor readouts. In some embodiments, subsequent the sub-tasks of the image-capture task may be modified based on the information gathered by the sensors. For example, based on the IMU sensor readouts of mobile computing device 104, the image-capture task may provide an indication of one or more actions that a user may take to cause the video recording process to be adjusted, such as moving mobile computing device 104 in a particular manner, changing a filter of the camera used to capture a video, adjusting a lighting of the environment where the video is being captured, change a configuration of the object being captured by the video, etc.

In some embodiments, image-capture task subsystem 112C may generate, output, or generate and output the image-capture task in response to a request for an image-capture task. In some embodiments, the request may be obtained from mobile computing device 104. For example, the request may be obtained in response to a user invoking a native application on mobile computing device 104 indicating that the user is willing to receive an image-capture task. In some embodiments, the user may have pre-registered for receiving image-capture tasks, and computer system 102C may provide an image-capture task to the user via their corresponding mobile computing device 104. In some embodiments, image-capture task subsystem 112C may provide an image-capture task to a user's corresponding mobile computing device 104 in response to determining that mobile computing device 104 satisfies a set of criteria. The set of criteria may include determining that a mobile computing device 104 is within a predefined distance of a facility whereby a particular object is available. In such cases, mobile computing device 104 may be configured to periodically determine a location of mobile computing device 104 and provide the location or a value indicative of the location to computer system 102C. For example, mobile computing device 104 may periodically (e.g., ever minute, every five minutes, every 10 minutes, hourly, etc.) poll a location sensor or sensors (e.g., a GPS sensor) to determine a geographical location of mobile computing device 104. In some embodiments, image-capture task subsystem 112C may obtain location data indicating a location of mobile computing device (e.g., from an automated periodic polling of a location of mobile computing device 104, an invocation of a native application using mobile computing device 104, etc.), and based on the location data, image-capture task subsystem 112C may query training data database 138C to identify which object or objects additional training data is needed. Based on the object or objects identified as needed additional training data, image-capture task subsystem 112C may query inventory database 132C to determine object location information. For instance, the object location information may include facilities (e.g., brick and mortar stores, public spaces, etc.) where the object or objects are accessible (e.g., capable of having a video captured of the object or objects, purchasable, etc.). For example, in response to determining that a training data set for training an object recognition model to recognize a particular drill needs, or would benefit from having, additional images depicting the drill (e.g., additional images from various perspectives, lighting conditions, background settings configurations, etc.), image-capture task subsystem 112C may query inventory database 132C to determine a location of a facility where the drill is available for purchase. In response to receiving the location data of mobile computing device 104, image-capture task subsystem 112C may determine whether the location of mobile computing device 104 is within a predefined distance of the location of the facility (e.g., within 1 kilometer of the facility, within 100 meters of the facility, within 10 meters of the facility, etc.). If so, image-capture task subsystem 112C may generate or otherwise obtain (if already generated) the image-capture task and provide the image-capture task to mobile computing device 104. In some embodiments, computer system 102C may access additional information related to a user operating mobile computing device 104, such as a calendar for the user, a search or activity history for the user, social media network connections of the user, and the like, to determine whether the user (and thus their mobile computing device 104) is expected to be near a facility where the object is located. If so, image-capture task subsystem 112C may be configured to provide the image-capture task to mobile computing device 104 prior to the user being within the predefined distance of the facility or upon determining that the user has entered the facility (e.g., based on the GPS location of mobile computing device 104, mobile computing device 104 accessing a Wi-Fi network of the facility, etc.).

In some embodiments, video analysis subsystem 114C may be configured to obtain a candidate video captured via mobile computing device 104 performing the image-capture task. Upon the image-capture task being provided to mobile computing device 104, mobile computing device 104 may be configured to begin obtaining a candidate video depicting an object. In some embodiments, prior to beginning the video recording process, the image-capture task may provide an indication of the object to be captured by the video. For example, the image-capture task may indicate name of the object, a barcode of the object, a SKU of the object, or a combination thereof, and may cause mobile computing device to input or otherwise provide the indication of the object prior to the video recording process beginning. As an example, the image-capture task may provide an indication of a barcode of a drill to be captured by the video, and may cause mobile computing device 104 to take an image of the barcode of the drill, which may be used to verify—either locally by mobile computing device 104 or remotely via remote server system 110C—that the drill is the object to be captured by the video. After confirming the object, the image-capture task may access an image capture component of mobile computing device 104 (e.g., a camera), which may be integrated into the design of mobile computing device 104, communicatively coupled to mobile computing device 104, or both. In some embodiments, the image-capture task may present instructions regarding how the video of the object is to be captured via a native application executing on mobile computing device 104. The native application may cause the image capture component to activate to begin the video recording process, which may begin capturing candidate video immediately or upon a user pressing a button (physical or virtual).

Some embodiments may include the candidate video obtained by mobile computing device 104 depicting the object from multiple perspectives, with multiple lighting conditions, with multiple backgrounds, and having multiple configurations. For example, the candidate video may include video of depicting the object from a first perspective (e.g., head-on) for a first amount of time (e.g., four seconds), followed by video depicting the object from a second perspective (e.g., a side view) for a second amount of time (e.g., five seconds). Mobile computing device 104 may be configured to continually obtain the video for a predefined amount of time (e.g., 10 seconds, 30 seconds, 1 minute, etc.), until a threshold number of images are obtained (e.g., 10 or more images, 20 or more images, 50 or more images), until images captured by the video satisfy a threshold number of criteria (e.g., a threshold number of perspective views of the object are obtained, a threshold number of lighting conditions are obtained, etc.), or a combination thereof. In some embodiments, mobile computing device 104 may be configured to stream the captured video to computer system 102C as the video is being captured. In some embodiments, mobile computing device 104 may be configured to provide the captured video to computer system 102C after the video has been captured.

In some embodiments, mobile computing device 104, computer system 102C, or both mobile computing device 104 and computer system 102C may be configured to perform pre-processing on the captured video while the video is being captured, as well as analyze the video while the video is being captured. Additionally, or alternatively, mobile computing device 104, computer system 102C, or both mobile computing device 104 and computer system 102C may be configured to perform pre-processing on the captured video and analysis of the captured video after the video recording process has ended.

In some embodiments, video analysis subsystem 114C may be configured to determine a context of the image, an object or objects depicted within the image, or any other aspect of an image, or any combination thereof, using a convolutional neural network (CNN), a discriminative neural network, a region-based CNN (R-CNN), a Fast R-CNN, a Masked R-CNN, Single Shot Multibox (SSD), and a You-Only-Look-Once (YOLO) model, or any other type of machine learning model, or any combination thereof, such as the machine learning models mentioned herein. In some embodiments, the CNN or other machine learning model may be implemented using server-side programming architecture, such as Python, Keras, and the like, or they may be implanted using client-side programming architecture, such as TensorFlow Lite or TensorRT.

In some embodiments, the subset of frames may be extracted from the candidate video while the candidate video is being obtained. As described herein, the "candidate video" may include a portion of the video captured by mobile computing device 104 while the video recording process continues. As described herein also, the "candidate video" may refer to the complete video recording capture by mobile computing device 104. For example, the candidate video may be analyzed in real-time while the video recording process is ongoing. In this example, the candidate video that is analyzed corresponds to a portion of the entire candidate video.

In some embodiments, video analysis subsystem 114C may be configured to extract a subset of frames from the candidate video. The subset of frames may be extracted from the candidate video while the candidate video is being obtained. In some embodiments, a portion of the candidate video may be split into a plurality of frames, where each frame represents a temporal interval defined by a frame rate that the candidate video is sub-sampled at (e.g., 60 fps, 100 fps, 200 fps, etc.) Based on the subset of frames, video analysis subsystem 114C may be configured to determine whether the object (e.g., a target object specified by the image-capture task) has been captured within any of the subset of frames. In some embodiments, video analysis subsystem 114C may include a lightweight object recognition model configured to perform binary classifications of the image as including the object or not including the object. For example, video analysis subsystem 114C may include a mini-classifier trained to identify the object within an image, and may output information indicating whether a given frame from the subset of frames includes the object, a location of the object within the image (e.g., in pixel-space), and other metadata related to the frame (e.g., a pose of the camera, ambient lighting conditions, etc.). Some embodiments of video analysis subsystem 114C include image enhancement techniques capable of being applied to some or all of the subsets of frames from the video. For instance, one or more filters may be applied to a frame to increase clarity, a region of interest may be identified and a bounding box overlaid on the image representing the region of interest, color enhancement, noise removal, de-blurring, or any other image enhancement technique, or any combination thereof.

In some embodiments, video analysis subsystem 114C may be configured to determine whether the object, if identified within one or more frames of the extracted subset of frames, with or without image enhancement, is depicted in a manner lacking from the training data set. For example, the image-capture task may have been generated because images of an object from a particular perspective (e.g., side view) were lacking from that object's corresponding training data set. If one of the frames of the subset of frames extracted from the candidate video is determined to depict the object from the perspective absent from the training data set (e.g., a side view), then video analysis subsystem 114C may generate an indication for the image capture task that a missing perspective view of the object has been obtained and can be added to the training data set. For example, video analysis subsystem 114C may generate an indication that a desired image of the object has been captured and may provide the indication to image-capture task subsystem 112C, mobile computing device 104 executing the image-capture task, or both, to indicate that mobile computing device 104 may be adjusted such that another image capturing the object in another desired perspective, lighting condition, background setting, configuration, or a combination thereof, may be obtained.

In some embodiments, video analysis subsystem 114C may be configured to augment a frame determined to include an object (e.g., an object specified by the image-capture task) prior to being added to a training data set. For example, if a frame is determined to include the object at a desired perspective, lighting condition, background, etc., then the frame may be cropped so as to reduce an amount of unneeded data. As another example, a region of interest including the object may identified, and portions of the frame outside the region of interest may be compressed to a lower resolution to converse memory requirements for storing the image, or for performing additional analysis of the image prior to being added to the training data set. In some embodiments, some or all of the functionality of video analysis subsystem 114C may be offloaded to mobile computing device 104 so as to determine, in real-time, whether the candidate video captured the object. In some cases, where some of the functionality of video analysis subsystem 114C is offloaded to mobile computing device 104, the file size savings obtained by some of the aforementioned frame augmentation schemes may achieve less latency in transmitting image data from mobile computing device 104 to remote server system 110C.

In some embodiments, video analysis subsystem 114C may be configured to identify a salient frame from a subset of frames of the candidate video. In some embodiments, video analysis subsystem 114C may extract features from one or more frames of the subset of frames from the candidate video. Features that may be extracted include, but are not limited to, colors, shapes, textures, patterns, edges, corners, blobs, regions of interests, and the like. To extract features, various different feature extraction techniques may be used include, but not limited to, principal component analysis (PCA), independent component analysis (ICA), linear discriminant analysis (LDA), locally linear embedding (LLE), t-distributed stochastic neighbor embedding (t-SNE), and autoencoders (denoising autoencoders, variational autoencoders, convolutional autoencoders, sparse autoencoders). Generally, feature extraction causes raw input data (e.g., image data representing an image (one of the frames) depicting an object) to be transformed into a set of features describing the image, which may be used for modeling. In some embodiments, the feature extraction models used to extract features for a given image may output a vector in a continuous feature space, where each element of the vector has a weight determined by the model for the input image. In some embodiments, the feature extraction model may be a pre-trained model, such as ResNet, AlexNet, GoogLeNet, or VGG-19. Each pre-trained model may be trained based on a large number of training images (e.g., 100,000 or more, 1,000,000 or more, 10,000,000 or more) classified into one of a large number of categories (e.g., 100 or more, 1,000 or more, 10,000 or more).

In some embodiments, the feature vectors may be mapped to an embedding space, which is able to represent discrete variables as continuous vectors (in the embedding space). By mapping the feature vectors to the embedding space, clusters may be formed where each cluster represents a different focus of the candidate video. In some embodiments, a salient frame may be determined for each of the clusters. For example, if the image-capture task included capturing video of two different objects, then the embedding space formed by mapping feature vectors representing features extracted from the video's frames would include two clusters: one for each of the two objects. In some embodiments, a similar approach may be applied with a single object, where each cluster may represent a different perspective, lighting condition, background, configuration, etc., of the object captured via the video.

An analysis of a candidate video captured by mobile computing device 104 may include computations of one or more metrics to determine whether a salient frame depicting the object has been obtained. In some embodiments, video analysis subsystem 114C may obtain the candidate video while the candidate video is being obtained, and may extract K salient frames from the video. As mentioned above, each of the K salient frames may correspond to a single object, a different perspective or configuration of one object, or a combination thereof. For example, if the image-capture task relates to obtaining images depicting an object from multiple perspectives (e.g., to complete a training data set missing images of the object from multiple perspectives), then the K salient frames may each correspond to the object depicted in one of the perspectives. As another example, if the image-capture task relates to obtaining images depicting multiple objects, then each of the K salient frames may correspond to one of the multiple objects.

In some embodiments, upon receiving some or all of the candidate video of the object, video analysis subsystem 114C may perform some initial processing to the video. For example, the candidate video (e.g., a portion of the candidate video streamed in real-time or the entire candidate video) may be pruned at the beginning and end in order to remove irrelevant frames. For instance, upon initiating a video recording process, the first one to two seconds and the last one to two seconds may not capture the desired target, but instead may include images of a user moving the camera in a direction of the object or the user pressing a button to cause the video recording to begin or stop. Some embodiments may thus remove an initial few frames (e.g., one second of video) and a final few frames (e.g., one second of video) from the candidate video, and the remaining frames of the video may be used for video analysis.

In some embodiments, video analysis subsystem 114C may be configured to split a candidate video in a plurality of frames. For example, the video may be split into 30 frames per second, 60 frames per second, 100 frames per second, and so on. Each frame may then be analyzed using one or more video metrics, which may be retrieved from video metric database 134C. For example, video metric database 134C may store metrics related to computing a Blur score for each frame, a local outlier factor for each frame, or any other video metric, or any combination thereof. In some embodiments, the Blur score may indicate an amount of "blurring" captured within a given frame. A frame that includes a large amount of blurring may not provide an accurate depiction of the object, and therefore may degrade the quality of the training data used to train an object recognition model. In some embodiments, the Blur score for a frame may be computed by convolving the frame with a Laplacian kernel, computing the variance of the resulting convolution, and determining whether the variance is less than a pre-defined threshold. For example, each frame may be convolved with a 2D Laplacian 3×3 kernel.

Some embodiments may compute a Fast Fourier Transform of the image and determine whether an aggregate (like average) amplitude of frequencies below a threshold frequency exceed a threshold amplitude, thereby potentially indicating a blurry image exhibiting a large amount of low-frequency variation in pixel intensity in pixel space. Some embodiments may score images for blur based on variation of a Laplacian. For example, some embodiments may convolve a Laplacian kernel (e.g., a kernel where row 1=[0,1,0]; row 2=[1,−4,1], and row 3=[0,1,0]) with the image (like a channel thereof, such as a greyscale channel). The convolution may compute second order derivatives of pixel intensity with respect to location in pixel space in a single pass and, as a result, may be relatively computationally efficient relative to other approaches. Some embodiments may then determine a measure of variance, like standard deviation or range (or other population statistics, like kurtosis), of an output of the convolution to produce a blur score for the image. Some embodiments may classify the image as blurry in response to determining the blur score is less than a threshold value, and vice versa in response to exceeding the threshold.

The threshold for the blur score may initially set at a value of 100, however alternative thresholds may be used (e.g., 50, 75, 150, 200, etc.). The result of the aforementioned process may be an indication of each image that has a blur score less than the defined threshold. These images may be removed from consideration as being the salient frame, and the remaining images can be further analyzed. In some embodiments, the aforementioned process computes the blur score along a single channel, (e.g., grayscale). Alternatively, the blur score along other channels (e.g., red, blue green) may be computed, and the aforementioned process is merely an illustration of one channel.

In some embodiments, embeddings for each of the plurality of frames may be extracted using a pre-trained deep learning network. In some embodiments, the pre-trained deep learning network may include a deep neural network having a large number of layers. For example, the deep neural network may include six or more layers. Video analysis subsystem 114C may be configured to obtain the pre-trained deep learning network from model database 140C. The pre-trained deep learning network may include a number of stacked neural networks each of which includes several layers. As mentioned previously, the embeddings may refer to a higher dimension representation of a discrete variable where the number of dimensions is less than, for example, a number of pixels of an input image. Using the pre-trained deep learning network, video analysis subsystem 114C may be configured to extract an embedding for each frame of the plurality of frames obtained from the candidate video. The embedding may be a representation of an object depicted by an image (e.g., a drill to be exactly matched). The embeddings may be generated using different models for aspects such as color, pattern, or other aspects. For example, a model may extract a color embedding that identifies a color of the object within an image. In some embodiments, the embedding may be extracted using a last, or second to last, layer of a network. The network may be configured to extract an embedding for each image input to the network. The embedding may be represented as a tensor. For example, an embedding tensor of rank 1 may refer to an embedding vector composed of an array of numbers (e.g., a 1 by N or N by 1 vector). The dimensionality of an embedding vector may vary depending on use case, for instance the embedding vector may be 32 numbers long, 64 numbers long, 128 numbers long, 256 numbers long, 1024 numbers long, 1792 numbers long, etc. The embeddings mapped to an embedding space may describe a relationship between two images. As an example, a video depicting a drill split into 20 frames may produce 20 vectors that are spatially close to one another in the embedding space because each frame depicts a same drill. An embedding space is specific to a model that generates the vectors for that embedding space. For example, a model that is trained to produce color embeddings would refer to a different embedding space that is unrelated to an embedding space produced by an object recognition model (e.g., each embedding space is independent form one another). In some embodiments, the spatial relationship between two (or more) embedding vectors in embedding space may provide details regarding a relationship of the corresponding images, particularly for use cases where a training data set includes a sparse amount of data.

In some embodiments, a local outlier factor (LOF) may be computed for all feature embeddings extracted from the candidate video. The LOF refers to a measure for a local deviation of density of a given embedding vector with respect to its neighbors. In the context of the extracted embeddings, the LOF may refer to a measure of a local deviation of an embedding with respect to its k-nearest neighbors. Clusters of embedding vectors having a lower density than their neighbors may be labelled as outliers. For example, an embedding vector that is further from a centroid of a cluster of embedding vectors may be considered an outlier. In some embodiments, the outliers may be removed from further computations to improve accuracy.

Embodiments may cluster vectors in the embedding space with a variety of techniques. Examples include unsupervised approaches like k-means, density-based spatial clustering of applications with noise (DBSCAN), or ordering points to identify the clustering structure (OPTICS). For instance, some embodiments may execute a density-based clustering algorithm to establish groups corresponding to the resulting clusters and in some cases exclude outliers. To cluster according to location in an embedding space, some embodiments may iterate through each of the vectors corresponding to frames and designate a frame vector as a core frame vector if at least a threshold number of the other frame vectors in the records are within a threshold distance in the embedding space. Some embodiments may then iterate through each of the core frame vectors and create a graph of reachable frame vectors, where nodes on the graph are identified in response to non-core corresponding frame vectors being within a threshold distance of a core frame vector in the graph, and in response to core frame vectors in the graph being reachable by other core frame vectors in the graph, where two frame vectors are reachable from one another if there is a path from one frame vector to the other frame vector where every link and the path is a core frame vector and is within a threshold distance of one another. The set of nodes in each resulting graph, in some embodiments, may be designated as a cluster, and points excluded from the graphs may be designated as outliers that do not correspond to clusters. In some embodiments, the resulting clusters may be a local optimum resulting, and different initial conditions (e.g., different initial point selections) may yield better (e.g., with a smaller sum of root-mean-square distances between centroids and vectors) clusters. Accordingly, some embodiments may repeat the clustering process multiple times (e.g., more than five times) with different initial point selections (e.g., different random selections) and select a resulting set of clusters having the best clusters by the aforementioned measure.

In some cases, vectors in the embedding space may be designated as outliers with respect to corresponding clusters (or in some cases, without identifying or referencing corresponding clusters, which is not to suggest that any other feature is not also amenable to variation). In some cases, outliers may include those designated as such in the clustering process, and such outliers may be associated with a cluster having a closest member vector, centroid, or convex hull surface, for instance. In some cases, a second pass of analysis may be performed on each cluster to identify outliers by another form of analysis relative to that used for forming the clusters initially, e.g., a vector within a cluster buy at the edge of its periphery may be designated as an outlier for subsequent purposes in some cases. In some cases, the non-core vectors in the approach above may be designated as outliers of their corresponding respective vectors, or a similar analysis may be performed with a different distance threshold. Some embodiments may execute Unsupervised Outlier Detection using Local Outlier Factor (LOF) to designate outlier frame vectors in the embedding space. For instance, some embodiments may, for each vector, determine whether more than a threshold number of other vectors are within a threshold distance, whether an mean distance to a designated number of other vectors (like a plurality of such vectors) exceeds a threshold.

In some embodiments, the following pseudocode is an example of a process that may be performed by video analysis subsystem 114C to compute the LOF for a set of frames.

1. samples=[[0., 0., 0.], [0., 0.5, 0.], [1., 1., 0.5]]
2. neigh=NearestNeighbors(n_neighbors=1)
3. neigh.fit(samples)
4. NearestNeighbors(n_neighbors=1)
5. print(neigh.kneighbors([[1., 1., 1.]]))
6. (array([[0.5]]), array([[2]]))

As seen in the aforementioned example process, for a set of input samples (e.g., vectors {0, 0, 0}, {0, 0.5, 0}, {1, 1, 0.5}) the closest point to the vector {1, 1, 1} is the third vector, {1, 1, 0.5} at a distance of 0.5.

In some embodiments, the LOF for all of the feature embeddings may be used in combination with the blur score computed for each frame to compute a saliency score for each frame. In some embodiments, the saliency score may be computed as a weighted linear combination of the blur score for a given frame and the LOF for the frame. For example, the saliency score, Saliency_Score, may be equal to Saliency_Score=$W\_1 \times Blur\_i + W\_2 \times LOF\_i$, where i corresponds to a frame extracted from the candidate video, and $W\_1$ and $W\_2$ are weights. Weights $W\_1$ and $W\_2$ may be set initially as having values 0.8 and 0.2, respectively, however these values may be tuned using training data. In some embodiments, the Blur detection may be considered one model, while the LOF may be considered another model. The outputs of these models may be mapped into two different embedding spaces, a determination may be made as to how much information gain is obtained from a new frame based on how the new frame is mapped to each of the embedding spaces.

Some embodiments may include video analysis subsystem 114C computing a saliency score for each frame of the candidate video. The saliency scores may be computed in real-time (e.g., dynamically as the candidate video is being captured) or in bulk (e.g., upon completion of the video recording process). In some embodiments, the saliency score for each frame may be compared with a threshold saliency score, where saliency scores that equal or exceed the threshold saliency score may indicate that the corresponding frame may be used as a salient frame depicting the object. In some embodiments, the threshold saliency score may be set high enough such that, for a given subset of frames, only a few salient frames (e.g., 2-5) are identified so as to prevent oversaturation of the training data for a particular set of criteria (e.g., perspective, lighting, etc.). The salient frames, upon being identified, may then be added to the training data set for the object. For instance, a salient frame may be stored in training data database 138C.

In some embodiments, model subsystem 116C may be configured to generate or update one or more training data sets, as well as train, or cause to be trained, one or more models. For example, model subsystem 116C may update a training data set with one or more images representing salient frames extracted from a candidate video of an object, and may use the updated training data set to facilitate the training of an object recognition model for recognizing instances of the object within a new image. In some embodiments, in response to identifying a salient frame from a candidate video (e.g., a portion of a candidate video, an entire candidate video), the salient frame may be stored in memory in association with an object identifier of the object from the object ontology that the candidate video was captured for (e.g., a product identifier of the product that the image-capture task was focused on). In some embodiments, features may be extracted from each salient frame that is identified. For example, the features may be extracted using a deep learning network, such as the deep learning network described above. In some embodiments, the features previously extracted by the deep learning network may be obtained and retained by video analysis subsystem 114C for each of the identified salient frames. The features of these salient frames may then be stored in memory in association with the object identifier of the object from the object ontology. In some embodiments, both the salient frames and the features extracted from the salient frames may be stored in memory in association with the object identifier. The object identifier associated with the images, features, or images and features, may be used to determine which training data set to update. For example, model subsystem 116C may extract the object identifier from the salient frames and query training data database 138C to determine the training data set associated with the object identifier. Based on the object identifier, model subsystem 116C may cause the salient frames to be added to the training data set for that object identifier.

In some embodiments, model subsystem 116C may be configured to train an object recognition model to recognize an object within an image based on a training data set. For example, an object recognition model trained to recognize a drill within an image may be trained using a training data set formed of images of drills from various perspectives, with various lighting conditions, with various backgrounds, or having various configurations (e.g., model, type, color, etc.). In some embodiments, the object recognition model may be stored in model database 140C. Upon determining that training data database 138C has been updated, or in response to determining that a training data set stored within training data database 138C has been updated, a corresponding object recognition model may be retrieved from model database 140C by model subsystem 116C. The object recognition model may be a specific object recognition model, or the object recognition model may be generic. For example, a specific object recognition model may be configured to recognize instances of a particular object (e.g., a drill, a table, a shirt, etc.) within an image, whereas a generic object recognition model may be configured to recognize various different objects within an image. The training data used to train the specific object recognition model may differ from the training data used to train the generic object recognition model. For instance, the specific object recognition model may be trained using images depicting the specific object, features extracted from the images depicting the specific object, or both the images and the extracted features. On the other hand, the generic object recognition model may be trained using images depicting various objects (e.g., a ball, a computer, a drill, a couch, etc.), features extracted from the images depicting various objects, or both.

Model subsystem 116C may be configured to retrieve the updated training data set and the object recognition model that is to be trained or re-trained based on the updated training data set. In some embodiments, model subsystem 116C may be configured to facilitate the training of the object recognition model. Alternatively, model subsystem 116C may provide the object recognition model and the updated training data set to another computing system for training the model.

In some embodiments, user interface generation subsystem 118C may be configured to generate, update, and output data for rendering of a user interface (UI) on a display screen of mobile computing device 104. In some embodiments, the UI may be rendered within a native application of mobile computing device 104. In some embodiments, the UI may be generated upon receipt of a request for an image-capture task. For example, image-capture task subsystem 112C may determine that an image-capture task should be generated and provided to mobile device 104. The determination may be made based on a determination that an object recognition model lack of a sufficient amount of training data, a determination that mobile device 104 is within a predefined distance of a facility where a particular object is located (e.g., an object that an object recognition model is to be trained to recognize), or receipt of a user input to remote server system 110C. In some embodiments, the image-capture task is provided to mobile computing device 104 automatically without a request being received. For example, image-capture task subsystem 112C may generate the image-capture task, provide a notification, such as a link to a downloadable file, an attachment of a downloadable file, or a version update request for the native application, to a user account. Upon accessing the native application via an operating system running on processors of mobile computing device 104, the notification may be presented or otherwise provided to an operating user, and subsequently the image-capture task may be accessible to the user.

Some embodiments include image-capture task subsystem 112C generating computer readable code (e.g., Java, Python, C++) that, when executed, causes the image-capture task to be displayed by the native application. The image-capture task may include a set of sub-tasks representing instructions for how a video of a particular object is to be recorded by mobile computing device 104 to facilitate one or more images depicting the object to be obtained. In some embodiments, the sub-tasks may cause mobile computing device 104 to be adjusted in a manner (e.g., rotated about an axis, moved in a certain direction with respect to the object, etc.) to allow the video to capture the object from a perspective, lighting condition, background setting, configuration, or a combination thereof, which currently is not included within the training data for training an object recognition model to recognize that object. For example, the object recognition model configured to recognize a drill within an image may lack images of that drill from one or more orientations (e.g., side view, top view). The image-capture task, in such an example, may facilitate mobile computing device 104 to move in a manner to allow the camera component to obtain the lacking images. Some embodiments may include continually polling sensor data of sensors resident on mobile computing device 104, and using the output sensor data to determine an action to be performed or caused to be performed by mobile computing device 104. For example, an IMU on mobile computing device 104 may indicate that, based on a current orientation of an object as depicted by an image captured by the camera, mobile computing device 104 should be moved to the right with respect to the object. The IMU may monitor a change in a gravity vector to determine a direction and amount of movement that occurred, and use this information to determine whether the camera is in an accurate position to capture the desired image of the object. Some embodiments may include running a low-weight object detection model via mobile computing device 104 to determine, based on a video stream from a camera component, whether the object has been detected. In some embodiments, the object detection model may compute, in real-time, changes in the positioning of the camera component with respect to the object. For example, if the object detection model determines that the camera component of mobile computing device 104 is orientated "head-on" with respect to the object, the object detection model may be determined that mobile computing device 104 should be moved to a right or left direction to obtain an image depicting the object from a side perspective view.

Upon generating, or updating, the instructions based on the images needed to be captured, user interface generation subsystem 118C may be configured to generate indications of how mobile computing device 104 is to be adjusted. Some embodiments may include generating visual indicators instructing the user operating mobile computing device 104 as to the actions that he/she is to perform. For example, if mobile computing device 104 is to be moved to the right, user interface generation subsystem 118C may generate a visual indicator (e.g., an arrow) pointing in a direction of the user's right.

In some embodiments, user interface generation subsystem 118C may be configured to generate and provide feedback to mobile computing device 104. The feedback may be generated in response to the actions, or lack of actions, performed to mobile computing device 104 based on the image-capture task. Some embodiments may include providing the feedback in real-time such that as the image-capture task presents instructions to the user via mobile computing device 104, the feedback indicates to the user whether a given sub-task or sub-tasks are being performed correctly. In some embodiments, the feedback may be provided with an indication of one or more actions that can be performed to adjust mobile computing device 104 to facilitate capturing an image of an object in a desired manner (e.g., from a certain perspective). For example, the feedback may include a score describing a progress of the user with regard to the image-capture task as well as an indication of how the user can adjust mobile computing device 104 to further improve the score, such as by causing mobile computing device 104 to be moved in a direction to facilitate capturing the video of the object from a new perspective.

Figure 17:
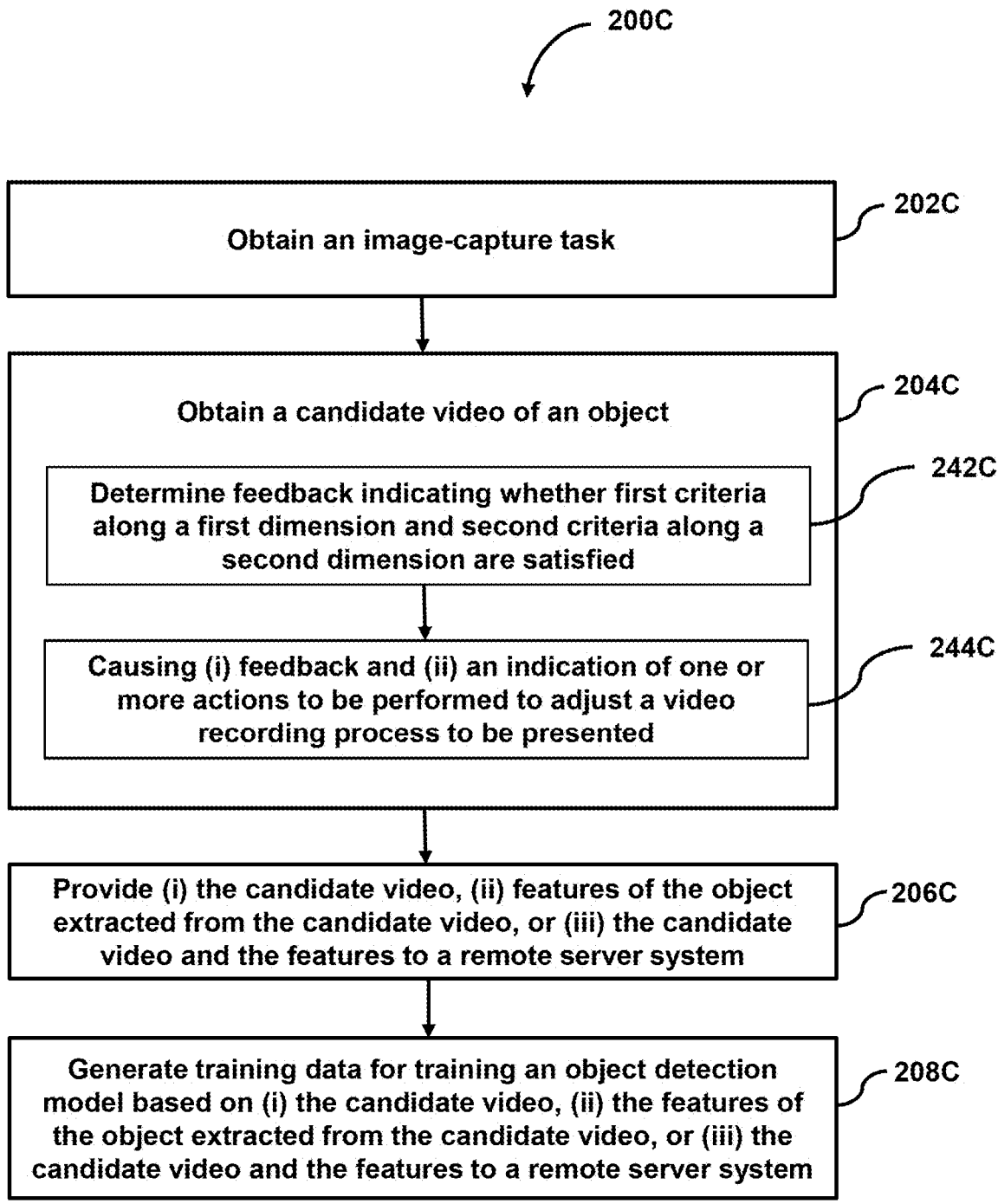
FIG. 17 illustrates an example process for generating training data for training an object recognition model based on an image-capture task, in accordance with various embodiments.

FIG. 17 illustrates an example process for generating training data for training an object recognition model based on an image-capture task, in accordance with various embodiments. In some embodiments, process 200C may begin at step 202C. At step 202C, an image-capture task may be obtained. The image-capture task may include a request for a video of an object to be captured by a mobile computing device (e.g., mobile computing device 104). For example, a mobile computing device including a camera or other image capturing component, or a mobile computing device that is communicatively coupled to a camera or other image capturing component, may receive the image-capture task requesting that a video of an object be captured. In some embodiments, the image-capture task may be generated by, output from, or both generated by and output from a remote server system. For example, an image-capture task may be generated by computer system 102C (e.g., image-capture task subsystem 112C) of remote server system 110C. In some embodiments, the image-capture task may provide an indication of the object that is to be captured by the video. For example, the image-capture task may indicate a name of the object to be captured by the video, a barcode of the object, a SKU of the object, a location of the object, descriptors of the object (e.g., size, shape, color, etc.), or any other indication that may help identify the object to a user operating mobile computing device 104. Furthermore, the indication of the object may also be used by remote server system 110C, such as by image-capture task subsystem 112C, to identify the object to ensure that a video of the correct object is going to be obtained. Some embodiments may include causing an image of the indication of the object to be obtained prior to beginning the image-capture task (e.g., prior to the video recording process beginning). For example, mobile computing device 104 may scan a barcode of an object (e.g., a drill) prior to the video recording process beginning. If the barcode scan indicates that the correct object has been identified, then the image-capture task may cause a video recording functionality of the mobile computing device to activate. In some embodiments, the image-capture task may cause the mobile computing device to present instructions via a native application executing on the mobile computing device, where the instructions that are presented may describe how the video of the object is to be captured. For example, the presented instructions may indicate a pose that the object should have when the video is captured, a pose of the camera when capturing the video of the object, lighting conditions for the environment where the video is being captured, a background setting for the object, and other aspects for the video. In some embodiments, the instructions may indicate ways that the user may adjust mobile computing device 104 to obtain a particular depiction of the object. In some embodiments, step 202C may be performed by a subsystem that is the same or similar to image-capture task subsystem 112C.

At step 204, a candidate video of an object may be obtained. In some embodiments, mobile computing device 104 may be configured by the image-capture task to cause a candidate video of the object to be obtained. The candidate video may include the object captured from multiple perspectives, multiple lighting conditions, multiple background settings, multiple configurations, or from any other variant, or any combination thereof. As an example, the candidate video may include capturing video of the object from a front view, a side view, and various views therebetween. For instance, if the front view corresponds to a 0-degree angle between the camera of mobile computing device 104 and a front face of the object, and the side view comprises a 90-degree angle with respect to the camera and the front face, then the candidate video may capture video of the object as mobile computing device traverses the angles from 0-degrees to 90-degrees. As another example, the candidate video may include capturing video of the object in various configurations, such as in different formats, options, formations, etc. For instance, if the object is a flannel shirt, the image-capture task may request that candidate video capture a red version of the flannel shirt, a green version of the flannel shirt, a size large flannel shirt, a size small flannel shirt, the flannel shirt draped over a chair, the flannel shirt hung on a hanger, the flannel shirt worn by a person (or mannequin), and the like. The particular "views" of the object may be specified by the image-capture task, which may be determined based on the images currently stored in a training data set for that object. In some embodiments, image-capture task subsystem 112C may query training data database 138C to determine which training data sets lack enough images or lack enough diversity of images (e.g., only images of the object from a single perspective). If a particular training data set corresponding to an object (e.g., a training data set of images of drills) requires additional images to improve the accuracy of a corresponding object recognition model, then image-capture task subsystem 112C may generate an image-capture task including a sub-set of tasks that facilitate capturing video of the object in some or all of the needed formats.

In some embodiments, step 204 may include a sub-step 242. Sub-step 242 may include determining feedback indicating whether first criteria along a first dimension are satisfied, whether second criteria along a second dimension are satisfied, or both. In some examples, a dimension may refer to a perspective of the object and the corresponding criteria may include multiple perspectives of the object that are to be obtained via the candidate video. In some examples, the dimension may refer to a lighting condition of the object (e.g., ambient light level of the environment where the object is located and the candidate video is captured), and the corresponding criteria may include multiple lighting conditions that the object is to be captured within an image. In some examples, the dimension may refer to a background setting of the object, and the corresponding criteria may include various background settings that the object is to be placed (e.g., a plain white background, a blue sky background, a garage background, etc.). In some examples, the dimensions may refer to configurations of the object, and the corresponding criteria may include various configurations of the object that the candidate video is to obtain (e.g., different colors of the object, different sizes of the object, different formations of the object, different placements of the object, etc.).

In some embodiments, sub-step 242 may be computed in real-time while the candidate video is being recorded. For example, as the candidate video is being captured, video analysis subsystem 114C may determine whether the first and second criteria along the first and second dimensions, respectively, are being satisfied. If so, image-capture task subsystem 112C may generate feedback regarding the performance of the user while capturing the video. For example, the feedback may include a score indicating an accuracy or progression of the user through the image-capture task (e.g., 50% complete, 75% complete, 3 images remaining, etc.). As another example, the feedback may include words, phrases, images, or a combination thereof, that indicate to the user how he/she is progressing through the image-capture task (e.g., "Good job!", "Keep up the good work," etc.).

Step 204 may also include a sub-step 244. At sub-step 244, the feedback determined at sub-step 242, as well as an indication of one or more actions to be performed to adjust a video recording process, may be caused to be presented. For instance, the feedback and the indication of the one or more actions may be caused to be presented within a user interface of a native application executing on mobile computing device 104. In some embodiments, the feedback and the indication of the one or more actions may be presented while the candidate video is still being captured. For example, the captured candidate video may be streamed to remote server system 110C, and video analysis subsystem 114C of computer system 102C may analyze some of the candidate video while additional portions of the candidate video is obtained. The feedback and indications may be dynamic and provided in real-time based on the portion or portions of the candidate video capture by mobile computing device 104 and streamed to remote server system 110C. In some embodiments, the indications of the one or more actions may include graphical representation presented via the native application's UI indicating how a user should adjust the video recording process. For example, the indication of the one or more actions may include information describing how a user may adjust an orientation, position, or location of mobile computing device 104 to obtain an image depicting the object in a particular manner. As an example, the indication may include a graphical representation of an arrow pointed towards a right-side of mobile computing device 104 indicating that a user should move mobile computing device 104 in that direction. As another example, the indication may include a graphical representation of a word or phrase, or a visual indication of a level, allowing the user to adjust mobile computing device 104 to have a different device orientation. In some embodiments, step 204, including sub-steps 242 and 244, may be performed by a subsystem or combination of subsystems that are the same or similar to video analysis subsystem 114C and user interface generation subsystem 118C.

At step 206C, the candidate video, features of the object extracted from the candidate video, or the candidate video and the features extracted from the candidate video, may be provided to a remote server system. In some embodiments, the candidate video may be provided to remote server system 110 in response to determining that one or more salient images of the object have been obtained. The salient image or images may be detected by splitting the candidate video into a plurality of frames, and then computing a saliency score for each frame. In some embodiments, the salient frame or frames may be a frame that's saliency score satisfies a saliency threshold condition (e.g., is greater than or equal to a saliency threshold score). In some embodiments, the salient frames may be provided to training data database 138C and added to a training data set of a corresponding object. In some embodiments, features may be extracted from the salient frame using a deep learning network. For example, a feature vector representing discrete variable from the salient frame may be generated using the deep learning network. Some embodiments may include storing the features of the salient frame with the training data set for the object in addition to, or instead of, the salient image. In some embodiments, step 206C may be performed by a subsystem or combination of subsystems that are the same or similar to video analysis subsystem 114C and model subsystem 116C.

At step 208C, training data may generated for training an object detection model based on the candidate video, the features extracted from the candidate video, or the candidate video and the features extracted from the candidate video. As mentioned previously, the candidate video, the features extracted from the candidate video, or both, may be provided to remote server system 110. In some embodiments, the training data set for the corresponding object depicted by the candidate video may be determined based on an object identifier associated with the object. In some embodiments, the object identifier may be determined based on the indication of the object provided by the image-capture task. For example, upon providing the image-capture task to mobile computing device 104, an input representing the indication of the object may be provided to mobile computing device 104 (e.g., a barcode scanned). Based on the indication, a determination may be made as to whether the object was correctly identified by a user operating mobile computing device 104. If so, image-capture task subsystem 112C may obtain an object identifier of the object from an object ontology including a plurality of objects. The object identifier may include a multi-character string uniquely identifying the object within the object ontology. In some embodiments, the candidate video, features, or both, may be appended to include the object identifier. In some embodiments, model subsystem 116C may determine a training data set that is to be generated or updated with the candidate video, the features extracted, or both, based on the object identifier. Upon locating the object identifier, for example using an index of training data sets stored within training data database 138C, model subsystem 116C may provide the candidate video, features, or both to the training data set associated with the unique object identifier, adding the video, frames from the video, the features extracted from the frames, or a combination thereof, to the training data set. Subsequently, model subsystem 116C may be configured to train, or cause to be trained, an object recognition model used to recognize objects that are the same or similar to the object associated with the object identifier. For example, model subsystem 116C may update a training data set including images of drills, and may provide the updated training data set to an object recognition model configured to recognize instances of a drill within an image to cause the object recognition model to be re-trained. In some embodiments, step 208C may be performed by a subsystem that is the same or similar to model subsystem 116C.

Figure 18:
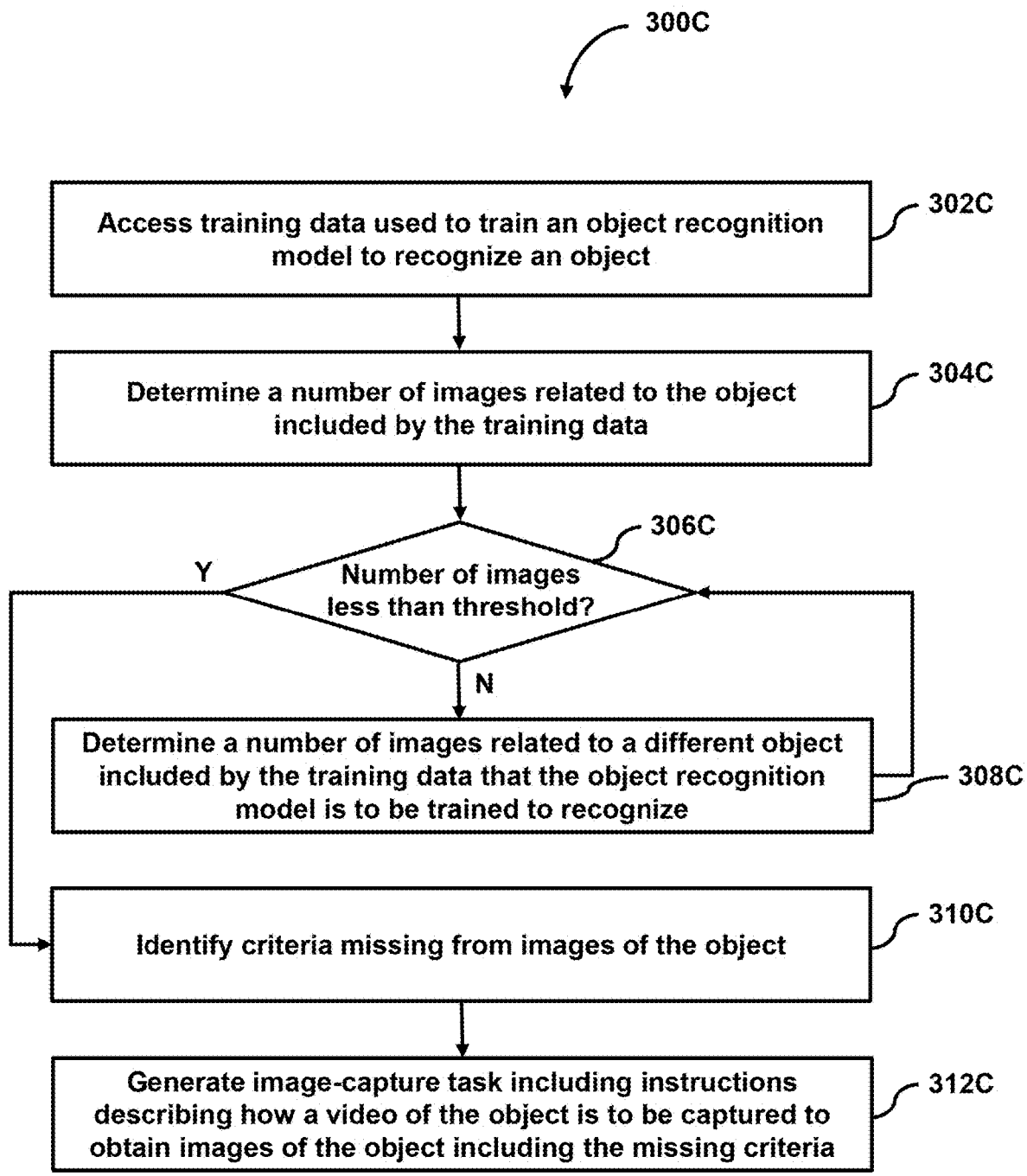
FIG. 18 illustrates an example process for generating an image-capture task based on a determination of whether a training data set includes a requisite amount and diversity of images, in accordance with various embodiments.

FIG. 18 illustrates an example process for generating an image-capture task based on a determination of whether a training data set includes a requisite amount and diversity of images, in accordance with various embodiments. In some embodiments, process 300C may begin at step 302C. At step 302C, training data used to train an object recognition model to recognize an object may be access. In some embodiments, the training data stored in training data database 138C may be accessed. As an example, with reference to Table 1, training data database 138C may include an index that includes a listing of each training data set stored within training data database 138C, a name of the object that the training data set corresponds to, an object identifier of the object, and a number of images that the training data set includes. In some embodiments, step 302C may be performed by a subsystem that is the same or similar to image-capture task subsystem 112C.

At step 304, a number of images related to the object that are included by the training data set for the object may be determined. In some embodiments, the index including the listing of each training data stored in training data database 138C may be queried to determine which training data sets lack enough images to train a corresponding object recognition model, which training data sets lack enough diversity of images to train a corresponding object recognition model, which training data sets have not been updated recently (e.g., no updates within a most recent 1 or more months, 3 or more months, 6 or more months, 12 or more months, etc.), or a combination thereof. In some embodiments, a training data set used to train a corresponding object recognition model having p parameters should include $\alpha \cdot p$ samples in order to ensure accuracy. The multiplier a may be any real, rational, number, such as, 1, 2, 3, 5, 10, 20, etc. As a general consideration, the more training data a training data set includes, the more accurate the object recognition model should be.

In some embodiments, the number of images related to the object in a particular training data set may be determined by querying the index of training data from training data database 138C. For example, with reference to Table 1 above, training data set TDS_1 includes 3 images depicting a table (e.g., the object), while training data set TDS_2 includes 36 images depicting dogs. In some embodiments, the index may include information regarding the various different images included within a given training data set. For example, the information may indicate how many images of a particular object the training data set includes, and of those images, how many depict the object from a different perspective (e.g., front view, side view, top view, etc.), how many depict the object with different lighting conditions (e.g., ambient light levels of 500-1,000 lux; outdoor light levels of 10,000 lux, etc.), how many depict the object with a different background setting (e.g., a plain white background, a blue sky background, etc.), and how many depict the object in a particular configuration (e.g., different colors, different positions or settings of object, etc.). In some embodiments, a training data set may include a large quantity of images depicting the object (e.g., 100 or more, 1,000 or more, 10,000 or more), however those images may not differ much in characterizing the object. Therefore, additional images of the object in different perspectives, lightings, background, configurations, or in any other manner, or any combination thereof, may improve accuracy of an object recognition model trained with the training data. In some embodiments, step 304 may be performed by a subsystem that is the same or similar to image-capture task subsystem 112C.

At step 306C, a determination may be made as to whether the number of images determined at step 304 is less than a threshold value. The threshold value may represent a total number of images depicting an object that the training data set is to include. For example, the threshold value may be 10 or more total images, 100 or more total images, 1,000 or more total images, and the like. Alternatively or additionally, the threshold value may represent a number of images depicting the object of a different format the training data set includes. For example, the threshold value may be 1 or more images depicting the object from A different perspectives, 1 or more images depicting the object with B different ambient light levels, 1 or more images depicting the object with C different backgrounds, 1 or more images depicting the object having D different configurations, and the like, where A, B, C, and D are real, rational numbers (e.g., A, B, C, D selected from a set of numbers between 1-100).

In some embodiments, additional measures may be computed to determine whether additional data is needed for a training data set. For example, a performance of a model, such as its accuracy, may be computed. Various metrics for computing accuracy may include, but are not limited to, an F1 score, a Type 1 or Type 2 error, NMI score, or MCC score. For example, for MCC, a threshold may be selected within a range of 0.1 to 0.9. For instance, for a threshold of 0.8, if the MCC score is less than 0.8, then additional training data may be needed to improve the model's accuracy. As another example, a density of clusters of embedding vectors produced by the network may be analyzed. If the density includes large gaps, then this may indicate that additional data should be added to the training data for the model to fill in the missing gaps. In particular, based on the location of these gaps in the embedding space, a determination may be made as to what data should be obtained (e.g., added to the training data).

If, at step 306C, it is determined that the number of images in the training data set is not less than the threshold value, then process 300C may proceed to step 308C. At step 308C, a number of images related to a different object included by the training data that the object recognition model is to be trained to recognize is determined. Process 300C may then return to step 306C to determine if the number of images of the different object is less than the threshold value. In some embodiments, if the object recognition model is specific and is only used to recognize one object or one type of object, then process 300C may end after step 306C. However, if the object recognition model is generic, capable of recognizing at least two different objects or two different types of objects, then process 300C may proceed to step 308C. In some embodiments, steps 306C and 308C may be performed by a subsystem that is the same or similar to image-capture task subsystem 112C.

In some embodiments, the training data set may be determined to include a satisfactory number of images if the total number of images is greater than the threshold value (e.g., a training data set including 1,000,000 images, where the threshold value is 10,000 images). In some embodiments, the training data set may be determined to include a satisfactory number of images if the training data set includes a first number of images depicting the object from A or more different perspectives, a second number of images depicting the object with B different ambient light levels, a third number of images depicting the object with C different backgrounds, a fourth number of images depicting the object having D different configurations, or a combination thereof. As an example, a training data set including 1,000,000 images depicting a drill may be determined to have more than the threshold number of images. For instance, the training data set may include 1,000,000 images depicting a drill, where at least 100 images depict the drill from a different perspective (e.g., 0-degrees with respect to a front face of the object, 180-degrees with respect to the front face of the object, etc.), at least 100 images depict the drill with a different lighting condition (e.g., with 100 different lux values), at least 100 images depicting the drill with a different background (e.g., plain white background, blue sky background, etc.), and at least 100 images depicting the drill having a different configuration (e.g., different color, different model, different drill bit attachment, etc.). If the threshold value is 10,000 images of a drill, then because the training data set includes 1,000,000 images depicting the drill, this threshold value criteria may be satisfied.

If the number of images is determined to be less than the threshold value, then process 300 may proceed to step 310C. At step 310C, criteria missing from the images of the object (e.g., from the training data set) may be identified. In some embodiments, the criteria may correspond to one or more dimensions, such as, and without limitation, a perspective, a lighting condition, a background setting, a configuration, or any other manner that the object may be depicted by, or any combination thereof. If step 306C determined that less than a threshold value of images were included by a training data set, where the threshold value may be criteria along one or more dimensions, then at step 308C, the dimensions with which a number of images do not satisfy the criteria may be identified. In some embodiments, step 308C may be performed by a subsystem that is the same or similar to image-capture task subsystem 112C.

At step 312C, an image-capture task may be generated, where the image-capture task includes instructions describing how a video of the object is to be captured to obtain images of the object including the missing criteria. For example, if images from different or a specific number of perspectives are missing from a training data set, then the image-capture task may include instructions for how mobile computing device 104 can be positioned with respect to the object to obtain those images. In some embodiments, step 310C may be performed by a subsystem that is the same or similar to image-capture task subsystem 112C.

Figure 19:
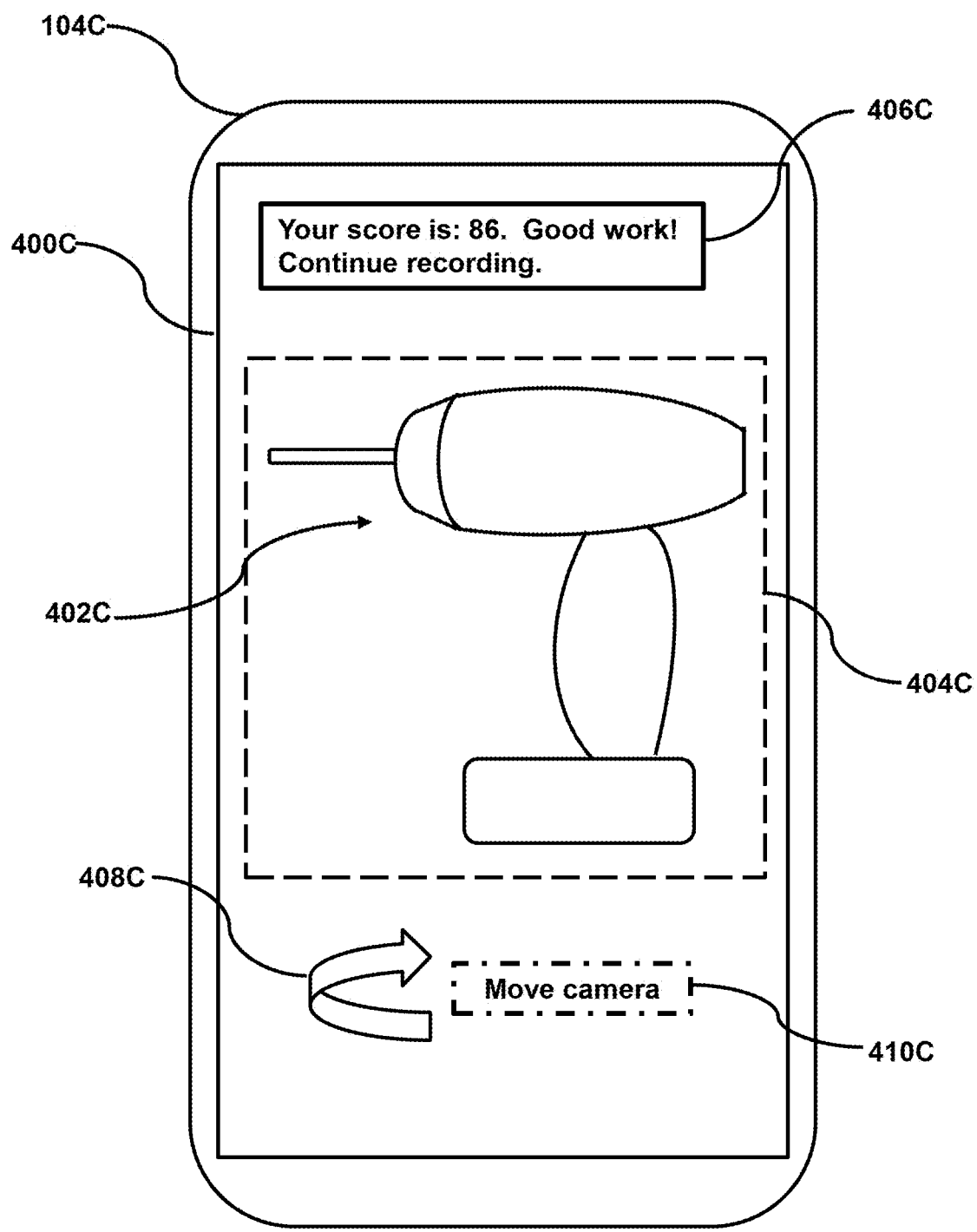
FIG. 19 illustrates an example user interface of an image-capture task displayed on a mobile computing device, in accordance with various embodiments.

FIG. 19 illustrates an example user interface of an image-capture task displayed on a mobile computing device, in accordance with various embodiments. In some embodiments, mobile computing device 104 may include a display screen 400, such as a touch screen. Various types of touch screens may include, but are not limited to, a resistive touch screen, a surface capacitive touch screen, a projected capacitive touch screen, a surface acoustic wave (SAW) touch screen, and an infrared (IR) touch screen. In some embodiments, display screen 400C may render a UI of a native application executing on mobile computing device 104C. In some embodiments, the application may cause, or otherwise access, a camera or other image capturing component of mobile computing device 104C. For example, mobile computing device 104C may include one or more rear-facing cameras, one or more front facing cameras, or both rear-facing and front-facing cameras. Upon launching the native application, the camera functionality of mobile computing device 104C may be activated, and the UI may cause the camera's view to be displayed on display screen 400C.

In some embodiments, a user may orient mobile computing device 104C in a manner to cause an object to be viewable by the camera, and a view of the object may be displayed by display screen 400C. Some embodiments may allow a user to view the object with their mobile computing device without requiring an image to be captured (e.g., in a "view-finding" mode), however the user may also be able to capture a video, time series of images, image burst, or a single image depicting the object. In some embodiments, upon launching the native application, a video recording process may commence whereby a candidate video is captured by mobile computing device 104C. The candidate video may be stored locally in memory on mobile computing device 104C, streamed to remote server system 110C, or both. In some embodiments, while a video recording process commences and a candidate video is captured, an object 402 may be displayed by display screen 400C. Object 402 may be, for example, a drill. In some embodiments, mobile computing device 104C may include a mini-classifier configured to generate and display a bounding box 404C surrounding any object detected within a displayed image. In some embodiments, bounding box 404C may be displayed on display screen 400C regardless of whether a candidate video or image is being captured.

As mentioned previously, video analysis subsystem 114C may analyze a candidate video obtained from mobile computing device 104C, and may generate feedback and indications of one or more actions that may be performed to adjust mobile computing device 104C based on the image-capture task. In some embodiments, feedback 406C may be provided to mobile computing device 104C and displayed within the UI. Feedback 406C may include a score indicating how well the user is doing at completing the image-capture task, as well as additional information (e.g., instructions of whether to stop or continue recording, positive affirmations, etc.). In some embodiments, indications 408C and 410C may also be provided to mobile computing device 104C and displayed within the UI. For example, indication 408C may depict an arrow point in a direction that mobile computing device 104C, or a camera component of mobile computing device 104C, should move to obtain a desired image of the object (e.g., an image depicting the object from a different perspective). As another example, indication 410C may describe the action to be performed by the user (e.g., "Move camera").

Figure 20:
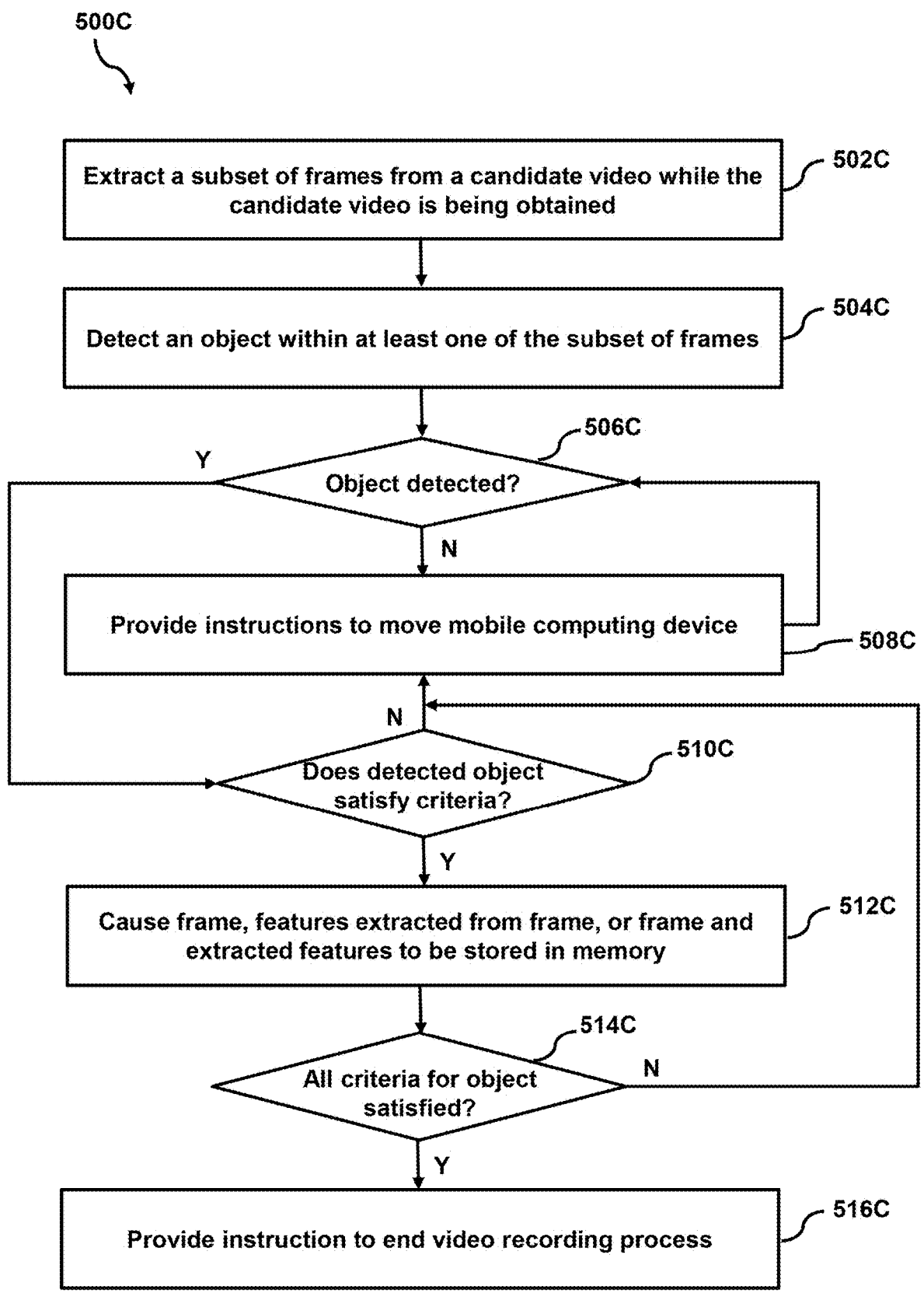
FIG. 20 illustrates an example process for performing an image-capture task, in accordance with various embodiments.

FIG. 20 illustrates an example process for performing an image-capture task, in accordance with various embodiments. In some embodiments, process 500C may begin at step 502. At step 502, a subset of frames from a candidate video may be extracted while the candidate video is being obtained. In some embodiments, the candidate video may be streamed to remote server system 110C from mobile computing device 104C as the candidate video is obtained. The portion of the candidate video that has been obtained by computer system 102 of remote server system 110C may be processed to determine whether a desired object was detected within the candidate video, and whether the object was oriented in a manner to supplement for a lacking image from the object's corresponding training data set. In some embodiments, a subset of frames of the candidate video may be extracted by splitting the candidate video (e.g., the portion of the candidate video obtained by computer system 102) into a subset of frames. The number of frames included in the subset of frames may be predefined. For example, the candidate video may be split into a number of frames based on a sub-sample rate, such as 30 fps, 60 fps, 100 fps, etc. Therefore, the number of frames included in the subset of frames is determined based on the temporal duration of the candidate video to be split up into frames, and the sub-sample rate. As an example, a 1 second candidate video sub-sampled at 30 fps would yield 30 frames. In some embodiments, step 502 may be performed by a subsystem that is the same or similar to video analysis subsystem 114C.

At step 504C, an object may be detected or attempted to be detected within at least one of the subset of frames. In some embodiments, an object detection model may be retrieved from model database 140C and used to determine whether an object is present within a frame from the subset of frames. The object detection model may be a generic object detection model that is configured to detect the presence of an object within an image. For example, the generic object detection model may be trained on a set of training data including images of various objects (e.g., dogs, tables, soccer balls, planets, etc.). In some embodiments, the object detection model may be a specific object detection model trained using an existing training data set corresponding to the object. For example, if the image capture task is for capturing a video of a drill, the object detection model obtained to determine whether an object (e.g., a drill) is present in one of the subset of frames may be a previously trained instance of the object recognition model. In some embodiments, the object recognition model may be a specific object detection model trained using a training data set including images of an object that is determined to be similar to the object to be captured by the video for the image-capture task. For example, if the object to be detected via the candidate video is a soccer ball, then a previously trained object detection model trained using images of basketballs may be used. In some embodiments, a determination of a similar object may be computed by estimating a distance in feature space between a vector representing the object to be captured and an object depicted by images in a previously generated training data set. In some embodiments, step 504C may be performed by a subsystem that is the same or similar to video analysis subsystem 114C.

At step 506C, a determination may be made as to whether the object (e.g., the object indicated by the image-capture task) was detected within any of the subset of frames. If not, process 500C may proceed to step 508C. At step 508C, instructions may be provided to mobile computing device 104C to cause mobile computing device 104C to move. In some embodiments, if no object was detected, or the indicated object was not detected, within any of the frames of the subset of frames, then the image-capture task may generate, specify, and provide actions that may be taken to try and capture additional images (or video) depicting the object. For example, the instructions may indicate to a user that mobile computing device 104C should be moved in a particular direction (e.g., right, left, up, down), rotated about an axis, etc., to attempt to capture the object via the candidate video. In some embodiments, steps 506C and 508C may be performed by a subsystem that is the same or similar to video analysis subsystem 114C.

If, at step 506C, it was determined that the object was detected within at least one frame of the subset of frames, then process 500C may proceed to step 510C. At step 510C, a determination may be made as to whether the detected object satisfies certain criteria. For instance, a determination may be made as to whether the object as depicted by the frame (or frames) satisfies one or more criteria along one or more dimensions. As an example, a determination may be made as to whether the object depicted in the frame has a perspective that is currently missing or lacking from the training data set. If, at step 510C, it is determined that the detected object does not satisfy the criteria, then process 500C may return to step 508C. However, if it is determined, at step 510C, that the detected object does satisfy the criteria, then process 500C may proceed to step 512C. In some embodiments, step 510C may be performed by a subsystem that is the same or similar to video analysis subsystem 114C.

At step 512C, the frame determined to depict the object satisfying the criteria, features extracted from the frame, or the frame and the features, may be caused to be stored in memory. In some embodiments, the frame, the features, or both may be added to a training data set to be used to train an object recognition model for recognizing the object within an image. The frame, features, or both may be added to the training data set and stored in training data database 138C. At step 514C, a determination may be made as to whether all of the criteria for the training data set has been satisfied. For example, a determination may be made as to whether additional images depicting the object are needed, those images being images of the object generally, images of the object in certain perspectives, lighting conditions, backgrounds, configurations, or a combination thereof. If, at step 514C, it is determined that not all of the criteria has been satisfied (e.g., additional perspectives of the object are needed), then process 500C may return to step 508C. However, if the criteria have all been satisfied, then process 500C may proceed to step 516C. At step 516C, an instruction may be provided to mobile computing device 104C to cause the video recording process to end. In some embodiments, the instruction may automatically cause the video recording process to end, however alternatively the instruction may provide a notification to the user to manually cause the video recording process to end. In some embodiments, steps 512C-516C may be performed by a subsystem that is the same or similar to video analysis subsystem 114C.

In some embodiments, one or more steps from process 500C may be performed locally on mobile computing device 104C. For example, step 504C may be performed locally using an object detection model stored locally on mobile computing device. Thus, even though the steps of process 500C are described in the context of operations performed by a subsystem or subsystems of computer system 102 of remote server system 110C, some or all of these steps may be performed by client-side functionality of mobile computing device 104C.

Figure 21:
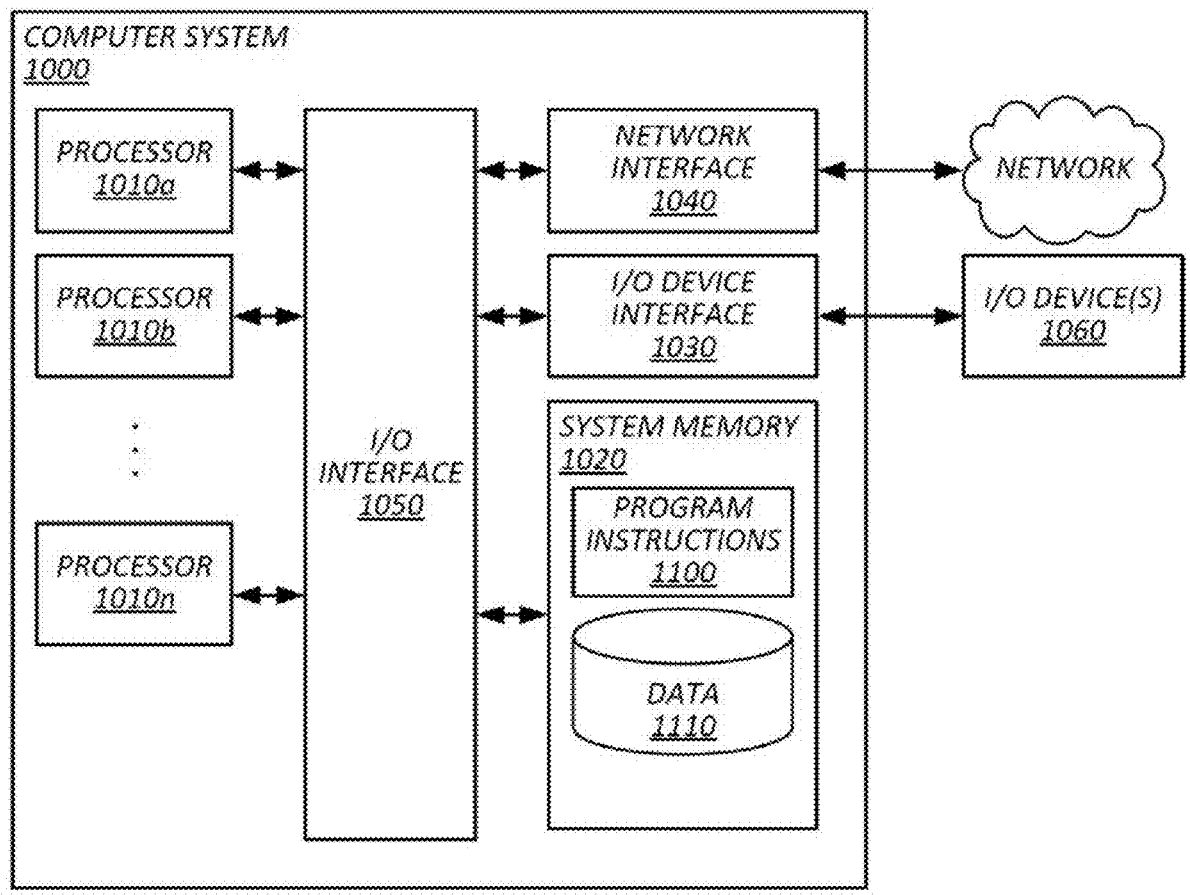
FIG. 21 illustrates an example of a computing system by which the present techniques may be implemented, in accordance with various embodiments.

FIG. 21 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method comprising: obtaining, with a computer system, an image depicting an object within a context, wherein: the image is captured by a mobile computing device, the object is a member of an ontology of objects comprising a plurality of objects, and the context is a member of an ontology of contexts comprising a plurality of contexts; determining, with the computer system, with a trained context classification model, the context depicted by the image; determining, with the computer system, with a trained object detection model, a first object identifier of the object based on the image and the context; and causing, with the computer system, the first object identifier of the object to be stored in memory.

A2. The method of embodiment A1, wherein the plurality of contexts comprise at least one of: a scene depicted by the image, a location of the image, or a time when the image was captured.

A3. The method of any one of embodiments A1-A2, further comprising: determining, with the computer system, with the trained context classification model, a confidence level that the context previously determined to be depicted by the image is accurate; and determining, with the computer system, with the trained context classification model, and in response to determining the confidence level is less than a threshold confidence level, that the image depicted the object within an updated context, the updated context differing from the context.

A4. The method of any one of embodiments A1-A3, further comprising: determining, with the computer system, with the trained object detection model, a second object identifier of an additional object depicted by the image based on the first object identifier of the object and the context; and causing, with the computer system, the second object identifier of the additional object to be stored in memory, wherein the first object identifier of the object and the second object identifier of the additional object are stored in the memory in association with the image, a feature vector representing one or more visual features extracted from the image, or the image and the feature vector.

A5. The method of any one of embodiments A1-A4, wherein: the context comprises a scene of the image; and the trained context classification model comprises a trained scene classification model.

A6. The method of embodiment A5, wherein: the trained object detection model comprises an autoencoder with a continuous vector space representation; and the trained scene classification model comprises a deep neural network.

A7. The method of embodiment A6, further comprising: causing, with the computer system, an object detection model to be trained to obtain the trained object detection model, wherein: the objected detection model is trained using a training data set comprising a plurality of images, each of the plurality of images depicts an object from a subset of objects of the ontology of objects, and for a given object of the subset of objects, the plurality of images includes three or fewer images depicting the given object.

A8. The method of any one of embodiments A5-A7, wherein determining the first object identifier of the object based on the image and the scene comprises: receiving, with the computer system, a feature vector representing features extracted from the image, wherein: the object identifier of the object is determined, with the trained object detection model, based on the feature vector and the scene.

A9. The method of any one of embodiments A5-A8, wherein the first object identifier of the object is stored in the memory in association with at least one of: the image, the scene, a feature vector representing features extracted from the image, or a scene identifier of the scene.

A10. The method of any one of embodiments A1-A9, further comprising: identifying, with the computer system, a region of interest of the object within the image; cropping, with the computer system, the image to include only the region of interest; and determining, with the computer system, based on a cropped version of the image comprising the region of interest, a confidence level for the first object identifier of the object, wherein the confidence level indicates how confident the trained object detection model is that the first object identifier represents a label of the object.

A11. The method of embodiment A10, further comprising: determining, with the computer system, that the confidence level is less than a threshold confidence level, indicating that first object identifier is not able to be the label for the object; determining, with the computer system, with the trained object detection model, a second object identifier of the object based on the cropped version of the image and the context; and causing, with the computer system, in response to determining that a confidence level for the second object identifier of the object is greater than or equal to the threshold confidence level, the second object identifier of the object to be stored in the memory in place of the first object identifier.

A12. The method of any one of embodiments A1-A11, further comprising: generating, with the computer system, a training data set for training a computer vision search system to detect the object within a query image, wherein the training data set is generated based on: the first object identifier of the object, one or more features extracted from the image, or the first object identifier and the one or more features extracted from the image; and causing, with the computer system, the computer vision search system to be trained based on the training data to form a trained computer vision search system.

A13. The method of embodiment A12, further comprising: obtaining, with the computer system, a new image; and determining, with the computer system, with the trained computer vision search system, that the new image depicts the object.

A14. The method of embodiment A13, wherein the computer system comprises a kiosk configured to capture the new image and provide information regarding the object for display via the kiosk.

B1. A method comprising: obtaining, with a computer system, (i) an image captured by a mobile computing device and (ii) coordinates indicating an input location of an input detected on a display screen of the mobile computing device, wherein: the input caused the image to be captured, the input location is a location in pixel-space of the image, and the image depicts a first object located at a first location in the image and a second object located at a second location in the image; obtaining, with the computer system, a computer-vision object recognition model trained using a training data set comprising images depicting objects, wherein: each image of the training data set is labeled with an object identifier, each object identifier indicates an object in an object ontology depicted by a corresponding image, and the object ontology comprises the first object and the second object; detecting, with the computer system, with the computer-vision object recognition model, the first object based on: distances in a feature space of the computer-vision object recognition model between: an image feature vector of the image and a first feature vector of the first object in the computer-vision object recognition model, and the image feature vector of the image and a second feature vector of the second object in the computer-vision object recognition model; and distances in the pixel-space of the image between: the input location of the input and the first location of the first object, and the input location of the input and the second location of the second object; and causing, with the computer system, a first object identifier of the first object from the object ontology to be stored in memory.

B2. The method of embodiment B1, further comprising: providing, with the computer system, the first object identifier to a computer vision search system to obtain information indicating at least one of: a location of the first object, an availability to purchase the first object, one or more related objects, or a name of the first object.

B3. The method of any one of embodiments B1-B2, wherein the object ontology further comprises a third object not depicted in the image, detecting the first object further comprises: detecting, with the computer system, the first object based on a distance in the feature space of the computer-vision object recognition model between the image vector of the image and a third feature vector of the third object in the computer-vision object recognition model.

B4. The method of any one of embodiments B1-B3, wherein the distances in the feature space comprise Euclidean distances, Minkowski distances, or cosine distances.

B5. The method of any one of embodiments B1-B4, wherein causing the first object identifier of the first object to be stored in the memory comprises: causing, with the computer system, in response to the first object being detected, the first object identifier of the first object to be stored in the memory, wherein: the first object identifier of the first object is stored in the memory in association with the first image, one or more features extracted from the first image, or the first image and the one or more features extracted from the first image.

B6. The method of any one of embodiments B1-B5, wherein the input comprises at least one of: a touch event whereby a capacitive input mechanism is determined to have touched the display screen of the mobile computing device at the input location, wherein the display screen comprises a capacitive touch screen; a gesture detected by the mobile computing device or a gesture acquisition device communicatively coupled to the mobile computing device, wherein the gesture is determined to be directed to the input location; or an eye gaze detected by the mobile computing device or an eye tracking device communicatively coupled to the mobile computing device, wherein the eye gaze is determined by tracking a user's eyes, wherein the input location is determined based on the user's eyes being tracked to the input location and dwelling on the input location for more than a threshold amount of time.

B7. The method of any one of embodiments B1-B6, wherein detecting the first object based on the distances in the feature space comprises: determining, with the computer system, a first distance between the image feature vector of the image and the first feature vector of the first object; determining, with the computer system, a second distance between the image feature vector of the image and the second feature vector of the second object; and determining, with the computer system, whether the first distance and the second distance are less than a predefined threshold distance; and selecting, with the computer system, based on the first distance being less than the predefined threshold distance and the second distance being greater than the predefined threshold distance, the first object.

B8. The method of any one of embodiments B1-B7, wherein detecting the first object based on the distances in the pixel-space of the image comprises: determining, with the computer system, a first distance in the pixel-space between the input location of the input and the first location of the first object depicted within the image; determining, with the computer system, a second distance in the pixel-space between the input location of the input and the second location of the second object depicted within the image; selecting, with the computer system, the first object based on the first distance being less than the second distance indicating that the input is directed to the first object.

B9. The method of any one of embodiments B1-B8, further comprising: determining, with the computer system, a second object identifier of the second object from the object ontology based on the first object identifier of the first object; and causing, with the computer system, the second object identifier of the second object to be stored in the memory.

B10. The method of embodiment B9, further comprising: causing, with the computer system, a first search to be performed for first information related to the first object using the first object identifier as a first query input for the first search; causing, with the computer system, a second search to be performed for second information related to the second object using the second object identifier as a second query input for the second search; and providing, with the computer system, for display on the display screen of the mobile computing device, a kiosk device including a display screen, or the display screen of the mobile computing device and the kiosk device, at least some of the first information and at least some of the second information.

B11. The method of any one of embodiments B1-B10, wherein detecting the first object comprises: determining, with the computer system, a first score indicating how similar the first object in the image is to a first identified object from the object ontology represented by the first object identifier; determining, with the computer system, a second score indicating how similar the second object in the image is to a second identified object from the object ontology represented by a second object identifier; generating, with the computer system, a first revised score based on the first score and a first weight applied to the first score, wherein the first weight is determined based on a first distance between the input location of the input and the first location of the first object; generating, with the computer system, a second revised score based on the second score and a second weight applied to the second score, wherein the second weight is determined based on a second distance between the input location of the input and the second location of the first object; and selecting, with the computer system, the first object based on the first revised score and the second revised score.

B12. The method of any one of embodiments B1-B11, further comprising: generating, with the computer system, an enhanced version of the image by enhancing the image in a region of the image surrounding the input location, wherein the enhancing the image comprises performing, to the region surrounding the input location, at least one of: light balance enhancement, shadow removal, pattern recognition, or color spectrum recognition.

B13. The method of any one of embodiments B1-B12, further comprising: generating, with the computer system, a compressed version of the image by compressing portions of the image further than a threshold distance from the input location, wherein compressing the portions of the image comprise: segmenting the image into blocks, identifying a set of blocks encompassing the input location, compressing pixels in each remaining block from the blocks excluding the set of blocks with a first amount of loss, and compressing pixels in each block of the set of blocks with a second amount of loss, wherein the second amount of loss is smaller than the first amount of loss.

B14. The method of any one of embodiments B1-B13, wherein the computer-vision object recognition model comprises a convolutional neural network having three or more layers.

C1. A tangible, non-transitory, machine-readable medium storing instructions that when executed by a data processing apparatus cause the data processing apparatus to perform operations comprising: a method of any one of embodiments A1-A14 or B1-B14.

D1. A system, comprising: one or more processors; and memory storing instructions that when executed by the processors cause the processors to effectuate operations comprising: a method of any one of embodiments A1-A14 or B1-B14.

What is claimed is:

1. A tangible, non-transitory, computer-readable medium storing computer program instructions that when executed by one or more processors effectuate operations comprising:
    obtaining, with a computer system, a first training set to train a computer vision model, the first training set comprising images depicting objects and labels corresponding to object identifiers and indicating which object is depicted in respective labeled images;
    training, with the computer system, the computer vision model to detect the objects in other images based on the first training set, wherein training the computer vision model comprises:
        encoding depictions of objects in the first training set as vectors in a vector space of lower dimensionality than at least some images in the first training set, and designating, based on the vectors, locations in the vector space as corresponding to object identifiers;
    obtaining a first vector encoding a first depiction of a first object in a first query image;
    determining similarity between the first depiction of the first object in the first query image and another object in an image of the first training set based on a first distance between the first vector and a second vector associated with the another object in the image of the first training set,
    designating as a first object identifier associated with the first object in the first query image, an object identifier associated by the trained computer vision model with the another object in the image of the first training set;
    determining, with the computer system, based on the first distance between the first location of the first vector in the vector space and the second location of the second vector in the vector space, to add the first image or data based on the first image to a second training set, wherein:
        the second training set comprises both at least some of the images from the first training set and the first image,
        the first image is absent from the first training set, and
        the first image is labeled as depicting the first object in the second training set; and
    training, with the computer system, the computer vision model with the second training set.

2. The tangible, non-transitory, computer-readable medium of claim 1, wherein determining to add the first image or data based thereon to the second training set comprises:
    determining that the first distance is less than a first threshold distance and greater than a second threshold distance,
    wherein the first threshold distance indicates whether the first image depicts the object and the second threshold distance indicates whether the object, as depicted in the first image, is represented differently than the another object depicted in the image of the training set.

3. The tangible, non-transitory, computer-readable medium of claim 1, wherein determining to add the first image or data based thereon in the second training set comprises:
    determining, with a plurality of offline computer vision models, scores indicating whether the first object is depicted in the first query image; and
    combining the scores in the output of an ensemble model; and
    determining to add the first image or data based thereon in the second training set based on the output of the ensemble model indicating a higher confidence that the first object is depicted in the first query image than a confidence that the computer vision model detected the first object being depicted in the first query image based on the first distance.

4. The tangible, non-transitory, computer-readable medium of claim 1, wherein:
    the obtained first training set depicts objects in an ontology of objects including more than 100 different objects;
    the computer vision model is configured to return search results within less than 500 milliseconds of receiving query images;
    the obtained first training set has fewer than 10 images for each of at least some of the objects depicted;
    the vector space has more than 10 dimensions; and
    the operations comprise, before training the computer vision model with the second training set:
        detecting, with the computer system, a second object in a second query image by obtaining a third vector encoding a second depiction of the second object and selecting a second object identifier based on a second distance between a third location of the third vector in the vector space and a fourth location of a fourth vector in the vector space designated as corresponding to the second object identifier by the trained computer vision model; and
        determining, with the computer system, based on the second distance between the third location of the third vector in the vector space and the fourth location of the fourth vector in the vector space being greater than a threshold distance, to not include the second image or data based thereon in the second training set.

5. A tangible, non-transitory, computer-readable medium storing computer program instructions that when executed by one or more processors effectuate operations comprising:
obtaining, with a computer system, a training data set comprising:
a first image depicting a first object labeled with a first identifier of the first object, and
a second image depicting a second object labeled with a second identifier of the second object;
causing, with the computer system, based on the training data set, a computer-vision object recognition model to be trained to detect the first object and the second object to obtain a trained computer-vision object recognition model, wherein:
parameters of the trained computer-vision object recognition model encode first information about a first subset of visual features of the first object, and
the first subset of visual features of the first object is determined based on one or more visual features extracted from the first image;
obtaining, with the computer system, after training and deployment of the trained computer-vision object recognition model, a third image; and
determining, with the computer system, with the trained computer-vision object recognition model, that the third image depicts the first object based on a first distance being less than a first threshold distance, the first distance being between a first location in a vector space of a first feature vector representing the one or more visual features extracted from the first image and a second location in the vector space of a second feature vector representing one or more visual features extracted from the third image, and, in response:
causing the first identifier or a value corresponding to the first identifier to be stored in memory in association with the third image, the one or more visual features extracted from the third image, or the third image and the one or more visual features extracted from the third image,
determining, based on a similarity of the one or more visual features extracted from the first image and the one or more visual features extracted from the third image satisfying a threshold similarity condition, that the third image is to be added to the training data set or another training set for retraining the trained computer-vision object recognition model, wherein:
the threshold similarity is based on a comparison between the first distance and a second threshold distance, and
the third image is absent from the training data set, and
enriching the parameters of the trained computer-vision object recognition model to encode second information about a second subset of visual features of the first object based on the one or more visual features extracted from the third image, wherein the second subset of visual features of the first object differs from the first subset of visual features of the first object.

6. The tangible, non-transitory, computer-readable medium of claim 5, wherein determining that the third image is to be added to the training data set for retraining the trained computer-vision object recognition model comprises:
determining that the first distance is less than the second threshold distance and greater than a third threshold distance, wherein:
the second threshold distance indicates whether the third image depicts the object, and
the third threshold distance indicates whether the object, as depicted in the third image, is represented differently than the object as depicted in the first image.

7. The tangible, non-transitory, computer-readable medium of claim 5, wherein the third image is obtained using a kiosk device and the first object comprises a product, the operation further comprises:
retrieving, with the computer system, product information describing the product in response to determining that the third image depicts the first object;
generating, with the computer system, a user interface (UI) for display on a display screen of the kiosk device, wherein the UI is configured to display at least some of the product information; and
providing, with the computer system, the UI to the kiosk device for rendering.

8. The tangible, non-transitory, computer-readable medium of claim 5, wherein the operations further comprise:
determining, with the computer system, a second distance between the second location in the vector space of the second feature vector representing the one or more visual features extracted from the third image and a third location in the vector space of a third feature vector representing one or more visual features extracted from a fourth image, wherein:
the trained computer-vision object recognition model previously determined that the object was absent from the fourth image;
causing, with the computer system, in response to determining that the second distance between second location in the vector space of the second feature vector representing the one or more visual features extracted from the third image and the third location in the vector space of the third feature vector representing the one or more visual features extracted from the fourth image is less than the first threshold distance, the first identifier or the value corresponding to the first identifier to be stored in the memory in association with the fourth image, the one or more visual features extracted from the fourth image, or the fourth image and the one or more visual features extracted from the fourth image; and
enriching, with the computer system, the parameters of the trained computer-vision object recognition model to encode third information about a third subset of visual features of the first object based on the one or more visual features extracted from the fourth image, wherein:
the third subset of visual features of the first object differs from the first subset of visual features of the first object and the second subset of visual features of the first object.

9. The tangible, non-transitory, computer-readable medium of claim 5, wherein the operations further comprise:
obtaining, with the computer system, for each of a plurality of images, one or more visual features extracted from a corresponding image of the plurality of images, wherein:
the trained computer-vision object recognition model previously determined that the object was not depicted by each of the plurality of images;

determining, with the computer system, a similarity between each of the plurality of images and the third image;

determining, with the computer system, based on the similarity between each of the plurality of images and the third image, a set of images from the plurality of images that depict the first object; and causing, with the computer system, the first identifier or the value corresponding to the first identifier to be stored in the memory in association with each image from the set of images from the plurality of images, one or more visual features extracted from each image of the set of images, or the set of images, or each image from the set of images from the plurality of images and the one or more visual features extracted from each image of the set of images, or the set of images.

10. The tangible, non-transitory, computer-readable medium of claim 9, wherein the operations further comprise:

performing, with the computer system, the following iteratively until at least one stopping criterion is met:
determining a similarity between each image from the set of images and remaining images from the plurality of images, wherein the remaining images from the plurality of images exclude the set of images;
determining whether the similarity between an image of the set of images and an image from the remaining images from the plurality of images indicates that the first object is depicted within one or more images from the remaining images from the plurality of images; and
causing the first identifier or the value corresponding to the first identifier to be stored in memory in association with each of the one or more images from the remaining images of the plurality of images, one or more visual features extracted from each of the one or more images from the remaining images of the plurality of images, or the one or more images from the remaining images of the plurality of images and the one or more visual features extracted from each of the one or more images from the remaining images of the plurality of images.

11. The tangible, non-transitory, computer-readable medium of claim 10, wherein the at least one stopping criterion comprises at least one of: a threshold number of iterations having been performed, an amount of time with which the plurality of images have been stored, or an amount of time since the trained computer-vision object recognition model was trained exceeding a threshold amount of time.

12. The tangible, non-transitory, computer-readable medium of claim 5, wherein the operations further comprise:
determining, with the computer system, a second distance between the second location in the vector space of the second feature vector representing the one or more visual features extracted from the third image and a third location of a third feature vector in the vector space representing one or more visual features extracted from a fourth image, wherein:
the trained computer-vision object recognition model previously determined that the first object was absent from the fourth image;
determining, with the computer system, that the second distance is greater than a second threshold distance; and
preventing the first identifier or the value corresponding to the first identifier from being stored in the memory in association with the fourth image and the one or more visual features extracted from the fourth image.

13. The tangible, non-transitory, computer-readable medium of claim 5, wherein the operations further comprise:
causing, with the computer system, in response to determining that the first distance is less than the second threshold distance, the trained computer-vision object recognition model to be retrained based on the first image, the second image, and the third image.

14. The tangible, non-transitory, computer-readable medium of claim 5, wherein:
the trained computer-vision object recognition model comprises a deep neural network comprising six or more layers; and
the parameters of the trained computer-vision object recognition model comprise weights and biases of layer of the deep neural network.

15. The tangible, non-transitory, computer-readable medium of claim 5, wherein the operations further comprise:
determining, with the computer system, a second distance between the second location in the vector space of the second feature vector representing the one or more visual features extracted from the third image and a third location in the vector space of a third feature vector representing one or more visual features extracted from a fourth image, wherein:
the trained computer-vision object recognition model previously determined that the first object was absent from the fourth image;
determining, with the computer system, that the second distance is less than the first threshold distance;
determining, with the computer system, that the second distance is less than the second threshold distance; and
in response to determining that the second distance is less than the second threshold distance, preventing the first identifier or the value corresponding to the first identifier from being stored in the memory in association with the fourth image and the one or more visual features extracted from the fourth image.

16. The tangible, non-transitory, computer-readable medium of claim 5, wherein determining that the third image depicts the first object comprises:
determining, with the computer system, using the trained computer-vision object recognition model, the first distance indicating how similar the first object is to an object depicted by the third image and a second distance indicating how similar the second object is to the object depicted by the third image;
determining that the first distance is less than the second distance indicating that the object depicted by the third image has a greater similarity to the first object than to the second object; and
determining that the first distance is less than the first distance threshold.

17. A method, comprising:
obtaining, with a computer system, a training data set comprising:
a first image depicting a first object labeled with a first identifier of the first object, and
a second image depicting a second object labeled with a second identifier of the second object;
causing, with the computer system, based on the training data set, a computer-vision object recognition model to be trained to detect the first object and the second object to obtain a trained computer-vision object recognition model, wherein:
parameters of the trained computer-vision object recognition model encode first information about a first subset of visual features of the first object, and the first subset of visual features of the first object is determined based on one or more visual features extracted from the first image;

obtaining, with the computer system, after training and deployment of the trained computer-vision object recognition model, a third image; and determining, with the computer system, with the trained computer-vision object recognition model, that the third image depicts the first object based on a first distance being less than a first threshold distance, the first distance being between a first location in a vector space of a first feature vector representing the one or more visual features extracted from the first image and a second location in the vector space of a second feature vector representing one or more visual features extracted from the third image, and, in response:

causing the first identifier or a value corresponding to the first identifier to be stored in memory in association with the third image, one or more visual features extracted from the third image, or the third image and the one or more visual features extracted from the third image, determining, based on a similarity of the one or more visual features extracted from the first image and the one or more visual features extracted from the third image satisfying a threshold similarity condition, that the third image is to be added to the training data set or another training data set for retraining the trained computer-vision object recognition model, wherein:

the threshold similarity is based on a comparison between the first distance and a second threshold distance, and the third image is absent from the training data set, and enriching the parameters of the trained computer-vision object recognition model to encode second information about a second subset of visual features of the first object based on the one or more visual features extracted from the third image, wherein the second subset of visual features of the first object differs from the first subset of visual features of the first object.

18. The tangible, non-transitory, computer-readable medium of claim 17, wherein determining to add the first image or data based thereon to the second training set comprises:

determining that the first image imparts more than a threshold amount of entropy to the second training set.

19. The tangible, non-transitory, computer-readable medium of claim 17, wherein determining to add the first image or data based thereon to the second training set comprises:

steps for determining whether the first image too similar to another image.

20. The tangible, non-transitory, computer-readable medium of claim 17, wherein determining to add the first image or data based thereon to the second training set comprises:

determining that the first distance is greater than a first threshold distance.

* * * * *